US012578199B2

(12) United States Patent
    Pankov

(10) Patent No.:    US 12,578,199 B2
(45) Date of Patent:        Mar. 17, 2026

(54) GENERATING A RESOURCE-EFFICIENT TRACK FOR A VEHICLE

(71) Applicant: Boris Valerevich Pankov, Moscow (RU)

(72) Inventor: Boris Valerevich Pankov, Moscow (RU)

( * ) Notice: Subject to any disclaimer, the term of this patent is extended or adjusted under 35 U.S.C. 154(b) by 0 days.

(21) Appl. No.: 18/712,238

(22) PCT Filed: Aug. 8, 2022

(86) PCT No.: PCT/RU2022/050245
    § 371 (c)(1),
    (2) Date: May 21, 2024

(87) PCT Pub. No.: WO2023/033673
    PCT Pub. Date: Mar. 9, 2023

(65) Prior Publication Data
    US 2025/0012585 A1        Jan. 9, 2025

(30) Foreign Application Priority Data
    Jan. 28, 2022    (RU) ................................ 2022101929

(51) Int. Cl.
    *G01C 21/34*        (2006.01)
    *B60K 31/00*        (2006.01)
    *G07C 5/02*         (2006.01)

(52) U.S. Cl.
    CPC .......... *G01C 21/3469* (2013.01); *B60K 31/00* (2013.01); *G01C 21/3415* (2013.01); *G01C 21/3492* (2013.01); *G07C 5/02* (2013.01)

(58) Field of Classification Search
    CPC ............ G01C 21/3469; G01C 21/3415; G01C 21/3492; G01C 21/3453; B60K 31/00;
    (Continued)

(56) References Cited

U.S. PATENT DOCUMENTS 5,781,119  A      7/1998   Yamashita et al.
    6,226,588  B1     5/2001   Teramura et al.
    (Continued)

FOREIGN PATENT DOCUMENTS

DE      102010029467      12/2011
    EP         2477011         7/2012
    (Continued)

OTHER PUBLICATIONS

Johannes Asamer et al.: ""Sensitivity analysis for energy demand estimation of electric vehicles"", https://www.sciencedirect.com/science/article/pii/S1361920915300250.
    (Continued)

*Primary Examiner* — Richard M Camby
(74) *Attorney, Agent, or Firm* — Chad Peterson

(57)                ABSTRACT
The proposed invention relates to methods for controlling energy consumption by a motor vehicle, and can be used in transportation industry. The technical problem to be solved by the claimed invention is to provide a method, a device, a system, a motor vehicle, and a computer-readable medium that do not possess the drawbacks of the prior art and thus make it possible to generate an accurate resource-efficient track for a motor vehicle that allows to reduce resource consumption by the motor vehicle moving along a portion of the route that contains a mandatory deceleration point, including portions of the route that are located in urban areas.

20 Claims, 17 Drawing Sheets

(58) Field of Classification Search
CPC . G07C 5/02; B60W 2556/10; B60W 2556/50;
B60W 40/105
See application file for complete search history.

(56) References Cited

U.S. PATENT DOCUMENTS

| | | | |
|---|---|---|---|
| 6,282,492 | B1 | 8/2001 | Gorai et al. |
| 9,294,733 | B2 | 3/2016 | Watanabe et al. |
| 9,342,983 | B1 | 5/2016 | Brener et al. |
| 9,346,466 | B2 | 5/2016 | Papajewski et al. |
| 9,566,896 | B2 | 2/2017 | Armenta et al. |
| 9,604,648 | B2 | 3/2017 | Tamari et al. |
| 9,631,940 | B2 | 4/2017 | Eikelenberg et al. |
| 9,725,093 | B2 | 8/2017 | Chunodkar et al. |
| 9,818,088 | B2 | 11/2017 | Penilla et al. |
| 9,994,234 | B2 | 6/2018 | Oguri |
| 10,061,637 | B1 | 8/2018 | Halbersberg et al. |
| 10,176,783 | B2 | 1/2019 | Travers et al. |
| 10,269,260 | B2 | 4/2019 | Ellis |
| 10,495,477 | B2 | 12/2019 | Engelhardt |
| 10,504,052 | B2 | 12/2019 | Sugioka et al. |
| 10,594,991 | B1 | 3/2020 | Skolnick |
| 10,646,825 | B2 | 5/2020 | Kim |
| 10,930,159 | B1 | 2/2021 | Jessen et al. |
| 11,173,916 | B2 | 11/2021 | Dodo |
| 11,193,778 | B2 | 12/2021 | Verheijen et al. |
| 11,279,359 | B2 | 3/2022 | Plianos et al. |
| 11,390,165 | B2 | 7/2022 | Koebler et al. |
| 11,466,997 | B1 * | 10/2022 | Williams ......... G08G 1/096716 |
| 11,518,393 | B2 | 12/2022 | Liu et al. |
| 11,548,522 | B2 | 1/2023 | Szczerba et al. |
| 11,738,750 | B2 | 8/2023 | Wessel et al. |
| 11,760,208 | B2 | 9/2023 | Kwon |
| 12,062,008 | B2 * | 8/2024 | Turner ............... G06Q 10/0838 |
| 12,287,217 | B2 * | 4/2025 | Valerevich Pankov ..................... G01C 21/3415 |
| 2005/0154505 | A1 | 7/2005 | Nakamura et al. |
| 2007/0171093 | A1 | 7/2007 | Jang |
| 2008/0125958 | A1 | 5/2008 | Boss et al. |
| 2008/0133120 | A1 | 6/2008 | Romanick |
| 2009/0031741 | A1 | 2/2009 | Hara et al. |
| 2009/0281715 | A1 | 11/2009 | Paik |
| 2010/0057339 | A1 | 3/2010 | Pryakhin et al. |
| 2010/0253594 | A1 | 10/2010 | Szczerba et al. |
| 2010/0332373 | A1 | 12/2010 | Crabtree et al. |
| 2011/0166774 | A1 | 7/2011 | Schunder |
| 2011/0208646 | A1 | 8/2011 | McMaster et al. |
| 2011/0313647 | A1 | 12/2011 | Koebler et al. |
| 2012/0004839 | A1 | 1/2012 | Mizuno |
| 2012/0022781 | A1 | 1/2012 | Wilson |
| 2012/0089327 | A1 | 4/2012 | Miura et al. |
| 2012/0123657 | A1 | 5/2012 | Taguchi |
| 2012/0271542 | A1 | 10/2012 | Arcot et al. |
| 2013/0054125 | A1 | 2/2013 | Bruemmer et al. |
| 2013/0173147 | A1 | 7/2013 | Takeuchi et al. |
| 2013/0261970 | A1 | 10/2013 | Papajewski et al. |
| 2014/0032062 | A1 | 1/2014 | Baer et al. |
| 2014/0032087 | A1 | 1/2014 | Shiri |
| 2015/0019117 | A1 | 1/2015 | Huber et al. |
| 2015/0073692 | A1 | 3/2015 | Malikopoulos |
| 2015/0094968 | A1 | 4/2015 | Jia et al. |
| 2015/0183439 | A1 | 7/2015 | Jackson |
| 2015/0232097 | A1 | 8/2015 | Luther et al. |
| 2015/0241234 | A1 | 8/2015 | Ogawa |
| 2016/0084661 | A1 | 3/2016 | Gautama et al. |
| 2016/0129836 | A1 | 5/2016 | Sugita et al. |
| 2016/0207521 | A1 | 7/2016 | Ogawa |
| 2016/0221567 | A1 | 8/2016 | Ogawa |
| 2017/0008467 | A1 | 1/2017 | Lindhuber |
| 2017/0038219 | A1 | 2/2017 | Ziezold |
| 2017/0146362 | A1 | 5/2017 | Bai |
| 2017/0307391 | A1 | 10/2017 | Mason et al. |
| 2017/0322041 | A1 | 11/2017 | Stephens et al. |
| 2018/0031380 | A1 | 2/2018 | Lee et al. |
| 2018/0079306 | A1 | 3/2018 | Kim et al. |
| 2018/0099564 | A1 | 4/2018 | Koebler |
| 2018/0113448 | A1 | 4/2018 | Nagda et al. |
| 2018/0186375 | A1 | 7/2018 | Omeachair et al. |
| 2018/0222478 | A1 | 8/2018 | Limbacher |
| 2018/0244270 | A1 | 8/2018 | Tudosie |
| 2018/0345885 | A1 | 12/2018 | Seger et al. |
| 2018/0356835 | A1 | 12/2018 | Gehring et al. |
| 2019/0017840 | A1 | 1/2019 | Okamoto et al. |
| 2019/0152474 | A1 | 5/2019 | Sogabe |
| 2019/0164451 | A1 | 5/2019 | Gaither et al. |
| 2019/0170527 | A1 | 6/2019 | Inoue et al. |
| 2019/0236959 | A1 | 8/2019 | Belapurkar et al. |
| 2019/0248359 | A1 | 8/2019 | Miller et al. |
| 2019/0283584 | A1 | 9/2019 | Koebler et al. |
| 2019/0359211 | A1 | 11/2019 | Matsumoto et al. |
| 2020/0108829 | A1 | 4/2020 | Bauer |
| 2020/0122588 | A1 | 4/2020 | Cserna et al. |
| 2020/0191588 | A1 | 6/2020 | Park |
| 2020/0361476 | A1 | 11/2020 | Gaither et al. |
| 2020/0391593 | A1 | 12/2020 | Lee et al. |
| 2021/0185608 | A1 | 6/2021 | Ali et al. |
| 2021/0192975 | A1 | 6/2021 | Spence et al. |
| 2021/0213948 | A1 | 7/2021 | Lahti et al. |
| 2021/0269029 | A1 | 9/2021 | Fendt |
| 2021/0294351 | A1 | 9/2021 | Wiberg |
| 2021/0387525 | A1 | 12/2021 | Gruenig |
| 2021/0403082 | A1 | 12/2021 | Funke et al. |
| 2022/0073070 | A1 | 3/2022 | Niewiadomski |
| 2022/0089024 | A1 | 3/2022 | Aoyama |
| 2022/0299328 | A1 | 9/2022 | Pankov |
| 2022/0340137 | A1 * | 10/2022 | Ollis ..................... B60W 30/09 |
| 2022/0363129 | A1 | 11/2022 | Pankov |
| 2022/0363130 | A1 * | 11/2022 | Pankov .................. B60K 35/29 |
| 2022/0363285 | A1 | 11/2022 | Pankov |
| 2022/0366740 | A1 | 11/2022 | Pankov |
| 2022/0371580 | A1 | 11/2022 | Kusumoto et al. |
| 2022/0373341 | A1 | 11/2022 | Pankov |
| 2022/0373342 | A1 | 11/2022 | Pankov |
| 2022/0373343 | A1 * | 11/2022 | Pankov ............. G01C 21/3469 |
| 2022/0373344 | A1 | 11/2022 | Pankov |
| 2023/0064358 | A1 * | 3/2023 | Poull ..................... B60K 35/28 |
| 2023/0068356 | A1 * | 3/2023 | Aggoune .......... G01C 21/3492 |
| 2023/0278422 | A1 | 9/2023 | Pankov |
| 2023/0280174 | A1 | 9/2023 | Pankov |
| 2024/0183675 | A1 | 6/2024 | Pankov |
| 2024/0328796 | A1 | 10/2024 | Pankov |
| 2024/0328797 | A1 * | 10/2024 | Pankov ............. B60W 50/0097 |
| 2024/0328798 | A1 | 10/2024 | Pankov |
| 2024/0385002 | A1 | 11/2024 | Pankov |
| 2024/0393122 | A1 * | 11/2024 | Pankov ............... B60W 40/105 |
| 2024/0393123 | A1 | 11/2024 | Pankov |
| 2024/0401959 | A1 | 12/2024 | Pankov |
| 2024/0410709 | A1 * | 12/2024 | Pankov .................. B60K 35/23 |
| 2024/0418521 | A1 | 12/2024 | Pankov |
| 2025/0012585 | A1 | 1/2025 | Pankov |
| 2025/0014467 | A1 | 1/2025 | Pankov |

FOREIGN PATENT DOCUMENTS

| | | |
|---|---|---|
| EP | 2614997 | 7/2013 |
| FR | 2811440 | 1/2002 |
| JP | 2001124575 | 5/2001 |
| JP | 2012208829 | 10/2012 |
| JP | 2015132613 | 7/2015 |
| KR | 101526431 | 6/2015 |
| RU | 2407060 | 8/2009 |
| RU | 2436163 | 7/2010 |
| RU | 2523192 | 1/2013 |
| RU | 2548649 | 10/2014 |
| RU | 2015103750 | 8/2016 |
| RU | 2681506 | 12/2017 |
| RU | 2741818 | 1/2021 |
| RU | 2764469 | 1/2022 |
| RU | 2764741 | 1/2022 |

(56)          References Cited

FOREIGN PATENT DOCUMENTS

| RU | 2765268 | 1/2022 |
| WO | 2010074668 | 7/2010 |
| WO | 2012039405 | 3/2012 |

OTHER PUBLICATIONS

Egor Kulik et al.: ""Estimation of the requirements for hybrid electric powertrain based on analysis of vehicle trajectory using GPS and accelerometer data"", 2018: https://ieeexplore.ieee.org/abstract/document/8321394.

Camiel J.J. Beckers et al.: ""Assessing the impact of cornering losses on the energy consumption of electric city buses"", 2020, https://www.sciencedirect.com/science/article/pii/S1361920920305472.

Irfan Ullah et al.: ""Electric vehicle energy consumption prediction using stacked generalization: an ensemble learning approach"", Feb. 26, 2021, https://www.tandfonline.com/doi/abs/10.1080/15435075.2021.1881902.

Bozorgi Amier et al.: ""A Time and Energy Efficient Routing Algorithm for Electric Vehicles Based on Historical Driving Data"", Nov. 2017, https://www.researchgate.net/publication/320953773_A_Time_and_Energy_Efficient_Routing_Algorithm_for_Electric_Vehicles_Based_on_Historical_Driving_Data.

Various Search Reports from the Russian Federal Institute of Industrial Property (with English translations).

European (EPO) Search Opinion for EP4026746.

Supplemental European (EPO) Search Report for EP4026746.

Gauthier, Porsche's Augmented Reality HUD Could Show The Ideal Racing Line and 'Ghost' Cars, Sep. 18, 2018, www.carscoops.com/2018/09/porches-augmented-reality-hud-show-ideal-racing-line-ghost-cars.

George, A Head-up Display For Your Car That Lets You Race Yourself, Oct. 27, 2014, www.wired.com/2014/10/hud-brings-ghost-cars-to-the-track.

GhostDash: Augmented Reality Ghost Car and HUD, Apr. 27, 2019, web.archive.org/web/20190427073619/https://www.kickstarter.com/projects/ghostdash/ghostdash-augmented-reality-ghost-car-and-hud.

U.S. Appl. No. 18/580,150 (Pankov), filed Jan. 17, 2024.
U.S. Appl. No. 18/580,536 (Pankov), filed Jan. 18, 2024.
U.S. Appl. No. 18/699,878 (Pankov), filed Apr. 9, 2024.
U.S. Appl. No. 18/720,636 (Pankov), filed Jun. 15, 2024.
U.S. Appl. No. 18/720,637 (Pankov), filed Jun. 15, 2024.
U.S. Appl. No. 18/720,638 (Pankov), filed Jun. 15, 2024.
U.S. Appl. No. 18/720,639 (Pankov), filed Jun. 15, 2024.
U.S. Appl. No. 18/833,275 (Pankov), filed Jul. 25, 2024.
U.S. Appl. No. 19/025,136 (Pankov), filed Jan. 16, 2025.
International Search Report and Written Opinion for PCT/RU2020/050245, Dec. 15, 2022.
International Search Report and Written Opinion for PCT/RU2020/050189, Dec. 10, 2020.
International Search Report and Written Opinion for PCT/RU2022/050066, Jul. 7, 2022.
International Search Report and Written Opinion for PCT/RU2022/050067, Jun. 30, 2022.
International Search Report and Written Opinion for PCT/RU2022/050111, Aug. 4, 2022.
International Search Report and Written Opinion for PCT/RU2022/050176, Oct. 13, 2022.
International Search Report and Written Opinion for PCT/RU2022/050361, Mar. 9, 2023.
International Search Report and Written Opinion for PCT/RU2022/050364, Mar. 2, 2023.
International Search Report and Written Opinion for PCT/RU2022/050400, May 11, 2023.
International Search Report and Written Opinion for PCT/RU2022/050401, May 18, 2023.

* cited by examiner

105

106

GENERATING A RESOURCE-EFFICIENT TRACK FOR A VEHICLE

FIELD OF INVENTION

The proposed invention relates to methods for controlling energy consumption by a motor vehicle and can be used in transportation industry.

BACKGROUND OF THE INVENTION

There is a known method for evaluating the fuel efficiency of a motor vehicle disclosed in patent KR101526431B1, published on 6 May 2015 on 12 sheets (D1). The method of D1 is implemented by a device for evaluating the fuel efficiency of a motor vehicle, the device comprising: a data collection unit that collects data on driving, as well status and identification data of a plurality of motor vehicles, including the first motor vehicle; a driving index calculator that calculates driving indexes of each motor vehicle based on their driving data; a means for extracting an analogous group that extracts a group of motor vehicles, which are similar to the first motor vehicle, from a plurality of motor vehicles, based on their driving indexes and status data; a means for fuel efficiency evaluation that evaluates the fuel efficiency of the first motor vehicle based on its driving data and identification data in the analogous group; and a means for controlling a motor vehicle that controls the method of steering the motor vehicle or the method for improving the driving of the first motor vehicle, based on the fuel efficiency evaluation. According to the invention, the fuel efficiency of a motor vehicle can be evaluated with precision taking into account driver's habits and the current condition of the vehicle. In addition, the method of steering the motor vehicle and the driving mode based on the assessment of the vehicle's fuel are provided to the driver, so that he/she can improve his/her driving efficiency and the efficiency of steering the motor vehicle, as well as reduce the cost of vehicle maintenance.

The method disclosed in D1 does not use the information on the specific portion of the route that was covered by the first motor vehicle, which reduces the accuracy of fuel consumption estimation. In addition, the method disclosed in D1 uses the information obtained from motor vehicles with similar specifications and similar driving mode only, which prevents the method from being used in a global fuel consumption control system comprising multiple motor vehicles with different specifications. In addition, the method disclosed in D1 is used to identify operational problems of motor vehicles that affect the fuel consumption levels and require certain vehicle parts to be repaired or replaced, and so this method cannot be used to change the motor vehicle driving mode in order to reduce the energy consumption on a given portion of the route. In addition, the solution disclosed in D1 does not propose any specific or special means or methods to generate a model of the motor vehicle moving in an urban area, particularly, environment containing mandatory deceleration points resulting from movement trajectories along corresponding portions of the route, actual or estimated presence of other motor vehicles, including on other portions of the route, and signals from the infrastructure of the portion of the route. The method disclosed in D1 can be considered the closest prior art to the claimed invention.

BRIEF SUMMARY OF THE INVENTION

The technical problem to be solved by the claimed invention is to provide a method, a device, a system, a motor vehicle, and a computer-readable medium that do not possess the drawbacks of the prior art and thus make it possible to generate an accurate resource-efficient track for a motor vehicle that allows to reduce resource consumption by the motor vehicle moving along a portion of the route that contains a mandatory deceleration point, including portions of the route that are located in urban areas.

The objective of the claimed invention is to overcome the drawbacks of the prior art and thus to reduce resource consumption by the motor vehicle moving along a portion of the route that contains a mandatory deceleration point, including portions of the route that are located in urban areas, as well as to improve traffic safety.

The objective of the present invention is achieved by a method for generating an resource-efficient track for the vehicle in operation moving along a portion of the route that contains a mandatory deceleration point, that is performed by the CPU of the computer device, the method comprising at least the following steps: collecting primary data, which involves obtaining data associated with the first motor vehicle, data associated with the portion of the route to be passed by the first motor vehicle, and data associated with the second motor vehicle, wherein the second motor vehicle is also a vehicle in operation and passes the portion of the route after the first motor vehicle, and wherein the data associated with the portion of the route include at least data associated with a mandatory deceleration point; collecting secondary data, which involves generating a track for the first motor vehicle, wherein said track is generated based on how the first motor vehicle passed the portion of the route using the data associated with a mandatory deceleration point; generating an estimated track for the vehicle in operation, wherein the estimated track for the second motor vehicle is generated based on the track generated for the first motor vehicle; wherein the track for the first motor vehicle is generated by performing the following steps: generating a speed profile of the first motor vehicle on the passed portion of the route, and evaluating resource efficiency of the first motor vehicle on the passed portion of the route; and wherein the data associated with a mandatory deceleration point include one of the following: data associated with a mandatory deceleration point on a portion of the route that is adjoined or intersected by another portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, and/or a combination thereof.

BRIEF DESCRIPTION OF THE DRAWINGS

Exemplary embodiments of the present invention are described in further detail below with references made to the attached drawings, included herein by reference.

DETAILED DESCRIPTION OF THE INVENTION

Figure 1:
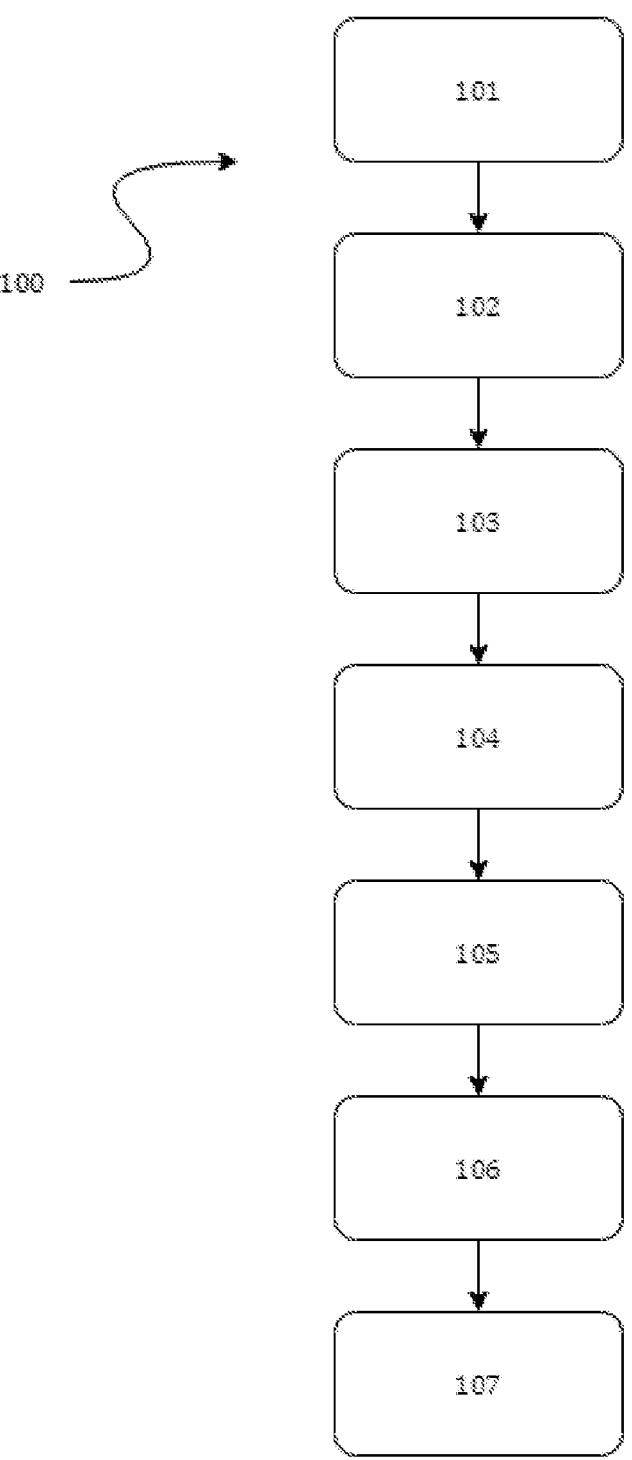
FIG. 1 illustrates an exemplary, non-limiting, diagram for the method 100 for generating an energy-efficient track for the motor vehicle.

According to a preferred embodiment of the present invention, there is provided the method for generating a resource-efficient track for the vehicle in operation moving along a portion of the route that contains a mandatory deceleration point, that is performed by the CPU of the computer device, the method comprising at least the following steps: collecting primary data, which involves obtaining data associated with the first motor vehicle, data associated with the portion of the route to be passed by the first motor vehicle, and data associated with the second motor vehicle, wherein the second motor vehicle is also a vehicle in operation and passes the portion of the route after the first motor vehicle, and wherein the data associated with the portion of the route include at least data associated with a mandatory deceleration point; collecting secondary data, which involves generating a track for the first motor vehicle, wherein said track is generated based on how the first motor vehicle passed the portion of the route using the data associated with a mandatory deceleration point; generating an estimated track for the vehicle in operation, wherein the estimated track for the second motor vehicle is generated based on the track generated for the first motor vehicle; wherein the track for the first motor vehicle is generated by performing the following steps: generating a speed profile of the first motor vehicle on the passed portion of the route, and evaluating resource efficiency of the first motor vehicle on the passed portion of the route; and wherein the data associated with a mandatory deceleration point include one of the following: data associated with a mandatory deceleration point on a portion of the route that is adjoined or intersected by another portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, and/or a combination thereof.

In an alternative embodiment of the present invention, there is provided the method characterized in that the data associated with the first and/or second motor vehicle may include at least one of the following: the type and model of the first motor vehicle, its mass, its aerodynamic characteristics, its wheel formula, its estimated and/or actual resource consumption and its estimated and/or actual VHI, data from its positioning sensors, weight sensors, and wheel speed sensors, and/or a combination thereof.

In an alternative embodiment of the present invention, there is provided the method characterized in that the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

In an alternative embodiment of the present invention, there is provided the method characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to cross said another portion of the road without stopping, when the first motor vehicle reaches the mandatory deceleration point, an estimated track for the first motor vehicle is generated, wherein the time that the first motor vehicle requires to pass said another portion of the road moving from the mandatory deceleration point to the end point of passing said another portion of the road is also calculated, and wherein the end point of passing said another portion of the road is not located on said another portion of the road and is located along the direction of movement of the first motor vehicle and along the trajectory that intersects said another portion of the road; and, based on the time calculation, an estimated speed profile of the first motor vehicle for the estimated track for the first motor vehicle is generated, wherein the estimated speed profile contains at least one of the following: the first motor vehicle moving through the mandatory deceleration point without changing its speed; the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the road; or the first motor vehicle moving through the mandatory deceleration point while increasing its speed so as to pass through said another portion of the route within the time limit that corresponds to the previously calculated time that the first motor vehicle requires to pass said another portion of the road.

In an alternative embodiment of the present invention, there is provided the method characterized in that the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof.

In an alternative embodiment of the present invention, there is provided the method characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is not allowed to cross said another portion of the road without stopping, when the first motor vehicle reaches the mandatory deceleration point, an estimated track for the first motor vehicle is generated, wherein the time when the traffic control means would again signal that it is allowed to intersect said another portion of the road without stopping is also calculated; and, based on the time calculation, the mandatory deceleration point is relocated so as to allow the first motor vehicle to move along the trajectory that intersects said another portion of the route without stopping, when the traffic control means signals that it is allowed to cross said another portion of the road without stopping.

In an alternative embodiment of the present invention, there is provided the method characterized in that the data associated with the portion of the route include at least data associated with several mandatory deceleration points, wherein the data associated with mandatory deceleration points are data associated with mandatory deceleration points on the portion of the route that are located, respectively, before other portions of the route intersecting said portion of the route, wherein the data obtained from traffic control means are associated with each respective other portion of the route, and wherein the steps of the method of claim 6 are performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

In an alternative embodiment of the present invention, there is provided the method characterized in that in case the data associated with the portion of the route to be passed by the first motor vehicle further include at least data associated with a motor vehicle located on said another portion of the route, a track for the motor vehicle located on said another portion of the route is generated, wherein said track contains at least data associated with said another portion of the route that motor vehicle is moving along, wherein the data associated with said another portion of the route include data associated with the trajectory of the motor vehicle moving along said another portion of the route, wherein the data associated with the portion of the route to be passed by the first motor vehicle further include data associated with the trajectory of the first motor vehicle, and wherein said trajectory data include data associated with an intersection between the first motor vehicle's trajectory and that of the motor vehicle moving along said another portion of the route, the mandatory deceleration point is relocated so as to prevent the first motor vehicle and the motor vehicle moving along said another portion of the route from reaching said intersection at the same time, while also enabling the first motor vehicle to move along its trajectory without stopping.

In an alternative embodiment of the present invention, there is provided the method characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

In an alternative embodiment of the present invention, there is provided the method characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

According to another preferred embodiment of the present invention, there is provided a computer-readable medium that stores the program code that, when implemented by the CPU of the computer device, induces the CPU to perform the steps according to any method for generating an resource-efficient track for the vehicle in operation moving along a portion of the route that contains a mandatory deceleration point.

According to one another preferred embodiment of the present invention, there is provided a system for generating an resource-efficient track for the vehicle in operation moving along a portion of the route that contains a mandatory deceleration point, the system comprising at least a server comprising a CPU and a memory that stores the program code that, when implemented, induces the server's CPU to perform the steps according to the method for generating an resource-efficient track for the vehicle in operation moving along a portion of the route that contains a mandatory deceleration point, the method comprising at least the following steps: collecting primary data, which involves obtaining data associated with the first motor vehicle, data associated with the portion of the route to be passed by the first motor vehicle, and data associated with the second motor vehicle, wherein the second motor vehicle is also a vehicle in operation and passes the portion of the route after the first motor vehicle, and wherein the data associated with the portion of the route include at least data associated with a mandatory deceleration point; collecting secondary data, which involves generating a track for the first motor vehicle, wherein said track is generated based on how the first motor vehicle passed the portion of the route using the data associated with a mandatory deceleration point; generating an estimated track for the second motor vehicle, wherein the estimated track for the second motor vehicle is generated based on the track generated for the first motor vehicle; wherein the track for the first motor vehicle is generated by performing the following steps: generating a speed profile of the first motor vehicle on the passed portion of the route, and evaluating resource efficiency of the first motor vehicle on the passed portion of the route; and wherein the data associated with a mandatory deceleration point include one of the following: data associated with a mandatory deceleration point on a portion of the route that is adjoined or intersected by another portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, and/or a combination thereof; and the system further comprising at least a vehicle in operation comprising at least a driving device and an engine that is connected to and actuates the driving device, and a motion control system of the vehicle in operation that is adapted to control the engine of the vehicle in operation and is connected to the server, the motion control system comprising at least a transceiver adapted at least to receive the estimated track for the second motor vehicle.

In an alternative embodiment of the present invention, there is provided the system characterized in that the data associated with the first and/or second motor vehicle may include at least one of the following: the type and model of the first motor vehicle, its mass, its aerodynamic characteristics, its wheel formula, its estimated and/or actual resource consumption and its estimated and/or actual VHI, data from its positioning sensors, weight sensors, and wheel speed sensors, and/or a combination thereof.

In an alternative embodiment of the present invention, there is provided the system characterized in that the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

In an alternative embodiment of the present invention, there is provided the system characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to cross said another portion of the road without stopping, when the first motor vehicle reaches the mandatory deceleration point, an estimated track for the first motor vehicle is generated, wherein the time that the first motor vehicle requires to pass said another portion of the road moving from the mandatory deceleration point to the end point of passing said another portion of the road is also calculated, and wherein the end point of passing said another portion of the road is not located on said another portion of the road and is located along the direction of movement of the first motor vehicle and along the trajectory that intersects said another portion of the road; and, based on the time calculation, an estimated speed profile of the first motor vehicle for the estimated track for the first motor vehicle is generated, wherein the estimated speed profile contains at least one of the following: the first motor vehicle moving through the mandatory deceleration point without changing its speed; the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the road; or the first motor vehicle moving through the mandatory deceleration point while increasing its speed so as to pass through said another portion of the route within the time limit that corresponds to the previously calculated time that the first motor vehicle requires to pass said another portion of the road.

In an alternative embodiment of the present invention, there is provided the system characterized in that the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof.

In an alternative embodiment of the present invention, there is provided the system characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is not allowed to cross said another portion of the road without stopping, when the first motor vehicle reaches the mandatory deceleration point, an estimated track for the first motor vehicle is generated, wherein the time when the traffic control means would again signal that it is allowed to intersect said another portion of the road without stopping is also calculated; and, based on the time calculation, the mandatory deceleration point is relocated so as to allow the first motor vehicle to move along the trajectory that intersects said another portion of the route without stopping, when the traffic control means signals that it is allowed to cross said another portion of the road without stopping.

In an alternative embodiment of the present invention, there is provided the system characterized in that the data associated with the portion of the route include at least data associated with several mandatory deceleration points, wherein the data associated with mandatory deceleration points are data associated with mandatory deceleration points on the portion of the route that are located, respectively, before other portions of the route intersecting said portion of the route, wherein the data obtained from traffic control means are associated with each respective other portion of the route, and wherein the steps of the method of claim 6 are performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

In an alternative embodiment of the present invention, there is provided the system characterized in that in case the data associated with the portion of the route to be passed by the first motor vehicle further include at least data associated with a motor vehicle located on said another portion of the route, a track for the motor vehicle located on said another portion of the route is generated, wherein said track contains at least data associated with said another portion of the route that motor vehicle is moving along, wherein the data associated with said another portion of the route include data associated with the trajectory of the motor vehicle moving along said another portion of the route, wherein the data associated with the portion of the route to be passed by the first motor vehicle further include data associated with the trajectory of the first motor vehicle, and wherein said trajectory data include data associated with an intersection between the first motor vehicle's trajectory and that of the motor vehicle moving along said another portion of the route, the mandatory deceleration point is relocated so as to prevent the first motor vehicle and the motor vehicle moving along said another portion of the route from reaching said intersection at the same time, while also enabling the first motor vehicle to move along its trajectory without stopping.

In an alternative embodiment, there is provided the system, characterized in that in case the data associated with the portion of the route to be passed by the first motor vehicle further include at least data associated with a motor vehicle on the portion of the route at the mandatory deceleration point or in its vicinity, a track for that motor vehicle is generated, and the mandatory deceleration point is relocated so as to generate an estimated track for the first motor vehicle that would correspond to the estimated track for the motor vehicle on the portion of the route at the mandatory deceleration point or in its vicinity, wherein the first motor vehicle is moving along the portion of the route at a lesser speed than the motor vehicle on the portion of the route at the mandatory deceleration point or in its vicinity.

In an alternative embodiment, there is provided the system, characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

In an alternative embodiment, there is provided the system, characterized in that the step of collecting primary data further involves collecting data associated with the portion of the route, along which the second motor vehicle is moving, wherein the data include at least one of the following: the geometry of the portion of the route, the route grade of the portion of the route, the allowed speed on the portion of the route, the quality of route surface of the portion of the route, speed limits on the portion of the route, turns on the portion of the route, weather conditions on the portion of the route, or its infrastructure, and/or a combination thereof.

In an alternative embodiment of the present invention, there is provided the system characterized in that the track for the first motor vehicle is generated by performing the following additional steps: refining the primary data associated with the first motor vehicle based on how it passed the portion of the route; refining the primary data associated with the portion of the route based on how it was passed by the first motor vehicle; wherein the refining of the primary data associated with the portion of the route is also based on the data obtained from the environmental sensors of the first motor vehicle.

In an alternative embodiment of the present invention, there is provided the system characterized in that the primary data associated with the first motor vehicle and the primary data associated with the portion of the route form an estimated track for the first motor vehicle, wherein such estimated track further contains an estimated speed profile of the first motor vehicle.

In an alternative embodiment, there is provided the system, characterized in that the estimated track for the first motor vehicle further contains data associated with an estimated acceleration point on the portion of the route, wherein the data associated with the mandatory deceleration point are estimated data associated with the mandatory deceleration point.

In an alternative embodiment, there is provided the system, characterized in that the track generated for the first motor vehicle further contains data associated with the actual acceleration point and/or data associated with the actual mandatory deceleration point determined based on how the first motor vehicle passed the given portion of the route.

In an alternative embodiment, there is provided the system, characterized in that the track generated for the first motor vehicle further contains the data on mismatches between the data associated with the actual acceleration point and/or data associated with the actual deceleration point and respective data associated with an estimated acceleration point and/or data associated with an estimated deceleration point.

In an alternative embodiment, there is provided the system, characterized in that the step of generating a track for the first motor vehicle further comprises a step of obtaining actual data on resource consumption by the first motor vehicle on the portion of the route.

In an alternative embodiment of the present invention, there is provided the system characterized in that the step of evaluating the resource efficiency of how the first motor vehicle passed the portion of the route involves comparing the estimated data on resource consumption by the first motor vehicle on the portion of the route with the actual data on resource consumption by the first motor vehicle on the portion of the route.

In an alternative embodiment of the present invention, there is provided the system characterized in that the estimated data on resource consumption by the first motor vehicle on the portion of the route are compared with the actual data on resource consumption by the first motor vehicle on the portion of the route taking into account the speed profile generated for the first motor vehicle.

In an alternative embodiment, there is provided the system, characterized in that when the first motor vehicle is passing through the portion of the route, its actual speed profile is determined in at least one moment in time, and in case the actual speed profile of the first motor vehicle deviates from its estimated speed profile, an resource consumption control signal is generated for the first motor vehicle, wherein the resource consumption control signal for the first motor vehicle is a signal for the motion control system of the first motor vehicle and/or the on-board information system of the first motor vehicle-a signal to decrease or increase the wheel speed of at least one wheel of the first motor vehicle.

According to one another preferred embodiment of the present invention, there is provided a device for generating an resource-efficient track for the vehicle in operation moving along a portion of the route that contains a mandatory deceleration point, the device comprising at least a CPU and a memory that stores the program code that, when implemented, induces the CPU to perform the steps according to the method for generating an resource-efficient track for the vehicle in operation moving along a portion of the route that contains a mandatory deceleration point, the method comprising at least the following steps: collecting primary data, which involves obtaining data associated with the first motor vehicle, data associated with the portion of the route to be passed by the first motor vehicle, and data associated with the second motor vehicle, wherein the second motor vehicle is also a vehicle in operation and passes the portion of the route after the first motor vehicle, and wherein the data associated with the portion of the route include at least data associated with a mandatory deceleration point; collecting secondary data, which involves generating a track for the first motor vehicle, wherein said track is generated based on how the first motor vehicle passed the portion of the route using the data associated with a mandatory deceleration point; generating an estimated track for the second motor vehicle, wherein the estimated track for the second motor vehicle is generated based on the track generated for the first motor vehicle; wherein the track for the first motor vehicle is generated by performing the following steps: generating a speed profile of the first motor vehicle on the passed portion of the route, and evaluating resource efficiency of the first motor vehicle on the passed portion of the route; and wherein the data associated with a mandatory deceleration point include one of the following: data associated with a mandatory deceleration point on a portion of the route that is adjoined or intersected by another portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, and/or a combination thereof.

In an alternative embodiment of the present invention, there is provided the device characterized in that the data associated with the first and/or second motor vehicle may include at least one of the following: the type and model of the first motor vehicle, its mass, its aerodynamic characteristics, its wheel formula, its estimated and/or actual resource consumption and its estimated and/or actual VHI, data from its positioning sensors, weight sensors, and wheel speed sensors, and/or a combination thereof.

In an alternative embodiment of the present invention, there is provided the device characterized in that the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

In an alternative embodiment of the present invention, there is provided the device characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to cross said another portion of the road without stopping, when the first motor vehicle reaches the mandatory deceleration point, an estimated track for the first motor vehicle is generated, wherein the time that the first motor vehicle requires to pass said another portion of the road moving from the mandatory deceleration point to the end point of passing said another portion of the road is also calculated, and wherein the end point of passing said another portion of the road is not located on said another portion of the road and is located along the direction of movement of the first motor vehicle and along the trajectory that intersects said another portion of the road; and, based on the time calculation, an estimated speed profile of the first motor vehicle for the estimated track for the first motor vehicle is generated, wherein the estimated speed profile contains at least one of the following: the first motor vehicle moving through the mandatory deceleration point without changing its speed; the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the road; or the first motor vehicle moving through the mandatory deceleration point while increasing its speed so as to pass through said another portion of the route within the time limit that corresponds to the previously calculated time that the first motor vehicle requires to pass said another portion of the road.

In an alternative embodiment of the present invention, there is provided the device characterized in that the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof.

In an alternative embodiment of the present invention, there is provided the device characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is not allowed to cross said another portion of the road without stopping, when the first motor vehicle reaches the mandatory deceleration point, an estimated track for the first motor vehicle is generated, wherein the time when the traffic control means would again signal that it is allowed to intersect said another portion of the road without stopping is also calculated; and, based on the time calculation, the mandatory deceleration point is relocated so as to allow the first motor vehicle to move along the trajectory that intersects said another portion of the route without stopping, when the traffic control means signals that it is allowed to cross said another portion of the road without stopping.

In an alternative embodiment of the present invention, there is provided the device characterized in that the data associated with the portion of the route include at least data associated with several mandatory deceleration points, wherein the data associated with mandatory deceleration points are data associated with mandatory deceleration points on the portion of the route that are located, respectively, before other portions of the route intersecting said portion of the route, wherein the data obtained from traffic control means are associated with each respective other portion of the route, and wherein the steps of the method of claim 6 are performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

In an alternative embodiment of the present invention, there is provided the device characterized in that in case the data associated with the portion of the route to be passed by the first motor vehicle further include at least data associated with a motor vehicle located on said another portion of the route, a track for the motor vehicle located on said another portion of the route is generated, wherein said track contains at least data associated with said another portion of the route that motor vehicle is moving along, wherein the data associated with said another portion of the route include data associated with the trajectory of the motor vehicle moving along said another portion of the route, wherein the data associated with the portion of the route to be passed by the first motor vehicle further include data associated with the trajectory of the first motor vehicle, and wherein said trajectory data include data associated with an intersection between the first motor vehicle's trajectory and that of the motor vehicle moving along said another portion of the route, the mandatory deceleration point is relocated so as to prevent the first motor vehicle and the motor vehicle moving along said another portion of the route from reaching said intersection at the same time, while also enabling the first motor vehicle to move along its trajectory without stopping.

In an alternative embodiment, there is provided the device, characterized in that in case the data associated with the portion of the route to be passed by the first motor vehicle further include at least data associated with a motor vehicle on the portion of the route at the mandatory deceleration point or in its vicinity, a track for that motor vehicle is generated, and the mandatory deceleration point is relocated so as to generate an estimated track for the first motor vehicle that would correspond to the estimated track for the motor vehicle on the portion of the route at the mandatory deceleration point or in its vicinity, wherein the first motor vehicle is moving along the portion of the route at a lesser speed than the motor vehicle on the portion of the route at the mandatory deceleration point or in its vicinity.

In an alternative embodiment, there is provided the device, characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

In an alternative embodiment, there is provided the device, characterized in that the step of collecting primary data further involves collecting data associated with the portion of the route, along which the second motor vehicle is moving, wherein the data include at least one of the following: the geometry of the portion of the route, the route grade of the portion of the route, the allowed speed on the portion of the route, the quality of route surface of the portion of the route, speed limits on the portion of the route, turns on the portion of the route, weather conditions on the portion of the route, or its infrastructure, and/or a combination thereof.

In an alternative embodiment of the present invention, there is provided the device characterized in that the track for the first motor vehicle is generated by performing the following additional steps: refining the primary data associated with the first motor vehicle based on how it passed the portion of the route; refining the primary data associated with the portion of the route based on how it was passed by the first motor vehicle; wherein the refining of the primary data associated with the portion of the route is also based on the data obtained from the environmental sensors of the first motor vehicle.

In an alternative embodiment of the present invention, there is provided the device characterized in that the primary data associated with the first motor vehicle and the primary data associated with the portion of the route form an estimated track for the first motor vehicle, wherein such estimated track further contains an estimated speed profile of the first motor vehicle.

In an alternative embodiment, there is provided the device, characterized in that the estimated track for the first motor vehicle further contains data associated with an estimated acceleration point on the portion of the route, wherein the data associated with the mandatory deceleration point are estimated data associated with the mandatory deceleration point.

In an alternative embodiment, there is provided the device, characterized in that the track generated for the first motor vehicle further contains data associated with the actual acceleration point and/or data associated with the actual mandatory deceleration point determined based on how the first motor vehicle passed the given portion of the route.

In an alternative embodiment, there is provided the device, characterized in that the track generated for the first motor vehicle further contains the data on mismatches between the data associated with the actual acceleration point and/or data associated with the actual mandatory deceleration point and respective data associated with an estimated acceleration point and/or data associated with an estimated mandatory deceleration point.

In an alternative embodiment, there is provided the device, characterized in that the step of generating a track for the first motor vehicle further comprises a step of obtaining actual data on resource consumption by the first motor vehicle on the portion of the route.

In an alternative embodiment of the present invention, there is provided the device characterized in that the step of evaluating the resource efficiency of how the first motor vehicle passed the portion of the route involves comparing the estimated data on resource consumption by the first motor vehicle on the portion of the route with the actual data on resource consumption by the first motor vehicle on the portion of the route.

In an alternative embodiment of the present invention, there is provided the device characterized in that the estimated data on resource consumption by the first motor vehicle on the portion of the route are compared with the actual data on resource consumption by the first motor vehicle on the portion of the route taking into account the speed profile generated for the first motor vehicle.

In an alternative embodiment, there is provided the device, characterized in that when the first motor vehicle is passing through the portion of the route, its actual speed profile is determined in at least one moment in time, and in case the actual speed profile of the first motor vehicle deviates from its estimated speed profile, an resource consumption control signal is generated for the first motor vehicle, wherein the resource consumption control signal for the first motor vehicle is a signal for the motion control system of the first motor vehicle and/or the on-board information system of the first motor vehicle-a signal to decrease or increase the wheel speed of at least one wheel of the first motor vehicle.

According to one another preferred embodiment of the present invention, there is provided a motor vehicle comprising at least a driving device and an engine that is connected to and actuates the driving device, and a motion control system of the motor vehicle that is adapted to control the engine of the motor vehicle and comprises at least a computer device for generating an resource-efficient track for the vehicle in operation moving along a portion of the route that contains a mandatory deceleration point, the device comprising at least a CPU and a memory that stores the program code that, when implemented, induces the CPU to perform the steps according to the method for generating an resource-efficient track for the vehicle in operation moving along a portion of the route that contains a mandatory deceleration point, the method comprising at least the following steps: collecting primary data, which involves obtaining data associated with the first motor vehicle, data associated with the portion of the route to be passed by the first motor vehicle, and data associated with the second motor vehicle, wherein the second motor vehicle is also a vehicle in operation and passes the portion of the route after the first motor vehicle, and wherein the data associated with the portion of the route include at least data associated with a mandatory deceleration point; collecting secondary data, which involves generating a track for the first motor vehicle, wherein said track is generated based on how the first motor vehicle passed the portion of the route using the data associated with a mandatory deceleration point; generating an estimated track for the second motor vehicle, wherein the estimated track for the second motor vehicle is generated based on the track generated for the first motor vehicle; wherein the track for the first motor vehicle is generated by performing the following steps: generating a speed profile of the first motor vehicle on the passed portion of the route, and evaluating resource efficiency of the first motor vehicle on the passed portion of the route; and wherein the data associated with a mandatory deceleration point include one of the following: data associated with a mandatory deceleration point on a portion of the route that is adjoined or intersected by another portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, and/or a combination thereof.

In an alternative embodiment of the present invention, there is provided the motor vehicle characterized in that the data associated with the first and/or second motor vehicle may include at least one of the following: the type and model of the first motor vehicle, its mass, its aerodynamic characteristics, its wheel formula, its estimated and/or actual resource consumption and its estimated and/or actual VHI, data from its positioning sensors, weight sensors, and wheel speed sensors, and/or a combination thereof.

In an alternative embodiment of the present invention, there is provided the motor vehicle characterized in that the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

In an alternative embodiment of the present invention, there is provided the motor vehicle characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to cross said another portion of the road without stopping, when the first motor vehicle reaches the mandatory deceleration point, an estimated track for the first motor vehicle is generated, wherein the time that the first motor vehicle requires to pass said another portion of the road moving from the mandatory deceleration point to the end point of passing said another portion of the road is also calculated, and wherein the end point of passing said another portion of the road is not located on said another portion of the road and is located along the direction of movement of the first motor vehicle and along the trajectory that intersects said another portion of the road; and, based on the time calculation, an estimated speed profile of the first motor vehicle for the estimated track for the first motor vehicle is generated, wherein the estimated speed profile contains at least one of the following: the first motor vehicle moving through the mandatory deceleration point without changing its speed; the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the road; or the first motor vehicle moving through the mandatory deceleration point while increasing its speed so as to pass through said another portion of the route within the time limit that corresponds to the previously calculated time that the first motor vehicle requires to pass said another portion of the road.

In an alternative embodiment of the present invention, there is provided the motor vehicle characterized in that the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof.

In an alternative embodiment of the present invention, there is provided the motor vehicle characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is not allowed to cross said another portion of the road without stopping, when the first motor vehicle reaches the mandatory deceleration point, an estimated track for the first motor vehicle is generated, wherein the time when the traffic control means would again signal that it is allowed to intersect said another portion of the road without stopping is also calculated; and, based on the time calculation, the mandatory deceleration point is relocated so as to allow the first motor vehicle to move along the trajectory that intersects said another portion of the route without stopping, when the traffic control means signals that it is allowed to cross said another portion of the road without stopping.

In an alternative embodiment of the present invention, there is provided the motor vehicle characterized in that the data associated with the portion of the route include at least data associated with several mandatory deceleration points, wherein the data associated with mandatory deceleration points are data associated with mandatory deceleration points on the portion of the route that are located, respectively, before other portions of the route intersecting said portion of the route, wherein the data obtained from traffic control means are associated with each respective other portion of the route, and wherein the steps of the method of claim 6 are performed for each mandatory deceleration point so as to allow the first motor vehicle to move along the trajectories that intersect the other portion of the route without stopping, when the traffic control means of each respective other portion of the route signal that it is allowed to cross said other portion of the road without stopping.

In an alternative embodiment of the present invention, there is provided the motor vehicle characterized in that in case the data associated with the portion of the route to be passed by the first motor vehicle further include at least data associated with a motor vehicle located on said another portion of the route, a track for the motor vehicle located on said another portion of the route is generated, wherein said track contains at least data associated with said another portion of the route that motor vehicle is moving along, wherein the data associated with said another portion of the route include data associated with the trajectory of the motor vehicle moving along said another portion of the route, wherein the data associated with the portion of the route to be passed by the first motor vehicle further include data associated with the trajectory of the first motor vehicle, and wherein said trajectory data include data associated with an intersection between the first motor vehicle's trajectory and that of the motor vehicle moving along said another portion of the route, the mandatory deceleration point is relocated so as to prevent the first motor vehicle and the motor vehicle moving along said another portion of the route from reaching said intersection at the same time, while also enabling the first motor vehicle to move along its trajectory without stopping.

In an alternative embodiment, there is provided the motor vehicle, characterized in that in case the data associated with the portion of the route to be passed by the first motor vehicle further include at least data associated with a motor vehicle on the portion of the route at the mandatory deceleration point or in its vicinity, a track for that motor vehicle is generated, and the mandatory deceleration point is relocated so as to generate an estimated track for the first motor vehicle that would correspond to the estimated track for the motor vehicle on the portion of the route at the mandatory deceleration point or in its vicinity, wherein the first motor vehicle is moving along the portion of the route at a lesser speed than the motor vehicle on the portion of the route at the mandatory deceleration point or in its vicinity.

In an alternative embodiment, there is provided the motor vehicle, characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

In an alternative embodiment, there is provided the motor vehicle, characterized in that the step of collecting primary data further involves collecting data associated with the portion of the route, along which the second motor vehicle is moving, wherein the data include at least one of the following: the geometry of the portion of the route, the route grade of the portion of the route, the allowed speed on the portion of the route, the quality of route surface of the portion of the route, speed limits on the portion of the route, turns on the portion of the route, weather conditions on the portion of the route, or its infrastructure, and/or a combination thereof.

In an alternative embodiment of the present invention, there is provided the motor vehicle characterized in that the track for the first motor vehicle is generated by performing the following additional steps: refining the primary data associated with the first motor vehicle based on how it passed the portion of the route; refining the primary data associated with the portion of the route based on how it was passed by the first motor vehicle; wherein the refining of the primary data associated with the portion of the route is also based on the data obtained from the environmental sensors of the first motor vehicle.

In an alternative embodiment of the present invention, there is provided the motor vehicle characterized in that the primary data associated with the first motor vehicle and the primary data associated with the portion of the route form an estimated track for the first motor vehicle, wherein such estimated track further contains an estimated speed profile of the first motor vehicle.

In an alternative embodiment, there is provided the motor vehicle, characterized in that the estimated track for the first motor vehicle further contains data associated with an estimated acceleration point on the portion of the route, wherein the data associated with the mandatory deceleration point are estimated data associated with the mandatory deceleration point.

In an alternative embodiment, there is provided the motor vehicle, characterized in that the track generated for the first motor vehicle further contains data associated with the actual acceleration point and/or data associated with the actual mandatory deceleration point determined based on how the first motor vehicle passed the given portion of the route.

In an alternative embodiment, there is provided the motor vehicle, characterized in that the track generated for the first motor vehicle further contains the data on mismatches between the data associated with the actual acceleration point and/or data associated with the actual mandatory deceleration point and respective data associated with an estimated acceleration point and/or data associated with an estimated mandatory deceleration point.

In an alternative embodiment, there is provided the motor vehicle, characterized in that the step of generating a track for the first motor vehicle further comprises a step of obtaining actual data on resource consumption by the first motor vehicle on the portion of the route.

In an alternative embodiment of the present invention, there is provided the motor vehicle characterized in that the step of evaluating the resource efficiency of how the first motor vehicle passed the portion of the route involves comparing the estimated data on resource consumption by the first motor vehicle on the portion of the route with the actual data on resource consumption by the first motor vehicle on the portion of the route.

In an alternative embodiment of the present invention, there is provided the motor vehicle characterized in that the estimated data on resource consumption by the first motor vehicle on the portion of the route are compared with the actual data on resource consumption by the first motor vehicle on the portion of the route taking into account the speed profile generated for the first motor vehicle.

In an alternative embodiment, there is provided the motor vehicle, characterized in that when the first motor vehicle is passing through the portion of the route, its actual speed profile is determined in at least one moment in time, and in case the actual speed profile of the first motor vehicle deviates from its estimated speed profile, a resource consumption control signal is generated for the first motor vehicle, wherein the resource consumption control signal for the first motor vehicle is a signal for the motion control system of the first motor vehicle and/or the on-board information system of the first motor vehicle-a signal to decrease or increase the wheel speed of at least one wheel of the first motor vehicle.

Additional alternative embodiments of the present invention are provided below. This disclosure is in no way limiting to the scope of protection granted by the present patent. Rather, it should be noted that the claimed invention can be implemented in different ways, so as to include different components and conditions, or combinations thereof, which are similar to the components and conditions disclosed herein, in combination with other existing and future technologies.

FIG. 1 illustrates an exemplary, non-limiting, diagram for the method 100 for generating an energy-efficient track for the motor vehicle, which is, according to the present non-limiting disclosure, the first energy-efficient track for a motor vehicle, which may be, but not limited to, as disclosed below, either the first motor vehicle, or the second motor vehicle, or the vehicle in operation. Preferably, but not limited to, the method 100 comprises the following steps: an optional step 101 of forming an estimated track for the first motor vehicle; an optional step 102 of adjusting the estimated track for the first motor vehicle; a step 103 of evaluating the passing of a portion of the route by the first motor vehicle; a step 104 of forming an estimated track for the vehicle in operation; an optional step 105 of adjusting the estimated track for the vehicle in operation; an optional step 106 of evaluating the passing of a portion of the route by the vehicle in operation; an optional step 107 of generating a track database. Preferably, but not limited to, the motor vehicle is any conventional motor vehicle, such as, but not limited to, a wheeled vehicle or a tracked vehicle, wherein the vehicle has to comprise at least one engine that consumes energy to actuate at least one moving device of the vehicle, such as, but not limited to, the wheels. The energy consumed by the engine is, for example, but not limited to, the energy produced by burning a fuel (in case the motor vehicle is equipped with an internal combustion engine), by electricity (in case the motor vehicle is equipped with an electric motor), or by a combination thereof (in case the motor vehicle is a hybrid vehicle). The first motor vehicle is a motor vehicle that passes the portion of the route first. The second motor vehicle is a motor vehicle that passes the portion of the route after the first motor vehicle. The vehicle in operation is either the second motor vehicle or any of the motor vehicles that pass portion of the route later than the second motor vehicle and, respectively, later than the first motor vehicle. While some of the methods disclosed below are intended to be implemented as part of the motion control system of the vehicle in operation, or in connection thereto, it should be obvious to a person having ordinary skill in the art that the disclosed methods may also be implemented as part of systems or devices that are not connected to the vehicle in operation or are indirectly connected to it, as well as in computer simulations. Preferably, but not limited to, the motor vehicles are controlled via a corresponding motor vehicle control system (a motor vehicle's control system) that comprises a set of interconnected units and components configured so that the motor vehicle can be controlled by an operator, i.e. a driver, an autonomous control system, a remote user, or a remote control system, in order to drive the motor vehicle, to stop its movement, to change the direction of its movement, to change its speed, etc. Motor vehicle control systems are widely known, and therefore are not described any further, however, preferably, but not limited to, the claimed motor vehicle control system has to comprise a speed control element of the motor vehicle, the component being one of the following or any suitable combination thereof: an accelerator pedal of the vehicle in operation, a brake pedal of the vehicle in operation, a retarder of the vehicle in operation, an intarder of the vehicle in operation, a compression brake of the vehicle in operation, a decompression brake of the vehicle in operation, or a gearbox of the vehicle in operation. Preferably, but not limited to, these elements, as well as other components of the motion control system should be equipped with a variety of sensors (such as, but not limited to, contact and contactless position sensors, encoders, induction sensors, magnetoresistive sensors, volumetric flow meters, capacitive sensors, oxygen sensors, nitrogen oxide sensors, temperature sensors, pressure sensors, knock sensors, oil level sensors, light level sensors, rain sensors, as well as various environmental sensors, such as, but not limited to, radars, lidars, cameras, global positioning sensors, odometry sensors, gyrostabilizers) allowing to read the state of each component at any given moment in time, to locate the motor vehicle at any given moment in time, and to read its health and other parameters at any given moment in time. Preferably, but not limited to, the sensors have to be adapted to digital data output. These sensors, as well as the methods for obtaining useful information from them, are widely known in the art, and therefore are not described in further detail. Preferably, but not limited to, the motion control system further comprises any kind of a braking electric recuperation system that can be used to replenish electric energy accumulated and spent by the systems in the motor vehicle. Such braking electric recuperation systems are widely known in the art (see e.g., U.S. Pat. Nos. 7,739,005B1 and 8,453,770B2 included herein by reference) and therefore are not described in further detail. Preferably, but not limited to, the motor vehicle control system further comprises any kind of electronic devices capable of computation, such as a vehicle dashboard; a device for projecting visual information onto the windshield of the motor vehicle; a device for projecting visual information onto a head-up display (HUD); a head unit; a user device, also a wearable user device, for receiving and transmitting data (e.g. a transceiver), and for producing a GUI (e.g. a dashboard display); a display of the device for projecting visual information onto the windshield of the motor vehicle; a HUD of the device for projecting visual information onto a head-up display (HUD); a display of the head unit; a display of the user device, also a HUD of the wearable user device; a device for producing audio signals (e.g. speakers). Preferably, but not limited to, the electronic devices capable of computation comprise at least a CPU and a memory that stores the program code that, when implemented, induces the CPU to perform the steps according to some method performed by the CPU. For example, but not limited to, the CPU and memory may be the main CPU and memory of the motor vehicle control system implemented as a central controller. Preferably, but not limited to, the vehicle dashboard comprises the aforementioned CPU and memory, and/or communicates with the aforementioned central controller. Preferably, but not limited to, the device for projecting visual information onto the windshield of the motor vehicle comprises the aforementioned CPU and memory, and/or communicates with the aforementioned central controller. Preferably, but not limited to, the device for projecting visual information onto a HUD comprises the aforementioned CPU and memory, and/or communicates with the aforementioned central controller. Preferably, but not limited to, the head unit of the motor vehicle comprises the aforementioned CPU and memory, and/or communicates with the aforementioned central controller. Preferably, but not limited to, the user device communicates with the motor vehicle control system via conventional data exchange protocols and comprises the aforementioned CPU and memory, and/or communicates with the aforementioned central controller via conventional data exchange protocols. For example, but not limited to, the user device may be represented by a smartphone, a PDA, a tablet, a netbook, a laptop, etc. For example, but not limited to, the user device may be represented by a wearable user device, such as, for instance, a wearable display device as disclosed by the U.S. Pat. No. 10,176,783B2, included herein by reference, or a similar one. When the user device is a wearable user device, it should be preferably, but not limited to, equipped by a HUD capable of displaying visual information. Preferably, but not limited to, the aforementioned dashboard, head unit, and the device for projecting visual information onto the windshield of the motor vehicle should comprise a corresponding display capable of visual information output, or be somehow connected to such display. Preferably, but not limited to, the aforementioned device for projecting visual information onto a HUD should comprise a corresponding HUD capable of visual information output, or be somehow connected to such display. Preferably, but not limited to, the computer devices mentioned in the present disclosure are generally any suitable computer devices that comprise at least a CPU and a memory, particularly, but not limited to, the claimed electronic devices capable of computation, the user device and the server of the system for generating an energy-efficient track for the vehicle in operation. Preferably, but not limited to, the control system of the motor vehicle may be connected via a transceiver with the user device, the server of the system for generating the energy-efficient track, other servers and control systems of other motor vehicles, but not limited to. Preferably, but not limited to, the generated estimated and/or energy-efficient tracks for each motor vehicle can be used to generate a control signal to control the movement of the corresponding motor vehicle, and/or used to generate an information signal to inform a human operator that it is necessary to change the movement of the corresponding motor vehicle.

Preferably, but not limited to, the portion of the route is a portion of the route with special properties. A route is, but not limited to, a strip of land adapted to be passable by motor vehicles, wherein the route may comprise, but not limited to, a road, a junction, an intersection, etc. A road may be, but not limited to, a paved road or a dirt road. Preferably, but not limited to, the special properties of the portion of the route may comprise at least one of the following: the geometry of the portion of the route, the road grade of the portion of the route, the allowed speed on the portion of the route, the quality of road surface of the portion of the route, speed limits on the portion of the route, turns on the portion of the route, weather conditions on the portion of the route at the moment it is passed by a motor vehicle, the infrastructure of the portion of the road, or a combination thereof. For example, but not limited to, the special properties of the portion of the route may be marked by acceleration points and/or deceleration points. In addition, but not limited to, a deceleration point may be a point on the portion of the route, in which the momentum of the motor vehicle is sufficient to cover the distance to an acceleration point on the portion of the route. In addition, but not limited to, a deceleration point may be a point on the portion of the route, in which the motor vehicle has to be given negative or zero acceleration in order to smoothly reach the acceleration point, wherein the negative acceleration may be such that the motor vehicle has zero momentum at the acceleration point. In addition, but not limited to, an acceleration point may be a point on the portion of the route, in which the motor vehicle continues to move with negative acceleration. In addition, but not limited to, an acceleration point may be a point on the portion of the route, in which the motor vehicle has zero momentum. For example, but not limited to, a portion of the route may comprise a road with a slope and an upslope that follows it, wherein the beginning of the slope may be marked by a deceleration point, and an acceleration point may be placed within the upslope.

Figure 2:
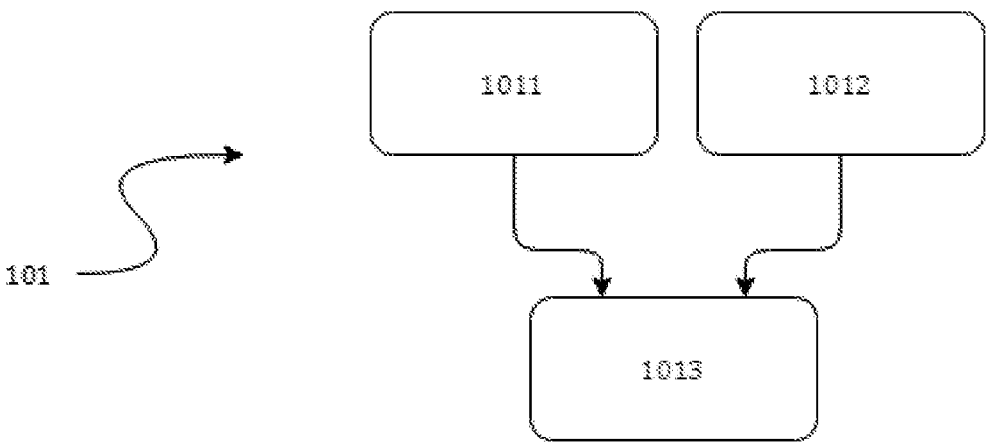
FIG. 2 illustrates an exemplary, non-limiting, diagram for the step 101 of generating an estimated track for the first motor vehicle.

As shown in FIG. 2, the optional step 101 of generating an estimated track for the first motor vehicle, for example, but not limited to, comprises the following steps: a step 1011 of identifying the first motor vehicle; a step 1012 of identifying the portion of the route; and a step 1013 of generating an estimated track for the first motor vehicle. For example, but not limited to, the step 1011 involves determining the first motor vehicle and the data associated with it. Such data may include, for example, but not limited to, at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof. In general, it should be noted that such data may be used to generate an estimated speed profile of the first motor vehicle on a given portion of the route. The step 1011 further involves determining the location of the first motor vehicle relative to the portion of the route that is identified in the step 1012. In addition, for example, but not limited to, the step 1012 involves determining the first portion of the route along the direction of movement of the first motor vehicle, relative to its location. The step 1012 further involves determining the special properties of the portion of the route, which are data associated with the portion of the route to be passed by the first motor vehicle. In general, it should be noted that the data about the special properties of the portion of the route may be used to generate an estimated speed profile of the first motor vehicle on this portion of the route. In addition, for example, but not limited to, the step 1013 involves generating an estimated track for the first motor vehicle on the portion of the route using the data associated with the first motor vehicle and the data associated with the portion of the route to be passed by the first motor vehicle. Therefore, the generated estimated track for the first motor vehicle contains both the data associated with the first motor vehicle and the data associated with the portion of the route to be passed by the first motor vehicle. Preferably, but not limited to, the generated estimated track for the first motor vehicle further contains the estimated speed profile of the first motor vehicle, which, in turn, contains at least estimated locations of the first motor vehicle on the portion of the route and estimated speeds of the first motor vehicle on the portion of the route associated with said estimated locations. The estimated speed profile of the first motor vehicle further contains, but not limited to, estimated states of the speed control element of the first motor vehicle, which is one of the following: the accelerator pedal of the first motor vehicle, its brake pedal, its retarder, its intarder, its compression brake, decompression brake, its gearbox, or a combination thereof; wherein the state of the speed control element, according to the present disclosure, comprises the positions of the moving parts of the corresponding control element in its active state, i.e. relative to the state, in which the corresponding element is not activated, and/or any other active state of the element, and/or any other non-active state of the element; and wherein the estimated states of the control element are also associated with the corresponding estimated location of the motor vehicle on the portion of the route. Subsequently, the first motor vehicle moves along the given portion of the route in accordance with the estimated track for the first motor vehicle, wherein it is assumed that the estimated track is energy efficient. A motor vehicle track can be considered energy efficient in case both the time spent by the motor vehicle to pass the portion of the route and the energy consumed by the motor vehicle to pass the portion of the route are minimal. However, it should be obvious to a person having ordinary skill in the art that the estimated track for the first motor vehicle, generated in step 101, may be also generated using alternative ways.

Figure 3:
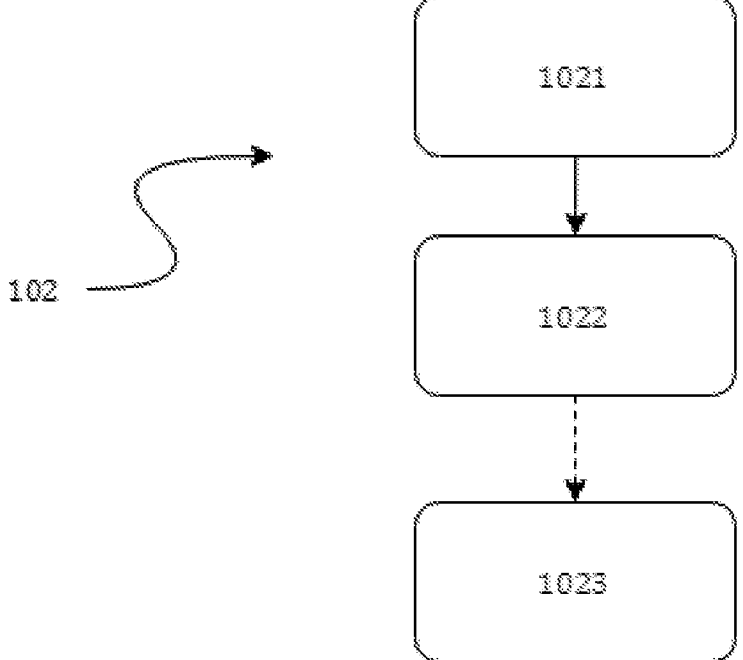
FIG. 3 illustrates an exemplary, non-limiting, diagram for the step 102 of adjusting the estimated track for the first motor vehicle.

As shown in FIG. 3, the optional step 102 of adjusting the estimated track for the first motor vehicle, for example, but not limited to, comprises the following steps: a step 1021 of determining the actual speed profile of the first motor vehicle in at least one of the moments when it passes the portion of the route; a step 1022 of comparing the actual speed profile with the corresponding estimated speed profile from the estimated track for the first motor vehicle; and, if necessary, a step 1023 of adjusting the actual speed profile in response to the results of said comparison. For example, but not limited to, the step 1021 involves determining the location of the first motor vehicle on the portion of the route, together with at least a single wheel speed of the first motor vehicle in the specified moment in time. In addition, for example, but not limited to, the step 1022 involves determining the estimated wheel speed of at least a single wheel of the first motor vehicle in the specified moment in time, as well as matching the actual wheel speed and the estimated wheel speed. In addition, for example, but not limited to, in case the actual wheel speed differs from the estimated wheel speed, an energy consumption control signal is generated for the first motor vehicle in step 1023. This energy consumption control signal, for example, but not limited to, contains a control signal for the motion control system of the first motor vehicle, which changes the operation of the engine, and/or the brake system, and/or other technical components of the first motor vehicle, so that the actual wheel speed matches the estimated wheel speed in the specified moment in time. However, it should be obvious to a person having ordinary skill in the art that although the adjustment of the estimated track for the first motor vehicle enhances the accuracy of the subsequent generation of the energy-efficient track for the vehicle in operation thus allowing to reduce energy consumption by the vehicle in operation on a specific portion of the route, said adjustment is optional, since the actual track of the first motor vehicle, which is generated according to the method described below, may be sufficient for generating an accurate energy-efficient track for the vehicle in operation.

Figure 4:
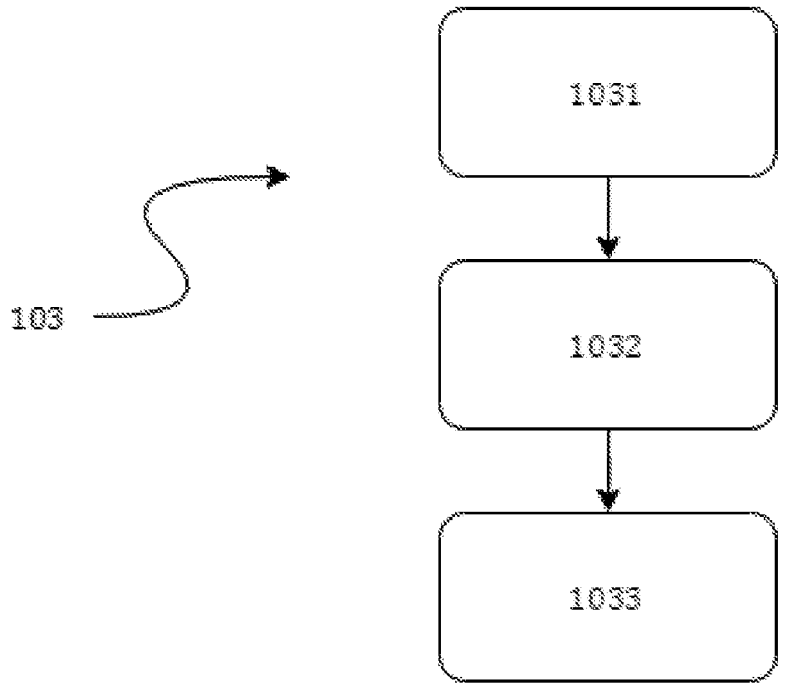
FIG. 4 illustrates an exemplary, non-limiting, diagram for the step 103 of evaluating the passing of a portion of the route by the first motor vehicle.

As shown in FIG. 4, the step 103 of evaluating the passing of a portion of the route by the first motor vehicle, which is also a step of collecting secondary data, comprises, but not limited to, the following steps: a step 1031 of collecting secondary data associated with the first motor vehicle and/or secondary data associated with the portion of the route passed by the first motor vehicle; a step 1032 of generating a track for the first motor vehicle; and a step 1033 of evaluating energy efficiency of the track of the first motor vehicle. For example, but not limited to, the step 1031 of collecting secondary data involves determining the fact of passing the portion of the route by the first motor vehicle, for example, but not limited to, based on the location of the first motor vehicle relative to the boundaries of the portion of the route, as well as (optionally) refining the data associated with the first motor vehicle and/or the portion of the route. In general, it should be noted that, in this step, the actual data associated with the first motor vehicle and/or the portion of the route it has passed are collected. In general, it should be noted that such data may be used to generate the actual track of the first motor vehicle, based on how it passed a given portion of the route. It should also be noted that refined data associated with the first motor vehicle and/or the portion of the route can be used to evaluate energy efficiency of the track generated for the first motor vehicle. In addition, for example, but not limited to, the step 1032 is the same as the step 1012, apart from the fact that the secondary data collected in step 1031 can be used to generate a track for the first motor vehicle along with the primary data associated with the first motor vehicle and/or the portion of the route. Thus, the actual track for the first motor vehicle generated in step 1032 also contains the actual data associated with the first motor vehicle, including, but not limited to, the actual speed profile of the first motor vehicle on the portion of the route and the actual data associated with the portion of the route. In addition, but not limited to, the actual speed profile of the first motor vehicle contains, but not limited to, actual locations of the first motor vehicle on the portion of the route and its actual speeds on the portion of the route that are associated with its actual locations on the portion of the route, as well as actual states of the speed control elements of the first motor vehicle, which are also associated with its actual locations on the portion of the route. In addition, for example, but not limited to, the step 1033 involves evaluating energy efficiency of the track generated for the first motor vehicle. In general, it should be noted that the track generated for the first motor vehicle will be considered energy efficient in case both the time spent by the first motor vehicle to pass the portion of the route and the energy consumed by the first motor vehicle to pass the portion of the route are minimal. Thus, it should be noted that, in step 1033, energy efficiency of the estimated track for the first motor vehicle is compared to that of the track generated for the first motor vehicle. It should also be noted that in case the track generated for the first motor vehicle is more energy-efficient than the estimated track for the first motor vehicle, then the estimated track for the vehicle in operation is generated using the generated (actual) track, even if it is different from the estimated track for the first motor vehicle. Otherwise, it should be noted that the estimated track for the vehicle in operation is also generated based on the actual track for the first motor vehicle, taking into account the secondary data associated with the first motor vehicle and/or the portion of the route passed by it. In addition, the estimated track for the first motor vehicle can also be adjusted based on how the first motor vehicle passed the given portion of the route, using the refined data associated with the first motor vehicle and/or the portion of the route. In this case, energy efficiency of the generated estimated track for the first motor vehicle is evaluated relative to the adjusted estimated track for the first motor vehicle. In general, it should be noted that the estimated track to be generated for the vehicle in operation has to be energy efficient, and it has to be generated taking into account the properties of the actual track of the first motor vehicle. However, it should be obvious to a person having ordinary skill in the art that the estimated track for the first motor vehicle, as was mentioned above, can be any estimated track for the first motor vehicle that contains the data associated with the first motor vehicle and the data associated with the portion of the route to be passed by the first motor vehicle, including, but not limited to, the estimated track for the first motor vehicle that was adjusted in step 102.

Figure 5:
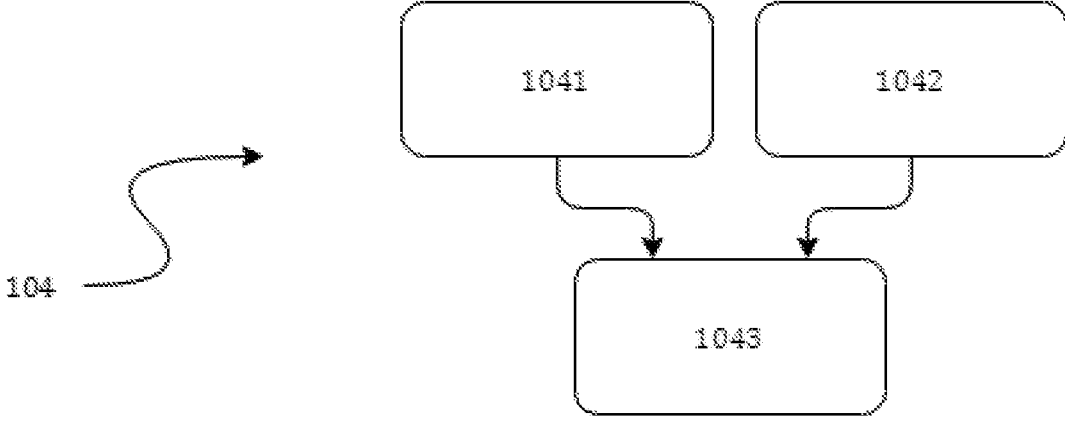
FIG. 5 illustrates an exemplary, non-limiting, diagram for the step 104 of generating an estimated track for the second motor vehicle.

As will be demonstrated below, the steps of generating estimated and/or energy-efficient tracks for the second motor vehicle, as well as for any of the following motor vehicles to pass the portion of the route after the first motor vehicle, are essentially the same and may be interchangeable. For example, without limitation, generation of estimated and/or energy-efficient tracks for the vehicle in operation will be demonstrated, however, as was mentioned above, it should be obvious to a person having ordinary skill in the art that the aforementioned methods can be used to generate corresponding tracks for any motor vehicle that is to pass the given portion of the route after the first motor vehicle. As shown in FIG. 5, the step 104 of generating an estimated track for the vehicle in operation comprises the following steps: a step 1041 of identification the first motor vehicle; a step 1042 of identifying the portion of the route; and a step 1043 of generating an estimated track for the first motor vehicle. For example, but not limited to, the step 1041 is the same as the step 1011, apart from the fact that the collected data associated with the vehicle in operation are not the data associated with the first motor vehicle. In addition, for example, but not limited to, depending on the collected data associated with the vehicle in operation, an additional adaptation coefficient, or any other normalization methods may be used, in case the data associated with the vehicle in operation differ from any of the data associated with the first motor vehicle. In addition, for example, but not limited to, in the same step, the data of the portion of the route may also be refined, in case they can be refined without using the data from the track for the first motor vehicle, such as, but not limited to, weather data associated with the portion of the route, which will be relevant at the moment the vehicle in operation passes the given portion of the route, as well as infrastructure data of the portion of the route. In general, it should be noted that the first motor vehicle and the vehicle in operation are different, and therefore energy efficiency of their tracks on a given portion of the route should also be evaluated differently, preferably, but not limited to, in the way of adapting their values to the normalized values. In addition, for example, but not limited to, the step 1042 is the same as the step 1012, apart from the fact that, when collecting the data associated with the portion of the route, the refined data associated with the portion of the route from the track generated for the first motor vehicle are also collected. In general, it should be noted that, in step 1042, the collected data associated with the portion of the route will be more accurate than the similar data from the estimated track for the first motor vehicle. In addition, for example, but not limited to, the step 1043 is the same as the step 1013, apart from the fact that the data from the track generated for the first motor vehicle are collected (and, optionally, normalized) along with the data associated with the first motor vehicle and/or the portion of the route, which are also collected and, optionally, normalized. In general, it should be noted that, in step 1043, there is generated an estimated track for the vehicle in operation that takes into account both the properties of the portion of the route or the characteristics of the vehicle in operation and how the first motor vehicle passed the portion of the route. Preferably, but not limited to, the generated estimated track for the vehicle in operation further contains the estimated speed profile of the vehicle in operation, which, in turn, contains at least estimated locations of the vehicle in operation on the portion of the route and estimated speeds of the vehicle in operation on the portion of the route associated with said estimated locations. The estimated speed profile of the vehicle in operation further contains, but not limited to, estimated states of the speed control element of the vehicle in operation, which is one of the following: the accelerator pedal of the first motor vehicle, its brake pedal, its retarder, its intarder, its compression brake, decompression brake, its gearbox, or a combination thereof; wherein the state of the speed control element, according to the present disclosure, comprises the positions of the moving parts of the corresponding control element in its active state, i.e. relative to the state, in which the corresponding element is not activated, and/or any other active state of the element, and/or any other non-active state of the element; and wherein the estimated states of the control element are also associated with the corresponding estimated location of the vehicle in operation on the portion of the route. In addition, but not limited to, as was shown above, the speed profile of the vehicle in operation may be normalized according to the data associated with the first motor vehicle. In addition, but not limited to, the speed profile of the vehicle in operation can be adjusted in advance based on the actual speed profile of the first motor vehicle, depending on the refined data associated with the portion of the route. More specifically, but not limited to, in step 1013, the properties of the portion of the route could not be considered with sufficient accuracy, since there were no actual data associated with the portion of the route, such as, but not limited to, the quality of pavement or temporary obstacles, and due to that fact the estimated track for the first motor vehicle could not possibly be energy efficient. In general, it should be noted that the estimated track for the first motor vehicle was generated using the data provided by the motor vehicle itself and external data sources only. However, but not limited to, based on how the first motor vehicle passed the given portion of the route, the track generated for the first motor vehicle can be significantly different from the estimated track for the first motor vehicle, for example, because the operator or the motion control system of the first motor vehicle were constantly assessing the situation on the portion of the route, which allowed the vehicle to pass it with higher energy efficiency than that of the estimated track, including by means of adjusting the estimated track. Thus, the estimated track generated for the vehicle in operation has by any means, not necessarily due to normalization, higher energy efficiency than the estimated track for the first motor vehicle. As will be shown below in the present disclosure, it is the estimated track generated for the vehicle in operation that becomes the pre-generated energy-efficient track for the vehicle in operation.

Figure 6:
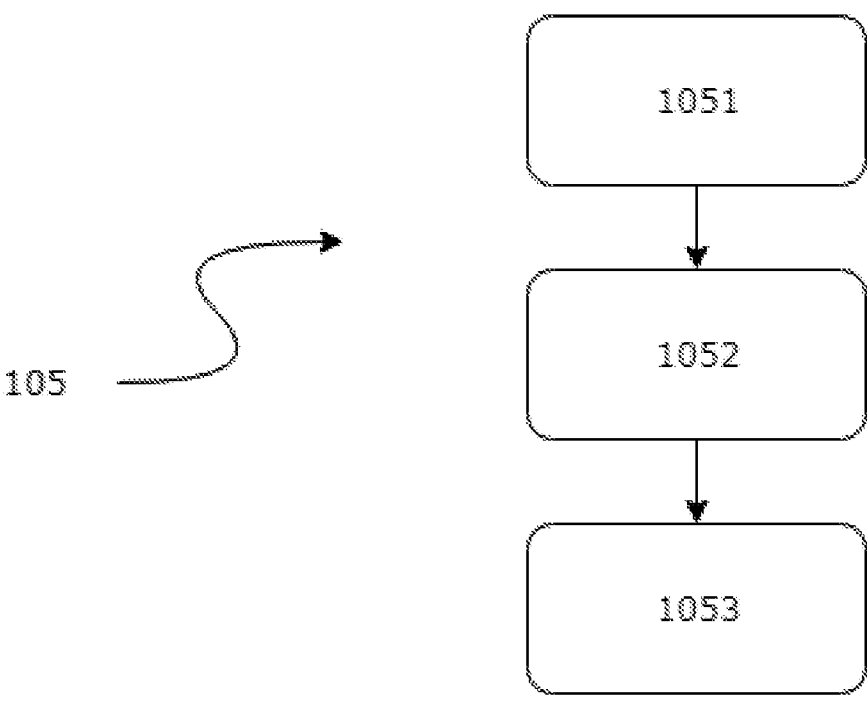
FIG. 6 illustrates an exemplary, non-limiting, diagram for the step 105 of adjusting the estimated track for the second motor vehicle.

As shown in FIG. 6, the optional step 105 of adjusting the estimated track for the vehicle in operation, for example, but not limited to, comprises the following steps: a step 1051 of determining the actual speed profile of the vehicle in operation in at least one of the moments when it passes the portion of the route; a step 1052 of comparing the actual speed profile with the corresponding estimated speed profile from the estimated track for the vehicle in operation; and, if necessary, a step 1053 of adjusting the actual speed profile in response of the vehicle in operation to the results of said comparison. For example, but not limited to, the step 1051 involves determining the location of the vehicle in operation on the portion of the route, together with at least a single wheel speed of the second motor vehicle in the specified moment in time. In addition, for example, but not limited to, the step 1052 involves determining the estimated wheel speed of at least a single wheel of the vehicle in operation in the specified moment in time, as well as matching the actual wheel speed and the estimated wheel speed. In addition, for example, but not limited to, in case the actual wheel speed differs from the estimated wheel speed, an energy consumption control signal is generated for the second motor vehicle in step 1053. This energy consumption control signal, for example, but not limited to, contains a control signal for the motion control system of the second motor vehicle, which changes the operation of the engine, and/or the brake system, and/or other technical components of the second motor vehicle, so that the actual wheel speed matches the estimated wheel speed in the specified moment in time. However, it should be obvious to a person having ordinary skill in the art that although the adjustment of the estimated track for the vehicle in operation enhances the accuracy of the subsequent generation of the energy-efficient track for the following motor vehicles thus allowing to reduce energy consumption by the following motor vehicles on a specific portion of the route, said adjustment is optional, since the step 103 described above may be sufficient for generating accurate energy-efficient tracks for the following motor vehicles.

Figure 7:
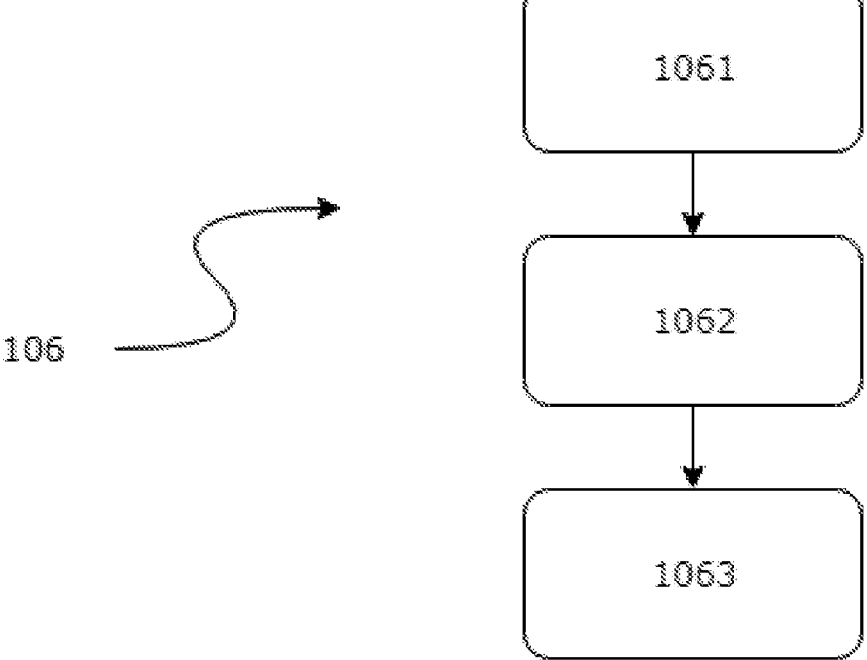
FIG. 7 illustrates an exemplary, non-limiting, diagram for the step 106 of evaluating the passing of a portion of the route by the second motor vehicle.

As shown in FIG. 7, the optional step 106 of evaluating the passing of a portion of the route by the vehicle in operation involves, for example, but not limited to, the following steps: a step 1061 of collecting secondary data associated with the vehicle in operation and/or secondary data associated with the portion of the route passed by the vehicle in operation; a step 1062 of generating an actual track for the vehicle in operation; and a step 1063 of evaluating energy efficiency of the track of the vehicle in operation. For example, but not limited to, the step 1061 of collecting secondary data involves determining the fact of passing the portion of the route by the vehicle in operation, for example, but not limited to, based on the location of the vehicle in operation relative to the boundaries of the portion of the route and/or relative to the location of the first motor vehicle at the moment of determining the fact of passing, as well as (optionally) refining the data associated with the vehicle in operation and/or the portion of the route. In general, it should be noted that, in this step, the actual data associated with the vehicle in operation and/or the portion of the route it has passed are collected. In general, it should be noted that such data may be used to generate the actual track of the vehicle in operation, based on how it passed a given portion of the route. It should also be noted that refined data associated with the vehicle in operation and/or the portion of the route can be used to evaluate energy efficiency of the actual track generated for the vehicle in operation. In addition, for example, but not limited to, the step 1062 is the same as the step 1032, apart from the fact that the secondary data collected in step 1061 can be used to generate the actual track for the vehicle in operation along with the primary data associated with the first motor vehicle and/or the portion of the route, and along with the secondary data collected in step 1032. Thus, the actual track for the vehicle in operation generated in step 1062 also contains the actual data associated with the vehicle in operation, including the actual speed profile of the vehicle in operation on the portion of the route and the actual data associated with the portion of the route, wherein these data may optionally be normalized relative to the data collected in step 1032. In addition, for example, but not limited to, the step 1063 involves evaluating energy efficiency of the track generated for the vehicle in operation. In general, it should be noted that the track generated for the vehicle in operation will be considered energy efficient in case both the time spent by the vehicle in operation to pass the portion of the route and the energy consumed by the vehicle in operation to pass the portion of the route are minimal. Thus, it should be noted that, in step 1063, energy efficiency of the estimated track for the vehicle in operation is compared to that of the actual track generated for the vehicle in operation. It should also be noted that in case the actual track for the vehicle in operation is more energy-efficient than the estimated track for the vehicle in operation, then the estimated track for any of the following motor vehicles is generated using the generated (actual) track for the vehicle in operation, even if it is different from the estimated track for the vehicle in operation, wherein the following motor vehicle is any motor vehicle that is to pass the given portion of the route after the vehicle in operation. Otherwise, it should be noted that the estimated track for the following motor vehicle is also generated based on the actual track for the vehicle in operation, taking into account the secondary data associated with the vehicle in operation and/or the portion of the route passed by it. In addition, the estimated track for the vehicle in operation can also be adjusted based on how the vehicle in operation passed the given portion of the route, using the refined data associated with the vehicle in operation and/or the portion of the route. In this case, energy efficiency of the generated estimated track for the vehicle in operation is evaluated relative to the adjusted estimated track for the vehicle in operation. In general, it should be noted that the estimated track to be generated for the following motor vehicle has to be energy efficient, and it has to be generated taking into account the properties of the actual track of the vehicle in operation. However, it should be obvious to a person having ordinary skill in the art that although the evaluation of how the vehicle in operation passes a given portion of the route enhances the accuracy of the subsequent generation of the energy-efficient tracks for the following motor vehicles thus allowing to reduce energy consumption by these motor vehicles on a specific portion of the route, said evaluation is optional, since the aforementioned estimated track for the vehicle in operation, or even the aforementioned estimated track for the vehicle in operation, may be sufficient for subsequent generation of a model energy-efficient track for any of the following motor vehicles.

The optional step 107 of generating a track database involves, for example, but not limited to, collecting a plurality of tracks of motor vehicles generated based on how these motor vehicles, i.e., at least the first motor vehicle and the vehicle in operation, passed the portion of the route. For example, but not limited to, in step 107, the plurality of tracks of motor vehicles that have passed the portion of the route are collected. In addition, for example, but not limited to, in step 107, the collected tracks are systematized, so that these data can be used to generate a plurality of estimated tracks for the following motor vehicles. In addition, but not limited to, the plurality of such tracks can be used as an input for analysis, including by machine learning tools, in order to generate the most energy-efficient (model) track that would be suitable for any motor vehicle. Such model track can be unique for each motor vehicle and can subsequently be used as the estimated track for the first motor vehicle, whereupon the steps according to the method for generating an energy-efficient track will be performed again in order to generate a different model track for the same motor vehicle. In addition, but not limited to, such data can be used to change the properties of the portion of the route so as to ensure the generation of the most energy-efficient model track. However, it should be obvious to a person having ordinary skill in the art that although the forming of the track database enhances the accuracy of the subsequent generation of the energy-efficient tracks for the following motor vehicles thus allowing to reduce energy consumption by these motor vehicles on a specific portion of the route, said evaluation is optional, since the aforementioned estimated track for the vehicle in operation, or even the aforementioned estimated track for the vehicle in operation, may be sufficient for subsequent generation of model energy-efficient tracks for the following motor vehicles.

Figure 8:
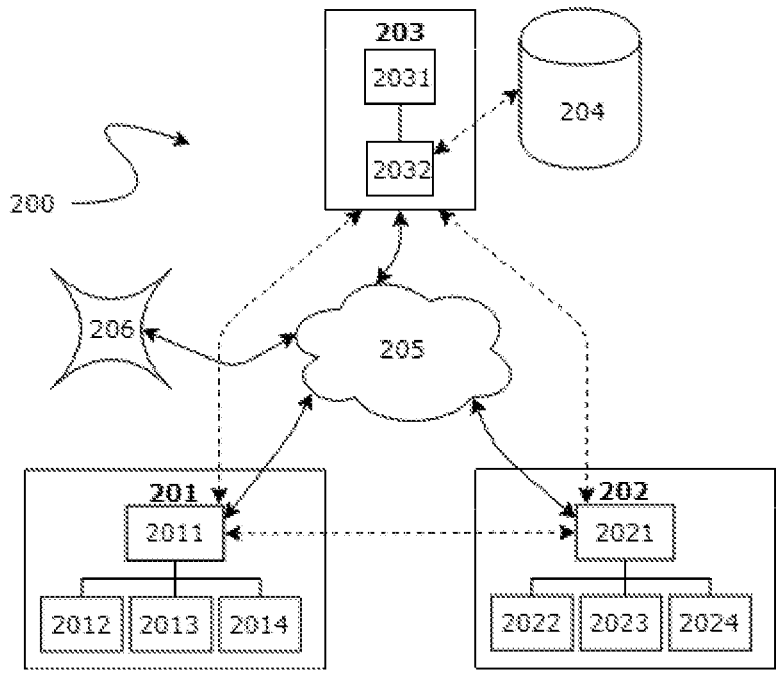
FIG. 8 illustrates an exemplary, non-limiting, diagram for the system 200 for generating an energy-efficient track for the motor vehicle.

FIG. 8 illustrates an exemplary, non-limiting, diagram for the system 200 for generating an energy-efficient track for the motor vehicle. For example, but not limited to, the claimed system 200 comprises the server 203 that communicates at least with the aforementioned transceivers 2011, 2021 of the first motor vehicle 201 and the vehicle in operation 202, respectively. In addition, but not limited to, the server 203 is a computer device comprising at least a CPU 2031 and a memory 2032. In addition, but not limited to, the memory (computer-readable medium) of the server 203 contains the program code that, when implemented, induces the CPU to perform the steps according to the method for generating an energy-efficient track for the motor vehicle that was described above with reference to FIGS. 1-7. For example, but not limited to, the computer-readable medium (memory 2031) may comprise a non-volatile memory (NVRAM); a random-access memory (RAM); a read-only memory (ROM); an electrically erasable programmable read-only memory (EEPROM); a flash drive or other memory technologies; a CD-ROM, a digital versatile disk (DVD) or other optical/holographic media; magnetic tapes, magnetic film, a hard disk drive or any other magnetic drive; and any other medium capable of storing and encoding the necessary information. In addition, but not limited to, the memory 2032 comprises a computer-readable medium based on the computer memory, either volatile or non-volatile, or a combination thereof. In addition, but not limited to, exemplary hardware devices include solid-state drives, hard disk drives, optical disk drives, etc. In addition, but not limited to, the computer-readable medium (memory 2032) is not a temporary memory (i.e., a permanent, non-transitive memory), and therefore it does not contain a temporary (transitive) signal. In addition, but not limited to, the memory 2032 may store an exemplary environment, wherein the procedure of generating an energy-efficient track for the motor vehicle may be implemented using computer-readable commands or codes that are stored in the memory of the server. In addition, but not limited to, the server 203 comprises one or more CPUs 2031 which are designed to execute computer-readable commands or codes that are stored in the memory 2032 of the device in order to implement the procedure of generating an energy-efficient track for the motor vehicle. In addition, but not limited to, the system 200 may further comprise a database 204. The database 204 may be, but not limited to, a hierarchical database, a network database, a relational database, an object database, an object-oriented database, an object-relational database, a spatial database, a combination of two or more said databases, etc. In addition, but not limited to, the database 204 stores the data to be analyzed in the memory 2032 or in the memory of a different computer device that communicates with the server 203, which may be, but not limited to, a memory that is similar to any of the memories 2032, as described above, and which can be accessed via the server 203. In addition, but not limited to, the database 204 stores the data comprising at least commands to perform the steps according to the method 100 as described above; the processed data associated with the first motor vehicle and/or the vehicle in operation, and/or the portion of the route, including refined data; estimated and generated tracks for motor vehicles; navigational data; model tracks for motor vehicles; etc. In addition, but not limited to, the exemplary system 200 further comprises, respectively, at least the first vehicle 201 and the vehicle in operation 202. Such vehicles 201, 202 usually comprise corresponding transceivers 2011, 2021 adapted to sending the data to the server 203 that communicates with motion control systems 2012, 2022 of respective vehicles and/or with on-board information systems 2013, 2023 (if present) of respective vehicles. Optionally, but not limited to, such motor vehicles may comprise various sensors 2014, 2024 to collect data that are associated with the corresponding motor vehicle in operation, and/or the portion of the route. In addition, but not limited to, the such sensors 2014, 2024 include a positioning sensor, speed sensors (such as, but not limited to, a crankshaft position sensor, a camshaft position sensor, a throttle position sensor, an accelerator pedal position sensor, a wheel speed sensor, a power consumption sensor, e.g. injection rate or current voltage characteristic), energy consumption sensors (such as, but not limited to, fuel level sensors, battery sensors, an accelerator pedal position sensor, injection rate sensor, and an RPM sensor), temperature sensors (such as, but not limited to, a coolant temperature sensor, an ambient temperature sensor, an in-car temperature sensor), pressure sensors (such as, but not limited to, an intake manifold pressure sensor, a fuel injection pressure sensor, a tyre pressure sensor), environmental sensors (such as, but not limited to, a light level sensor, a rain sensor, a radar, a lidar, a video camera, a sonar), and sensors and speed control elements of the motor vehicle, as well as other elements of the motion control system of the motor vehicle. In addition, but not limited to, there is provided a server 203, which, in addition to the functions mentioned above, stores and facilitates the execution of computer-readable commands and codes disclosed herein, which, accordingly, won't be described again. In addition, but not limited to, the server 203, in addition to the functions mentioned above, is capable of controlling the data exchange in the system 200. In addition, but not limited to, data exchange within the system 200 is performed with the help of one or more data exchange networks 205. In addition, but not limited to, data exchange networks 205 may include, but not limited to, one or more local area networks (LAN) and/or wide area networks (WAN), or may be represented by the Internet or Intranet, or a virtual private network (VPN), or a combination thereof, etc. In addition, but not limited to, the server 203 is further capable of providing a virtual computer environment for the components of the system to interact with each other. In addition, but not limited to, the network 205 provides interaction between transceivers 2011, 2021 on motor vehicles 201, 202, the server 203, and the database 204 (optionally). In addition, but not limited to, the server 203 and the database 204 may be connected directly using conventional wired or wireless communication means and methods, which, accordingly, are not described in further detail. In addition, but not limited to, the system 200 may optionally comprise infrastructure elements 206 of the portion of the route, specifically, various technical means capable of collecting the aforementioned data that are associated with motor vehicles and/or the portion of the route, and optionally can provide the aforementioned network 205 for data exchange on the portion of the route. For example, but not limited to, such elements 206 include a weather station, a speed monitoring camera, an infrastructural transceiver of the portion of the route, pavement weight sensors, etc., as well as the data from other motor vehicles that may or may not be involved with the system 200, the data transferred and propagated in data exchange environments based on data exchange technologies, such as vehicle-to-vehicle (V2V) and vehicle-to-everything (V2X). In addition, but not limited to, one of the aforementioned on-board information systems 2013, 2023, in case it is a computer device comprising a CPU and a memory that are similar to the aforementioned CPU 2031 and memory 2032, may be represented by the aforementioned server 203 with its basic functions, wherein the aforementioned transceivers 2011, 2012 may communicate with each other using any data exchange network or directly, via wireless communication, such as, but not limited to, radio communication, acoustic communication, infrared communication, laser communication, etc., wherein the aforementioned database 204 may be implemented directly within the memory of any of the on-board information systems 2013 and 2023 (if present).

Figure 9:
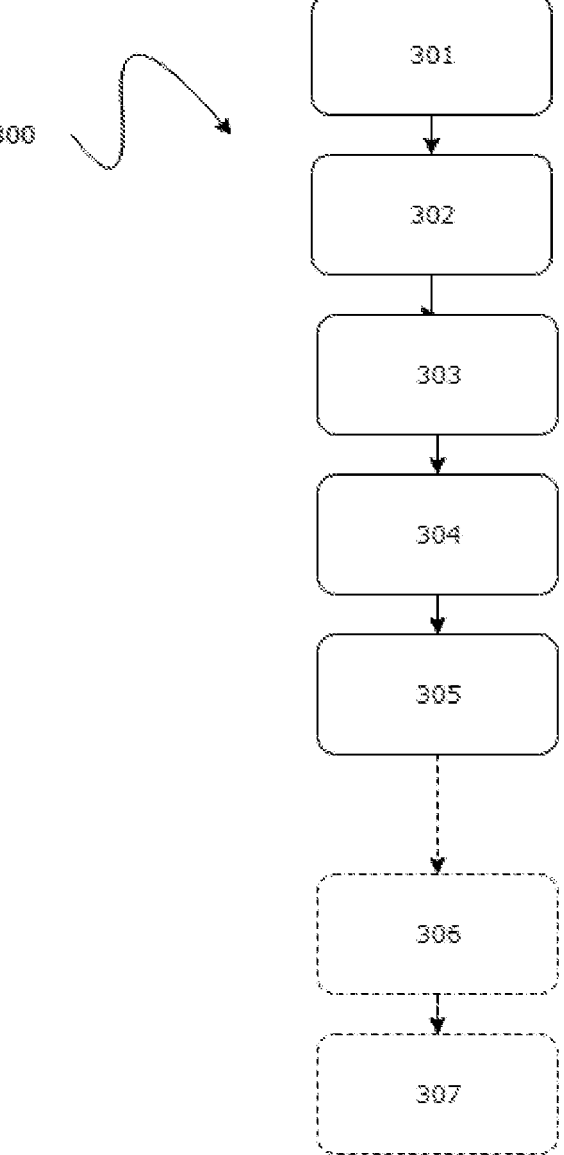
FIG. 9 illustrates an exemplary, non-limiting, diagram for the method 300 for generating an energy-efficient track for the vehicle in operation moving along a highway.

In addition, as shown in FIG. 9, there may be generated a special energy-efficient track for a vehicle in operation moving along a highway, which would depend on the energy-efficient track for the second motor vehicle. In general, but not limited to, such special energy-efficient track for the vehicle in operation may be useful to ensure its energy-efficient movement by means of platooning or, but not limited to, as part of an organized convoy. For example, but not limited to, in the present disclosure, platooning means that the vehicle in operation is moving directly behind the second motor vehicle, which allows, but not limited to, the vehicle in operation to move taking into account the properties and energy efficiency of the second motor vehicle's movement in such a way so as to reduce negative air resistance and thus to make the vehicle in operation's movement even more energy efficient, which may be, but not limited to, significantly more energy efficient, if the second motor vehicle's own movement is energy efficient. In addition, but not limited to, the description above is also true when the vehicle in operation is moving along a highway directly behind the second motor vehicle as part of an organized convoy, which is moving, accordingly, by means of platooning, and its movement is different from ordinary platooning in that the organized convoy is comprised of the most suitable motor vehicles. At the same time, but not limited to, it should be obvious to a person having ordinary skill in the art that the vehicle in operation may be the second motor vehicle for another motor vehicle that follows the vehicle in operation by means of platooning, which is itself neither the first motor vehicle nor the second motor vehicle and therefore is a vehicle in operation, according to the present disclosure, for which the aforementioned vehicle in operation is therefore the second motor vehicle, wherein, but not limited to, all the above is true for any motor vehicle that follows them, and wherein, but not limited to, in general, it should be noted that any motor vehicle in an organized or unorganized convoy that follows the second motor vehicle, i.e. the lead motor vehicle, can be considered to be a vehicle in operation, i.e. a slave motor vehicle, and any motor vehicle that precedes it can be considered as a second motor vehicle, i.e. the lead motor vehicle. In addition, preferably, but not limited to, a highway is a route or a portion of the route that does not have controlled intersections, i.e. such route of a portion of the route, along which motor vehicles may move in an energy-efficient way for a long time my means of platooning, including, but not limited to as part of a convoy. In order to achieve this, but not limited to, there is provided the claimed method 300 for generating an energy-efficient track for the vehicle in operation moving along a highway. Preferably, but not limited to, the claimed method 300 comprises the following steps: a step 301 of generating the first energy-efficient track for the vehicle in operation; a step 302 of determining a second motor vehicle that is located in front of the vehicle in operation in its direction of movement along the highway and generating the energy-efficient track for the second motor vehicle; a step 303 of generating a second energy-efficient track for the vehicle in operation, based on its speed profile and evaluation of its energy efficiency when the vehicle in operation is moving in accordance with the energy-efficient track for the second motor vehicle; a step 304 of comparing the second energy-efficient track for the vehicle in operation with the first energy-efficient track for the vehicle in operation in order to generate a control signal to assign an energy-efficient track to the vehicle in operation; a step 305 of assigning an energy-efficient track to the vehicle in operation, wherein the energy-efficient track to be assigned is one of the first energy-efficient track for the vehicle in operation and the second energy-efficient track for the vehicle in operation; an optional step 306 of generating an adjusted energy-efficient track for the second motor vehicle; and an optional step 307 of generating a third energy-efficient track for the vehicle in operation in response to the adjusted energy-efficient track generated for the second motor vehicle.

Preferably, but not limited to, in step 301, the first energy-efficient track for the vehicle in operation is generated, which may be generated by performing the method for generating an energy-efficient track, illustrated by FIGS. 1-7, which is applied to the vehicle in operation. More specifically, but not limited to, as was demonstrated above with reference to FIGS. 1-7, in step 301, the first energy-efficient track for the vehicle in operation is generated by means of the CPU of the computer device implementing the method for generating an energy-efficient track for the motor vehicle, the method comprising the following steps: collecting primary data that involves obtaining data associated with the first motor vehicle, data associated with the portion of the route to be passed by the first motor vehicle, and data associated with the vehicle in operation, wherein the vehicle in operation passes the portion of the route after the first motor vehicle; collecting secondary data that involves generating a track of the first motor vehicle, wherein said track is generated based on how the first motor vehicle passed the portion of the route; and generating an energy-efficient track for the vehicle in operation, wherein the energy-efficient track for the vehicle in operation is generated based on the track generated for the first motor vehicle; wherein the track for the first motor vehicle is generated by performing the following steps: generating a speed profile of the first motor vehicle on the passed portion of the route; evaluating energy efficiency of the first motor vehicle on the passed portion of the route. More specifically, but not limited to, as was demonstrated above with reference to FIGS. 1-7, the data associated with the first motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof; the data associated with the vehicle in operation include at least one of the following: the type and model of the vehicle in operation, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof; and the data associated with the portion of the route to be passed by the first motor vehicle include at least one of the data of the portion of the route to be passed by the first motor vehicle, obtained from external sources, and/or a combination thereof: the geometry of the portion of the route, the road grade of the portion of the route, the allowed speed on the portion of the route, the quality of road surface of the portion of the route, speed limits on the portion of the route, turns on the portion of the route, weather conditions on the portion of the route, or its infrastructure. More specifically, but not limited to, as was demonstrated above with reference to FIGS. 1-7, the track for the first motor vehicle is generated by performing the following additional steps: refining the primary data associated with the first motor vehicle based on how it passed the portion of the route; refining the primary data associated with the portion of the route based on how it was passed by the first motor vehicle; wherein the refining of the primary data associated with the portion of the route is also based on the data obtained from the environmental sensors of the first motor vehicle.

In addition, but not limited to, in step 302, there is determined a potentially lead motor vehicle (second motor vehicle), which precedes the vehicle in operation in the direction of its movement along the highway, wherein the second motor vehicle is determined using conventional means and methods, which are not described in further detail herein, and wherein, but not limited to, in step 302, an energy-efficient track for the second motor vehicle is also generated, wherein the energy-efficient track for the second motor vehicle is generated in the same way as the energy-efficient track for the vehicle in operation, i.e. using the method described above with reference to FIGS. 1-7. More specifically, but not limited to, the energy-efficient track for the second motor vehicle is generated by means of the CPU of the computer device implementing the method for generating an energy-efficient track for the motor vehicle, the method comprising the following steps: collecting primary data that involves obtaining data associated with the first motor vehicle, data associated with the portion of the route to be passed by the first motor vehicle, and data associated with the second motor vehicle, wherein the second motor vehicle passes the portion of the route after the first motor vehicle, but before the vehicle in operation; collecting secondary data that involves generating a track of the first motor vehicle, wherein said track is generated based on how the first motor vehicle passed the portion of the route; and generating an energy-efficient track for the second motor vehicle, wherein the energy-efficient track for the second motor vehicle is generated based on the track generated for the first motor vehicle; wherein the energy-efficient track for the first motor vehicle is generated by performing the following steps: generating a speed profile of the first motor vehicle on the passed portion of the route; evaluating energy efficiency of the first motor vehicle on the passed portion of the route. More specifically, but not limited to, as was demonstrated above with reference to FIGS. 1-7, the data associated with the first motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof; the data associated with the second motor vehicle include at least one of the following: the type and model of the second motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof; and the data associated with the portion of the route to be passed by the first motor vehicle include at least one of the data of the portion of the route to be passed by the first motor vehicle, obtained from external sources, and/or a combination thereof: the geometry of the portion of the route, the road grade of the portion of the route, the allowed speed on the portion of the route, the quality of road surface of the portion of the route, speed limits on the portion of the route, turns on the portion of the route, weather conditions on the portion of the route, or its infrastructure. More specifically, but not limited to, as was demonstrated above with reference to FIGS. 1-7, the track for the first motor vehicle is generated by performing the following additional steps: refining the primary data associated with the first motor vehicle based on how it passed the portion of the route; refining the primary data associated with the portion of the route based on how it was passed by the first motor vehicle; wherein the refining of the primary data associated with the portion of the route is also based on the data obtained from the environmental sensors of the first motor vehicle.

In addition, but not limited to, in step 303, the second energy-efficient track for the vehicle in operation is generated, which is based on the speed profile of the vehicle in operation and evaluation of its energy efficiency when moving in accordance with the energy-efficient track of the second motor vehicle, i.e. when moving behind the second (lead) motor vehicle by means of platooning, including, but not limited to, as part of a convoy. More specifically, but not limited to, the second energy-efficient track for the vehicle in operation may be generated by means of the CPU of the computer device implementing the method for generating an energy-efficient track for the motor vehicle, the method comprising the following steps: adapting the first energy-efficient track for the vehicle in operation to the energy-efficient track generated for the second motor vehicle; generating the second energy-efficient track for the vehicle in operation, wherein the second energy-efficient track for the vehicle in operation is generated based on the energy-efficient track generated for the second motor vehicle, wherein the first energy-efficient track for the vehicle in operation is adapted to the energy-efficient track generated for the second motor vehicle by performing the following steps: adapting the speed profile of the vehicle in operation to the speed profile of the second motor vehicle that is contained in the second energy-efficient track for the second motor vehicle, in order to generate a first adapted speed profile for the vehicle in operation, wherein the first adapted speed profile for the vehicle in operation corresponds to the speed profile of the vehicle in operation moving at a speed that does not exceed that of the second motor vehicle moving in accordance with its own speed profile; and evaluating energy efficiency of the vehicle in operation moving in accordance with the first adapted speed profile for the vehicle in operation. Then, but not limited to, in step 304, the second energy-efficient track generated for the vehicle in operation may be compared with the first energy-efficient track for the vehicle in operation in order to generate a control signal to assign an energy-efficient track to the vehicle in operation. Then, but not limited to, in step 305, any of the first energy-efficient track for the vehicle in operation or the second energy-efficient track for the vehicle in operation may be assigned to the vehicle in operation. More specifically, but not limited to, it should be noted that the vehicle in operation will be assigned an energy-efficient track which is the most energy efficient among the two, i.e. both the time spent by the vehicle in operation to pass the portion of the route and the energy consumed by the vehicle in operation to pass the portion of the route, when moving in accordance with the assigned track, are minimal. For example, but not limited to, the vehicle in operation may be assigned the first energy-efficient track that corresponds to the vehicle in operation's movement not by means of platooning or not as part of a convoy, i.e., corresponds to its independent movement along a highway, without the advantages granted by the reduced air resistance. This is possible, if, for example, but not limited to, the second motor vehicle is moving too slowly thus slowing the vehicle in operation and increasing the time its spends to pass the portion of the route, i.e. in case the second energy-efficient track is actually less energy efficient for the vehicle in operation, specifically when it is moving behind the second motor vehicle by means of platooning. At the same time, but not limited to, any other second motor vehicle may be moving in accordance with such energy-efficient track of the second motor vehicle, so that the vehicle in operation's movement might be more energy efficient if it moved behind such other second (lead) motor vehicle than behind the first vehicle in operation, and therefore said second energy-efficient track may be assigned to the vehicle in operation. In addition, but not limited to, when the vehicle in operation is assigned an energy-efficient track, it means that the assigned energy-efficient track, which is associated with the vehicle in operation and, at least, temporarily replaces any of the previous energy-efficient tracks that were associated with the vehicle in operation, is stored in the memory of the computer device.

In addition, but not limited to, when the vehicle in operation is moving in accordance with the second energy-efficient track by means of platooning, i.e. when it is moving behind the second (lead) motor vehicle, the energy-efficient track for the second motor vehicle may be adjusted for whatever reason, thus resulting in an adjusted energy-efficient track for the second motor vehicle, which may be generated like any other energy-efficient track, as described above with reference with FIGS. 1-7, generally, in step 306. In this case, but not limited to, it may be necessary, in step 307, to generate a third energy-efficient track for the vehicle in operation, based on the adjusted energy-efficient track for the second motor vehicle. More specifically, but not limited to, in step 307, the third energy-efficient track for the vehicle in operation is generated by means of the CPU of the computer device implementing the method for generating an energy-efficient track for the motor vehicle, the method comprising the following steps: adapting the second energy-efficient track for the vehicle in operation to the adjusted energy-efficient track for the second motor vehicle; generating the third energy-efficient track for the vehicle in operation, wherein the third energy-efficient track for the vehicle in operation is generated based on the adjusted energy-efficient track for the second motor vehicle, wherein the second energy-efficient track for the vehicle in operation is adapted to the adjusted energy-efficient track for the second motor vehicle by performing the following steps:

adapting the speed profile of the vehicle in operation to the adjusted speed profile of the second motor vehicle that is contained in the adjusted energy-efficient track for the second motor vehicle, in order to obtain a second adapted speed profile for the vehicle in operation, wherein the second adapted speed profile for the vehicle in operation corresponds to the speed profile of the vehicle in operation moving at a speed that does not exceed that of the second motor vehicle moving in accordance with its adjusted speed profile; and evaluating energy efficiency of the vehicle in operation moving in accordance with the second adapted speed profile for the vehicle in operation. In addition, but not limited to, the third energy-efficient track for the vehicle in operation can also be compared, as in step 304, with the first energy-efficient track for the vehicle in operation in order to assign, as in step 305, any of the first energy-efficient track for the vehicle in operation or the third energy-efficient track for the vehicle in operation to the vehicle in operation. For example, but not limited to, if the third energy-efficient track based on the adjusted energy-efficient track for the second motor vehicle is more energy efficient than the first energy-efficient track for the vehicle in operation, then the third energy-efficient track for the vehicle in operation will be assigned to the vehicle in operation, replacing the second energy-efficient track for the vehicle in operation, and thus the vehicle in operation will continue its movement in accordance with the third energy-efficient track behind the second motor vehicle by means of platooning. For example, but not limited to, if the third energy-efficient track based on the adjusted energy-efficient track for the second motor vehicle is less energy efficient than the first energy-efficient track for the vehicle in operation, then the first energy-efficient track for the vehicle in operation will be assigned to the vehicle in operation, replacing the second energy-efficient track for the vehicle in operation, and thus the vehicle in operation will continue its movement in accordance with the first energy-efficient track on its own, outside the convoy.

Figure 10:
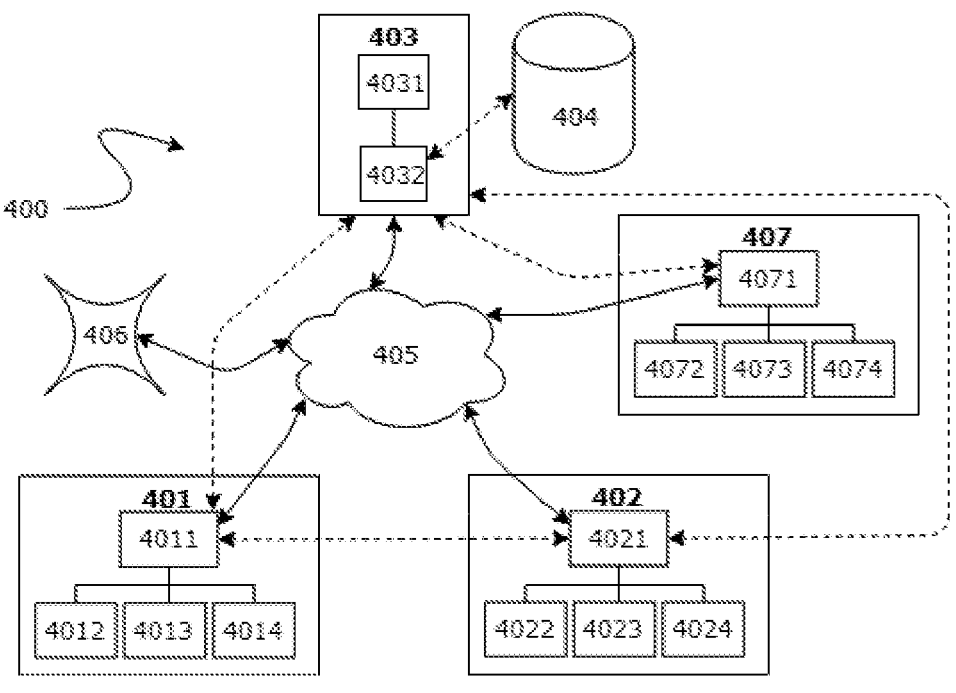
FIG. 10 illustrates an exemplary, non-limiting diagram for the system 400 for generating an energy-efficient track for the vehicle in operation moving along a highway.

The methods described with reference to FIG. 9 may be implemented by any computer device, including the one described with reference to FIG. 8, particularly, but not limited to, a computer device that is a part of a control system of any of the first motor vehicle, the second motor vehicle, or the vehicle in operation, or a computer device in communication with such control system. In general, but not limited to, it should be noted that such computer device is adapted to generate a control signal to change the movement of the vehicle in operation for it to move in accordance with the first, the second, or the third energy-efficient track; and/or is adapted to generate an information signal to inform the operator of the vehicle in operation that it is necessary to change the movement of the vehicle in operation for it to move in accordance with the first, the second, or the third energy-efficient track. For example, but not limited to, the computer device may be a head unit of the vehicle in operation or a user device communicating with the motion control system of the vehicle in operation, and any of the tracks for the first motor vehicle and the second motor vehicle, which are required to implement the method 300, may be obtained by means of a corresponding transceiver exchanging data using data exchange technologies, such as vehicle-to-vehicle (V2V) and vehicle-to-everything (V2X), with corresponding transceivers in the motion control systems of the first, the second, or any other motor vehicle, and/or with corresponding transceivers of infrastructure elements on the portion of the route. In addition, but not limited to, as shown in FIG. 10, there may be provided a system for generating an energy-efficient track for the vehicle in operation moving along a highway, which is largely similar to the system 200 illustrated by FIG. 8, but further comprises, in addition to the vehicle in operation, a second motor vehicle, thus allowing to ensure organized movement of motor vehicles in a convoy by means of platooning. For example, but not limited to, the claimed system 400 comprises the server 403 that communicates at least with the aforementioned transceivers 4011, 4021, 4071 of the first motor vehicle 401, the vehicle in operation 402, and the second motor vehicle 407, respectively. In addition, but not limited to, the server 403 is a computer device comprising at least a CPU 4031 and a memory 4032. In addition, but not limited to, the memory (computer-readable medium) of the server 403 contains the program code that, when implemented, induces the CPU to perform the steps according to the method for generating an energy-efficient track for the motor vehicle and generating an energy-efficient track for the vehicle in operation moving along a highway that was described above with reference to FIGS. 1-7 and 9. For example, but not limited to, the computer-readable medium (memory 4031) may comprise a non-volatile memory (NVRAM); a random-access memory (RAM); a read-only memory (ROM); an electrically erasable programmable read-only memory (EEPROM); a flash drive or other memory technologies; a CD-ROM, a digital versatile disk (DVD) or other optical/holographic media; magnetic tapes, magnetic film, a hard disk drive or any other magnetic drive; and any other medium capable of storing and encoding the necessary information. In addition, but not limited to, the memory 4032 comprises a computer-readable medium based on the computer memory, either volatile or non-volatile, or a combination thereof. In addition, but not limited to, exemplary hardware devices include solid-state drives, hard disk drives, optical disk drives, etc. For instance, but not limited to, the computer-readable medium (memory 4032) is not a temporary memory (i.e., a permanent, non-transitive memory), and therefore it does not contain a temporary (transitive) signal. For instance, but not limited to, the memory 4032 may store an exemplary environment, wherein the procedure of generating an energy-efficient track for a motor vehicle may be implemented using computer-readable commands or codes that are stored in the memory of the server. In addition, but not limited to, the server 403 comprises one or more CPUs 4031 which are designed to execute computer-readable commands or codes that are stored in the memory 4032 of the device in order to implement the procedure of generating an energy-efficient track for the motor vehicle. In addition, but not limited to, the system 400 may further comprise a database 404. The database 404 may be, but not limited to, a hierarchical database, a network database, a relational database, an object database, an object-oriented database, an object-relational database, a spatial database, a combination of two or more said databases, etc. In addition, but not limited to, the database 404 stores the data to be analyzed in the memory 4032 or in the memory of a different computer device that communicates with the server 403, which may be, but not limited to, a memory that is similar to any of the memories 4032, as described above, and which can be accessed via the server 403. In addition, but not limited to, the database 404 stores the data comprising at least commands to perform the steps according to the methods 100 and 300 as described above; the processed data associated with the first motor vehicle and/or the vehicle in operation, and/or the second motor vehicle, and/or the portion of the route, including refined data; estimated and generated tracks for motor vehicles; navigational data; model tracks for motor vehicles; etc. In addition, but not limited to, the exemplary system 400 further comprises, respectively, at least the first motor vehicle 401, the vehicle in operation 402, and the second motor vehicle 407. Such vehicles 401, 402, 407 usually comprise corresponding transceivers 4011, 4021, 4071, adapted to sending the data to the server 403 that communicates with motion control systems 4012, 4022, 4072 of respective vehicles and/or with on-board information systems 4013, 4023, 4073 (if present) of respective vehicles. Optionally, but not limited to, such motor vehicles may comprise various sensors 4014, 4024, 4074 to collect data that are associated with the corresponding motor vehicle in operation, and/or the portion of the route. In addition, but not limited to, the such sensors 4014, 4024, 4074 include a positioning sensor, speed sensors (such as, but not limited to, a crankshaft position sensor, a camshaft position sensor, a throttle position sensor, an accelerator pedal position sensor, a wheel speed sensor, a power consumption sensor, e.g. injection rate or current voltage characteristic), energy consumption sensors (such as, but not limited to, fuel level sensors, battery sensors, an accelerator pedal position sensor, injection rate sensor, and an RPM sensor), temperature sensors (such as, but not limited to, a coolant temperature sensor, an ambient temperature sensor, an in-car temperature sensor), pressure sensors (such as, but not limited to, an intake manifold pressure sensor, a fuel injection pressure sensor, a tyre pressure sensor), environmental sensors (such as, but not limited to, a light level sensor, a rain sensor, a radar, a lidar, a video camera, a sonar), and sensors and speed control elements of the motor vehicle, as well as other elements of the motion control system of the motor vehicle. In addition, but not limited to, there is provided a server 403, which, in addition to the functions mentioned above, stores and facilitates the execution of computer-readable commands and codes disclosed herein, which, accordingly, won't be described again. In addition, but not limited to, the server 403, in addition to the functions mentioned above, is capable of controlling the data exchange in the system 400. In addition, but not limited to, data exchange within the system 400 is performed with the help of one or more data exchange networks 405. In addition, but not limited to, data exchange networks 405 may include, but not limited to, one or more local area networks (LAN) and/or wide area networks (WAN), or may be represented by the Internet or Intranet, or a virtual private network (VPN), or a combination thereof, etc. In addition, but not limited to, the server 403 is further capable of providing a virtual computer environment for the components of the system to interact with each other. In addition, but not limited to, the network 405 provides interaction between transceivers 4011, 4021, 4071 on motor vehicles 401, 402, 407 the server 403, and the database 404 (optionally). In addition, but not limited to, the server 403 and the database 404 may be connected directly using conventional wired or wireless communication means and methods, which, accordingly, are not described in further detail. In addition, but not limited to, the system 400 may optionally comprise infrastructure elements 406 of the portion of the route, specifically, various technical means capable of collecting the aforementioned data that are associated with motor vehicles and/or the portion of the route, and optionally can provide the aforementioned network 405 for data exchange on the portion of the route. For example, but not limited to, such elements 406 include a weather station, a speed monitoring camera, an infrastructural transceiver of the portion of the route, pavement weight sensors, etc., as well as the data from other motor vehicles that may or may not be involved with the system 400, the data transferred and propagated in data exchange environments based on data exchange technologies, such as vehicle-to-vehicle (V2V) and vehicle-to-everything (V2X). In addition, but not limited to, one of the aforementioned motion control systems 4012, 4022, 4072, and/or on-board information systems 4013, 4023, 4073 (if present) in case it comprises a computer device or is connected to a user device comprising a CPU and a memory that are similar to the CPU 4031 and the memory 4032, may be represented by the aforementioned server 403 with its basic functions, wherein the aforementioned transceivers 4011, 4021, 4071 may be connected to each other by using any data exchange network or directly, via wireless communication, such as, but not limited to, radio communication, acoustic communication, infrared communication, laser communication, etc., wherein the database 404 may be implemented directly within the memory of the corresponding computer device in the one of the motion control systems 4012, 4022, 4072, and/or on-board information systems 4013, 4023, 4073 (if present).

Figure 11:
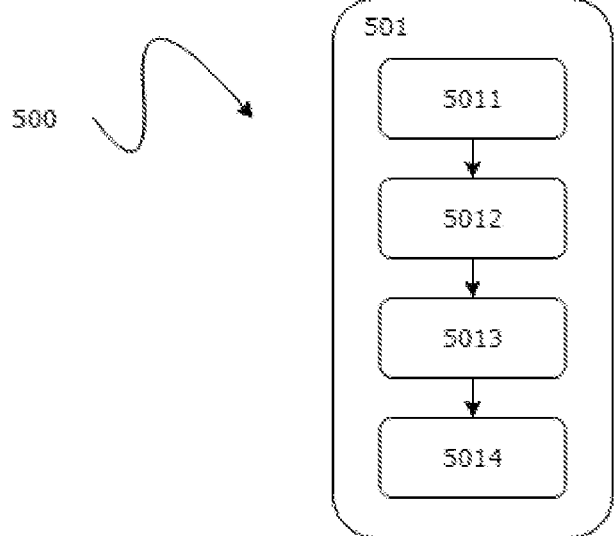
FIG. 11 illustrates an exemplary, non-limiting, diagram for the method 500 for generating an adjustment energy-efficient track for the vehicle in operation.

The methods, devices, and systems disclosed herein with reference to FIGS. 1-10 also provide, but are not limited to, generation of the main energy-efficient track for the vehicle in operation. Preferably, but not limited to, such main energy-efficient track for the vehicle in operation is generated to ensure that the vehicle in operation's movement is energy efficient over a longer portion of the route, for example, but not limited to, over a longer portion of the route on a highway. However, it should be obvious to a person having ordinary skill in the art that, if necessary, such main energy-efficient track for the vehicle in operation can be generated for any other suitable portion of the route. In addition, as shown in FIG. 11, there may be provided the claimed method 500 for generating an adjustment energy-efficient track for the vehicle in operation. Preferably, but not limited to, such method 500 for generating an adjustment energy-efficient track for the vehicle in operation comprises at least the following steps: a step 501 of generating an adjustment energy-efficient track for the vehicle in operation, wherein the adjustment energy-efficient track is generated based on the main energy-efficient track for the vehicle in operation, wherein the main energy-efficient track for the vehicle in operation contains at least an estimated speed profile of the vehicle in operation on the portion of the route, for which the main energy-efficient track for the vehicle in operation was generated, and wherein the estimated speed profile of the vehicle in operation on the portion of the route, for which the main energy-efficient track for the vehicle in operation was generated, contains at least the first preferred speed range for the vehicle in operation on the portion of the route, for which the main energy-efficient track for the vehicle in operation was generated; and wherein the step 501 of generating an adjustment energy-efficient track comprises at least the following steps: a step of 5011 determining the current location of the vehicle in operation, wherein the current location of the vehicle in operation does not correspond to its estimated location on the portion of the route; a step 5012 of determining an adjustment portion of the route, wherein its start coordinates match the current location of the vehicle in operation and its end coordinates match the start coordinates of the portion of the route, for which the main energy-efficient track for the vehicle in operation was generated, and wherein the start coordinates of the portion of the route, for which the main energy-efficient track for the vehicle in operation was generated, are located in the vehicle in operation's direction of movement; a step 5013 of collecting primary adjustment data, which involves obtaining data associated with the vehicle in operation and data associated with the adjustment portion of the route; and a step 5014 of generating an adjustment energy-efficient track for the vehicle in operation, wherein the adjustment energy-efficient track for the vehicle in operation contains at least an estimated speed profile of the vehicle in operation on the adjustment portion of the route, and wherein the estimated speed profile of the vehicle in operation contains the second preferred speed range for the vehicle in operation generated in such a way that when the vehicle in operation moves at any of the speeds from the second preferred speed range, its speed at the start coordinates of the portion of the route, for which the main energy-efficient track for the vehicle in operation was generated, matches any of the speeds from the first preferred speed range for the vehicle in operation.

Preferably, but not limited to, the main energy-efficient track for the vehicle in operation contains at least an estimated speed profile of the vehicle in operation on the portion of the route, for which the main energy-efficient track for the vehicle in operation was generated. Preferably, but not limited to, the estimated speed profile of the vehicle in operation on the portion of the route, for which the main energy-efficient track for the vehicle in operation was generated, contains at least the first preferred speed range for the vehicle in operation on the portion of the route, for which the main energy-efficient track for the vehicle in operation was generated. Preferably, but not limited to, a such first speed range for the vehicle in operation is selected, so as to ensure that its movement is energy efficient, as was demonstrated above with reference to FIGS. 1-10. At the same time, it should be obvious to a person having ordinary skill in the art that the first speed range is generated, preferably, but not limited to, in the step of generating the main energy-efficient track for any first motor vehicle, including, respectively, the speed profile of the corresponding first motor vehicle and the evaluation of energy efficiency of the first motor vehicle on the corresponding portion of the route; wherein the speed profile of the first motor vehicle may also contain any speed range for the first motor vehicle which may be evaluated as energy efficient and used to generate the main energy-efficient track for the vehicle in operation, as was demonstrated above with reference to FIGS. 1-10. Preferably, but not limited to, when determining the current location of the vehicle in operation, it may be found that the current location of the vehicle in operation does not match its estimated location on the portion of the route, which may indicate at least that the actual track of the vehicle in operation does not conform to the main energy-efficient track for the vehicle in operation, which was generated as was disclosed above with reference to FIGS. 1-10. For example, but not limited to, this may happen because the vehicle in operation needed an emergency stop on the portion of the route or, but not limited to, because of any change in the speed of the vehicle in operation that does not conform to its speed profile contained in the main energy-efficient track for the vehicle in operation. In this case, the actual speed profile of the vehicle in operation in the stop point (as well as in any respective point of any other unacceptable, i.e., not conforming to the estimated speed profile, change in the speed of the vehicle in operation) will not conform to the speed profile contained in the main energy-efficient track for the vehicle in operation. At the same time, if the point of unexpected change in the speed of the vehicle in operation does not appear frequently on portions of the route in actual tracks for aforementioned first motor vehicles, it is almost impossible to pre-generate an energy-efficient track for the vehicle in operation that would include a change in speed in said point. More specifically, but not limited to, the most frequent points of change in speed on portions of the route in actual tracks for aforementioned first motor vehicles may include: a checkpoint, a parking lot entrance or exit, a gas station entrance or exit, a ramp, an intersection, a long obstacle, or a similar point on a portion of the route. For such frequent points, it is possible to obtain enough data to generate an energy-efficient track for the vehicle in operation that would include shifting from the energy-efficient track of the vehicle in operation to a corresponding energy-efficient track that includes a portion between the portion of the route from the main energy-efficient track for the vehicle in operation and an aforementioned frequent point, and then shifting to a corresponding energy-efficient track that includes a portion between the aforementioned frequent point and the portion of the route from the main energy-efficient track. More specifically, but not limited to, the aforementioned point of unexpected change of the speed profile on a portion of the route from the main energy-efficient track of the vehicle in operation may be represented, but not limited to, a temporary (short-term) obstacle, a point on the road shoulder, a point of overtake, or any other point on the portion of the route, where the speed of the vehicle in operation lies outside the first preferred speed range for the vehicle in operation. When such points of unexpected change of the speed profile appear, preferably, but not limited to, an adjustment energy-efficient track for the vehicle in operation is generated, which is an energy-efficient track for the vehicle in operation, specially calculated so that the vehicle in operation could shift back to its main energy-efficient track with required energy efficiency. In fact, but not limited to, a special energy-efficient track will be calculated for the given vehicle in operation, as if said vehicle in operation were the first motor vehicle, i.e., simply speaking, the adjustment energy-efficient track is generated according to the step 101. At the same time, but not limited to, the vehicle in operation has already got the pre-generated energy-efficient track, which is, therefore, the main energy-efficient track for the given vehicle in operation, i.e. the adjustment energy-efficient track has to be generated in such a way that it fully conforms to the main pre-generated energy-efficient track for the vehicle in operation in the specified point of the portion of the route from the main energy-efficient track for the vehicle in operation. Preferably, but not limited to, the step 501 of generating an adjustment energy-efficient track for the vehicle in operation is performed, the step, preferably, but not limited to, comprising (see FIG. 11) a step 5011 of determining the current location of the vehicle in operation; a step 5012 of determining an adjustment portion of the route; a step 5013 of collecting primary adjustment data; and a step 5014 of generating an adjustment energy-efficient track. Preferably, but not limited to, the adjustment energy-efficient track is generated based on the main energy-efficient track for the vehicle in operation. Preferably, but not limited to, in step 3011, the current location of the vehicle in operation is determined, wherein the current location of the vehicle in operation does not match its estimated location on the portion of the route, which signals that this location is a point of unexpected change of the speed profile of the vehicle in operation. Preferably, but not limited to, in step 3012, an adjustment portion of the route is determined, wherein its start coordinates match the current location of the vehicle in operation and its end coordinates match the start coordinates of the portion of the route, for which the main energy-efficient track for the vehicle in operation was generated; and wherein the start coordinates of the portion of the route, for which the main energy-efficient track for the vehicle in operation was generated are located in the vehicle in operation's direction of movement. Preferably, but not limited to, in step 3013, primary adjustment data are collected, which involves obtaining data associated with the vehicle in operation and data associated with the adjustment portion of the route. Preferably, but not limited to, such primary adjustment data generally match the primary data collected in step 101, apart from the fact that these data are collected for the vehicle in operation (which is, in this case, considered to be the first motor vehicle) and the adjustment portion of the route, respectively. Preferably, but not limited to, in step 3014, an adjustment energy-efficient track for the vehicle in operation is generated, wherein the adjustment energy-efficient track for the vehicle in operation contains at least an estimated speed profile of the vehicle in operation on the adjustment portion of the route; and wherein the estimated speed profile of the vehicle in operation contains the second preferred speed range for the vehicle in operation generated in such a way that when the vehicle in operation is moving at any of the speeds from the second preferred speed range, its speed at the start coordinates of the portion of the route, for which the main energy-efficient track for the vehicle in operation was generated, matches any of the speeds from the first preferred speed range for the vehicle in operation.

Therefore, but not limited to, when the vehicle in operation moves from any point of unexpected change in the speed profile, there may be generated an adjustment energy-efficient track for the vehicle in operation, which may then be sent to the computer device 2022, 4072 of the motion control system 202, 407 of the vehicle in operation or to the computer device (on-board information system, if present) 2023, 4073 of the vehicle in operation, and after that the adjustment energy-efficient track will be stored in a corresponding memory to be used alongside the energy-efficient track of the vehicle in operation, until the vehicle in operation starts moving again in accordance with its main energy-efficient track. For example, but not limited to, the adjustment energy-efficient track generated may be used to generate control signals for the motion control system of the vehicle in operation in order to change its movement. For example, but not limited to, the adjustment energy-efficient track may be used to generate control signals for an on-board information system of the vehicle in operation, to generate an information signal for the operator of the vehicle in operation, and, but not limited to, to send this information signal to any user device of the operator. At the same time, it should be obvious to a person having ordinary skill in the art that the method 500 for generating an adjustment energy-efficient track for the vehicle in operation may be implemented using the means and methods of the systems 200, 400 for generating an energy-efficient track, described above with reference to FIGS. 1-10, which will function as a system for generating an adjustment energy-efficient track as well, and therefore its components and their functionality won't be described in further detail.

As was shown above the aforementioned portions of the route may contain the aforementioned acceleration points and/or deceleration points, including estimated acceleration points and/or deceleration points, and the generated tracks for motor vehicles may contain data associated with respective actual acceleration points and/or deceleration points, as well as data associated with mismatches between actual points and estimated points. The aforementioned deceleration points can be considered to be possible deceleration points at the same time and may include both mandatory deceleration points and non-mandatory deceleration points, which will be described in more detail below. For instance, but not limited to, the portions of the route located in urban areas will be often characterized by additional features. For example, but not limited to, a portion of the route located in an urban area may contain a mandatory deceleration point resulting from the necessity to decrease the speed of motor vehicles within the given portion of the route in accordance with traffic safety regulations. Such mandatory deceleration point is a coordinate on the portion of the route, at which a motor vehicle has to start its movement without positive acceleration. Preferably, but not limited to, an urban area contains at least a plurality of intersecting and/or joining, and/or adjoining portions of the route, wherein each such portion of the route may contain at least one mandatory deceleration point. Such mandatory deceleration point may be one of the following: a mandatory deceleration point on a portion of the route that is adjoined or intersected by another portion of the route, a mandatory deceleration point on a portion of the route containing an infrastructure element, which controls the movement of motor vehicles on the portion of the route, a mandatory deceleration point on a portion of the route containing a traffic sign providing a speed limit for motor vehicles on the portion of the route, a mandatory deceleration point on a portion of the route containing an obstacle, or other mandatory deceleration points resulting from the characteristics of the portion of the route, and/or a combination thereof. Preferably, but not limited to, the data associated with the portion of the route may include some data associated with the mandatory deceleration points. Preferably, but not limited to, the coordinates of the mandatory deceleration points for each portion of the route are defined in advance, so that they can be obtained as data during the step of collecting primary data, in which the data associated with the portion of the route to be passed by the first motor vehicle are collected. In addition, preferably, but not limited to, the data associated with mandatory deceleration points are defined such that the estimated track for the first motor vehicle is energy efficient. For example, but not limited to, when the portion of the route is a portion of the route adjoined by another portion of the route (e.g., but not limited to, the portion of the route to be passed by the first motor vehicle contains a turn that connects the portion of the route to be passed by the first motor vehicle with said another portion of the route, i.e. these portions of the route together from a T-intersection, but not limited to), the data associated with a mandatory deceleration point will include such coordinates of the mandatory deceleration point, at which the motor vehicle has to start moving at least without positive acceleration, or, but not limited to, with a suitable negative acceleration, wherein said coordinates may ensure that the movement of the motor vehicle along a trajectory connecting the portion of the route to be passed by the first motor vehicle with said another portion of the route is energy efficient, and wherein such energy efficient movement of the motor vehicle is also safe, as it ensures that the motor vehicle reduces its speed as required before making the turn. For example, but not limited to, when the portion of the route is a portion of the route intersected by another portion of the route (e.g., but not limited to, the portion of the route to be passed by the first motor vehicle intersects said another portion of the route at any angle, i.e. these portions of the route together from an X-intersection, but not limited to), the data associated with a mandatory deceleration point will include such coordinates of the mandatory deceleration point, at which the motor vehicle has to start moving at least without positive acceleration, or, but not limited to, with a suitable negative acceleration, wherein said coordinates may ensure that the movement of the motor vehicle along a trajectory crossing said another portion of the route is energy efficient, and wherein such energy efficient movement of the motor vehicle is also safe, as it ensures that the motor vehicle reduces its speed as required before passing a dangerous portion of the route, in which the trajectory of said motor vehicle may intersect that of another motor vehicle moving along said another portion of the route. For example, but not limited to, when the portion of the route is a portion of the route containing an infrastructure element (e.g., but not limited to, a traffic light, and/or a speed enforcement camera, and/or a traffic enforcement camera), which controls the movement of motor vehicles on the portion of the route, the data associated with a mandatory deceleration point will include such coordinates of the mandatory deceleration point, at which the motor vehicle has to start moving at least without positive acceleration, or, but not limited to, with a suitable negative acceleration, wherein said coordinates may ensure that the movement of the motor vehicle along trajectories requiring the motor vehicle to slow down significantly or stop in an allowed space in accordance with the signals provided by the infrastructure element is energy efficient, which, therefore, ensures that the motor vehicle slows down in an energy-efficient way, and the traffic on the portion of the route is safe. For example, but not limited to, when the portion of the route is a portion of the route containing a traffic sign (e.g., but not limited to, a sign providing a speed limit for the portion of the route, a sign warning of road works on the portion of the route, a priority sign, or any other traffic signs forcing motor vehicles to change their speed), the data associated with a mandatory deceleration point will include such coordinates of the mandatory deceleration point, at which the motor vehicle has to start moving at least without positive acceleration, or, but not limited to, with a suitable negative acceleration, wherein said coordinates may ensure that the movement of the motor vehicle along trajectories requiring the motor vehicle to slow down significantly or stop in an allowed space in accordance with the traffic regulations concerning the traffic sign in place, which, therefore, ensures that the motor vehicle slows down in an energy-efficient way, and the traffic on the portion of the route is safe. In addition, the data associated with the traffic sign in place may be either associated in advance with the given portion of the route based on the information from an external database, or read by the motor vehicle's environmental sensors, including, for example, but not limited to, the first motor vehicle's environmental sensors, such as a camera, but not limited to. In addition, such data may be subsequently used to generate an energy-efficient track for the vehicle in operation (second motor vehicle). For example, but not limited to, when the portion of the route is a portion of the route containing an obstacle (e.g., but not limited to, a permanent obstacle, such as, but not limited to, an artificial irregularity, or a temporary obstacle, such as damaged pavement, road works, a rockslide, a traffic accident, or any other obstacle forcing motor vehicles to change their speed), the data associated with a mandatory deceleration point will include such coordinates of the mandatory deceleration point, at which the motor vehicle has to start moving with a suitable negative acceleration, wherein said coordinates may ensure that the movement of the motor vehicle along trajectories requiring the motor vehicle to slow down significantly in order to pass through or go around the obstacle in accordance with the traffic regulations concerning the obstacle in place is energy efficient, which, therefore, ensures that the motor vehicle slows down in an energy-efficient way, and the traffic on the portion of the route is safe. In addition, the data associated with the obstacle may be either associated in advance with the given portion of the route based on the information from an external database, or read by the motor vehicle's environmental sensors, including, for example, but not limited to, the first motor vehicle's environmental sensors, such as a camera, but not limited to. In addition, such data may be subsequently used to generate an energy-efficient track for the vehicle in operation (second motor vehicle).

In addition, but not limited to, the data associated with the portion of the route to be passed by the first motor vehicle may further include any of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof. Such additional data, preferably, but not limited to, allow to generate energy-efficient and safe estimated tracks for motor vehicles in situations, where a plurality of motor vehicles is moving in an urban area.

For example, but not limited to, an estimated track for the motor vehicle may be generated, in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to intersect said another portion of the road without stopping. In addition, but not limited to, the data obtained from a traffic control means, such as, but not limited to, traffic lights, signal that it is allowed to move as described above without stopping, when the first motor vehicle reaches the mandatory deceleration point. In addition, but not limited to, an estimated track for the first motor vehicle may be generated, wherein, but not limited to, the time that the first motor vehicle requires to pass said another portion of the road moving from the mandatory deceleration point to the end point of passing said another portion of the road is also calculated. In addition, the end point of passing said another portion of the route, preferably, but not limited to, is not located on said another portion of the route and, preferably, but not limited to, is located along the direction of movement of the first motor vehicle and along the trajectory that intersects said another portion of the route. Preferably, but not limited to, based on the time calculation, an estimated speed profile of the first motor vehicle for the estimated track for the first motor vehicle is generated, wherein the estimated speed profile contains at least one of the following: the first motor vehicle moving through the mandatory deceleration point without changing its speed; the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the route; or the first motor vehicle moving through the mandatory deceleration point while increasing its speed so as to pass through said another portion of the route within the time limit that corresponds to the previously calculated time that the first motor vehicle requires to pass said another portion of the route. In addition, preferably, but not limited to, as soon as the time calculation establishes that the motor vehicle, upon reaching the mandatory deceleration point, will be moving in accordance with a pre-defined speed profile, and such movement will ensure that it passes the portion of the route smoothly along the trajectory, which intersects said another portion of the route, with enough time before the traffic control means (traffic lights) switches its signals, an estimated speed profile will be generated, the profile including at least the first motor vehicle moving through the mandatory deceleration point without changing its speed, or, but not limited to, without changing its pre-defined speed profile. In addition, preferably, but not limited to, as soon as the time calculation establishes that the motor vehicle, upon reaching the mandatory deceleration point, will be moving in accordance with a pre-defined speed profile, and such movement will not ensure that it passes the portion of the route smoothly along the trajectory, which intersects said another portion of the route, within the time remaining before the traffic control means (traffic lights) switches its signals, an estimated speed profile will be generated, the profile including at least the first motor vehicle moving through the mandatory deceleration point while reducing its speed until it stops completely in the mandatory stop point, wherein the mandatory stop point is located after the mandatory deceleration point along the direction of movement of the first motor vehicle and within the portion of the route it is moving along, i.e. before the area that lies within said another portion of the route to be crossed, and, therefore, the mandatory stop point is located along the direction of movement of the first motor vehicle and along the trajectory that does not intersect said another portion of the road. In addition, preferably, but not limited to, as soon as the time calculation establishes that the motor vehicle, upon reaching the mandatory deceleration point, will be moving in accordance with a pre-defined speed profile, and such movement will not ensure that it passes the portion of the route smoothly along the trajectory, which intersects said another portion of the route, within the time remaining before the traffic control means (traffic lights) switches its signals, but at the same time it has been established that the motor vehicle will be able to pass the portion of the route within the remaining time in case it increases its speed within allowed limits, an estimated speed profile will be generated, the profile including at least the first motor vehicle moving (with a speed that is allowed on the given portion of the route) through the mandatory deceleration point while increasing its speed so as to pass through said another portion of the route within the time limit that corresponds to the previously calculated time that the first motor vehicle requires to pass said another portion of the road. In addition, but not limited to, the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof. Preferably, but not limited to, the data associated with motor vehicles moving along the portion of the route before the first motor vehicle, or before the vehicle in operation (second) motor vehicle, as well as motor vehicles moving along other portions of the route, may be transferred and propagated in data exchange environments based on data exchange technologies, such as vehicle-to-vehicle (V2V)

and vehicle-to-everything (V2X). In addition, but not limited to, the estimation may be obtained by analyzing the database, which is formed, as was described above with reference to FIG. 7, for example, but not limited to, in the form of statistics, depending, for example, but not limited to, on time, or in the form of data processed using machine learning methods. Therefore, after these data have been obtained, the estimated tracks for the first motor vehicle, the vehicle in operation (second motor vehicle), and all the following motor vehicles may include changes to the mandatory deceleration points that were defined in advance, adding new acceleration points to the portion of the route, adding new deceleration points to the portion of the route, and other changes, which prevent the trajectories of motor vehicles from intersecting, while also ensuring that their movement along connected portions of the route or within the given portion of the route is energy efficient.

For example, but not limited to, an estimated track for the motor vehicle may also be generated, in case when the data associated with the mandatory deceleration point are the data associated with the mandatory deceleration point located on the portion of the route intersected by another portion of the route and when the infrastructure data of the portion of the route contain data obtained from a traffic control means signaling that it is not allowed to intersect said another portion of the route without stopping. In addition, the data from the traffic control means (traffic lights), preferably, but not limited to, are obtained for the moment when the first motor vehicle would reach the mandatory deceleration point. In addition, but not limited to, an estimated track for the first motor vehicle may be generated, wherein the time when the traffic control means would again signal that it is allowed to intersect said another portion of the road without stopping is also calculated; and, based on the time calculation, for example, but not limited to, the mandatory deceleration point is relocated so as to allow the first motor vehicle to move along the trajectory that intersects said another portion of the route without stopping, when the traffic control means signals that it is allowed to intersect said another portion of the road without stopping, and thus preventing an unwanted stop of the motor vehicle and ensuring traffic safety on the given portion of the route. In addition, but not limited to, the data associated with the portion of the route include at least data associated with several mandatory deceleration points. In addition, but not limited to, the data associated with mandatory deceleration points are data associated with mandatory deceleration points on the portion of the route that are located, respectively, before other portions of the route intersecting said portion of the route. In addition, but not limited to, the data obtained from traffic control means are associated with each respective other portion of the route. Therefore, but not limited to, the aforementioned steps of obtaining and calculating time, and replacing the mandatory deceleration point, can be performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

For example, but not limited to, in case the data associated with the portion of the route to be passed by the first motor vehicle further include at least data associated with a motor vehicle located on said another portion of the route, an estimated track for the motor vehicle may be generated. In addition, but not limited to, a track for the motor vehicle located on said another portion of the route may be generated, wherein said track may contain at least, but not limited to, data associated with said another portion of the route that motor vehicle is moving along, and wherein the data associated with said another portion of the route include, but not limited to, data associated with the trajectory of the motor vehicle moving along said another portion of the route. In addition, but not limited to, the data associated with the portion of the route to be passed by the first motor vehicle may further include data associated with the trajectory of the first motor vehicle. In addition, but not limited to, said trajectory data include data associated with an intersection between the first motor vehicle's trajectory and that of the motor vehicle moving along said another portion of the route, the mandatory deceleration point may be relocated so as to prevent the first motor vehicle and the motor vehicle moving along said another portion of the route from reaching said intersection at the same time, while also enabling the first motor vehicle to move along its trajectory without stopping, and thus it may be possible to ensure that the movement of motor vehicles along the portion of the route is both safe and energy efficient.

For example, but not limited to, in case the data associated with the portion of the route to be passed by the first motor vehicle further include at least data associated with a motor vehicle located on the portion of the route at the mandatory deceleration point or in its vicinity, an estimated track for the motor vehicle may be generated. Therefore, preferably, but not limited to, a track for a motor vehicle that is located in the direction of movement of the first motor vehicle may be generated; and the mandatory deceleration point may be relocated so as to generate an estimated track for the first motor vehicle that would correspond to the estimated track for the motor vehicle on the portion of the route at the mandatory deceleration point or in its vicinity, wherein the first motor vehicle is moving along the portion of the route at a lesser speed than the motor vehicle on the portion of the route at the mandatory deceleration point or in its vicinity, thus preventing the aforementioned motor vehicles from being present in the same point of the portion of the route at the same time.

For example, but not limited to, the data associated with the portion of the route to be passed by the first motor vehicle may further include at least one of the following: estimation of a motor vehicle being present on another portion of the route, estimation of a motor vehicle being present on the portion of the route at the mandatory deceleration point or in its vicinity, or a combination thereof. In addition, for example, but not limited to, in case the data associated with the portion of the route to be passed by the first motor vehicle further include the estimation of a motor vehicle being present on said another portion of the route, an estimated track for the motor vehicle that may be present on said another portion of the route is generated. In addition, but not limited to, the aforementioned estimated track may contain at least data associated with said another portion of the route that motor vehicle may be moving along, and, but not limited to, the data associated with said another portion of the route may include data associated with the estimated trajectory of the motor vehicle, which may be moving along said another portion of the route. In addition, but not limited to, the data associated with the portion of the route to be passed by the first motor vehicle may further include data associated with the trajectory of the first motor vehicle, and, but not limited to, in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point may be relocated so as to prevent the first motor vehicle and the motor vehicle moving along said another portion of the route from reaching said intersection at the same time. In addition, preferably, but not limited to, the first motor vehicle may be enabled to move along its trajectory without stopping. In addition, but not limited to, in case the data associated with the portion of the route to be passed by the first motor vehicle further include the estimation of a motor vehicle being present on the portion of the route at the mandatory deceleration point or in its vicinity, an estimated track for that motor vehicle may be also generated, and the mandatory deceleration point may be relocated so as to generate an estimated track for the first motor vehicle that would correspond the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

In addition, but not limited to, any aforementioned portion of the route, regardless of whether it is a part of an urban area, may contain a non-mandatory deceleration point. Preferably, but not limited to, such non-mandatory deceleration point, unlike a mandatory deceleration point, does not force the driver to decrease the speed of the motor vehicle, but in effect can be used to do just this. For example, but not limited to, a portion of the route may contain an incline that may be passed by a motor vehicle with either the same speed, an acceleration, or a deceleration, which allows a non-mandatory deceleration point to be placed on said portion of the route. For example, but not limited to, a portion of the route may contain some sort of visual obstruction, which is not critical and thus does not force the motor vehicle to slow down when moving along said portion of the route. For example, but not limited to, such visual obstructions can be caused by weather conditions on the given portion of the route, such as, for instance, fog, rain, snowfall, sunshine, etc. In addition, but not limited to, fog, rain, or snowfall on the given portion of the route may not always force the motor vehicle to slow down, especially if the vehicle is already moving with a speed that is allowed for the given weather conditions. In addition, but not limited to, visual obstructions may be caused even by bright sunshine, e.g., by short-term glares, which may not always force the motor vehicle to slow down, especially if the vehicle is already moving with a speed that is allowed for the given portion of the route. For example, but not limited to, visual obstructions on a portion of the route can be caused by changes in illumination, e.g., but not limited to, during the night, when the vehicle crosses from an illuminated portion of the route to an unilluminated portion of the route. However, but not limited to, such situation also may not force the motor vehicle to slow down, especially if the vehicle is already moving with a speed that is allowed for the given portion of the route. However, but not limited to, non-mandatory deceleration points may be placed on such portions of the route in order to improve traffic safety. However, it should be obvious to a person having ordinary skill in the art that the aforementioned—or similar—visual obstructions may not be inherent to a given portion of the route, but may appear at certain moments in time or may depend on weather conditions. For example, but not limited to, fog, rain, or snowfall are not inherent to any given portion of the route, but they may appear at certain moments in time or due to certain weather conditions. For example, but not limited to, bright sunlight causing visual obstructions is not inherent to any given portion of the route, but it may appear at a certain time of day, when the vehicle is moving in a certain direction. For example, changes in illumination of a given portion of the route causing visual obstructions may happen at a certain time of day or depend the state of the infrastructure on the given portion of the route.

In addition, but not limited to, the portion of the route to be passed by the first motor vehicle may contain data associated with a mandatory stop point for the first motor vehicle. For example, but not limited to, the mandatory stop point for the first motor vehicle may be placed on the portion of the route to be passed by the first motor vehicle, in case the first motor vehicle needs maintenance. For example, but not limited to, the mandatory stop point for the first motor vehicle may be placed on the portion of the route to be passed by the first motor vehicle, in case the first motor vehicle has been moving for a period of time that exceeds the maximum movement time for the first motor vehicle, or the first motor vehicle has been moving for a period of time that is close to the maximum movement time for the first motor vehicle, or the portion of the route, which follows the aforementioned portion of the route to be passed by the first motor vehicle, contains a remote possible stop point that is located so that in case the first motor vehicle is moving along the portion of the route to be passed by the first motor vehicle without stopping at the mandatory stop point, its movement time will significantly exceed the maximum movement time for the first motor vehicle. In addition, but not limited to, usually, a maximum movement time can be determined for both the first motor vehicle and the second motor vehicle, so that the driver can rest, and/or the first motor vehicle or the second motor vehicle needs maintenance. In addition, but not limited to, after the maximum movement time for the first motor vehicle and/or the maximum movement time for the second motor vehicle have been determined, it is possible to position mandatory stop points on each portion of the route to be passed by either motor vehicle, each such point being a final point of the portion of the route or, but not limited to, an intermediate point of portion of the route. For example, but not limited to, such mandatory stop point for the first motor vehicle can be placed on the portion of the route to be passed by the first motor vehicle, in case the first motor vehicle needs to replenish energy that is spent on its movement, or in case the subsequent mandatory stop point, which can be used by the first motor vehicle to replenish its energy, is located so far from the mandatory stop point located on said portion of the route, that the current energy of the first motor vehicle is not enough to reach it, or, based on the current energy of the first motor vehicle, it will require unacceptable operation of the first motor vehicle to reach a remote mandatory stop point that can be used by the first motor vehicle to replenish its energy. For example, but not limited to, such unacceptable operation for the first motor vehicle, in case it is equipped with an internal combustion engine or a hybrid engine, may include driving the first motor vehicle, when the fuel level is below a predetermined mark, i.e. when further operation of the vehicle may cause, e.g., but not limited to, fuel starvation of the fuel pump or airlock in the fuel system. For example, but not limited to, such unacceptable operation for the first motor vehicle, in case it is equipped with an electric motor, may include driving the first motor vehicle, when its speed has to be reduced to a level that is unacceptable for the given energy efficiency, but which is required to reach a remote mandatory stop point that can be used by the first motor vehicle to replenish its energy. In addition, but not limited to, the first motor vehicle will stay on any of the aforementioned mandatory stop points for a given period of time, e.g., a long one, which can be calculated and set for the first motor vehicle in advance. In addition, but not limited to, the situation on the portion of the route, including the situation on a generalized portion of the route, i.e. one that combines the plurality of aforementioned portions of the route to be passed by the first motor vehicle, may change over the given period of time the vehicle does not move, which, accordingly, will require the track for the first motor vehicle to be generated again, as described above. In addition, but not limited to, the mandatory stop point can be determined and placed on a portion of the route to be passed by the first motor vehicle taking into account the data associated with the actual movement time of the first motor vehicle, which form the basis for calculating the remaining permissible movement time for the motor vehicle from the maximum movement time for the first motor vehicle. In addition, but not limited to, the mandatory stop point can be determined and placed on a portion of the route to be passed by the first motor vehicle taking into account the aforementioned estimated and/or actual energy consumption data for the first motor vehicle. In addition, but not limited to, when the track for the first motor vehicle is generated, as described above, the estimation of energy efficiency of the first motor vehicle on the passed portion of the route takes into account any stop made by the first motor vehicle for a given period of time at any of the mandatory stop points. This is one method, but not limited to, of obtaining data associated with which mandatory stop point for the first motor vehicle is the optimum one. Accordingly, it will not be difficult to determine corresponding optimal mandatory stop points for the second motor vehicle (vehicle in operation) and any subsequent motor vehicle on the portion of the route passed by the first motor vehicle, or a different one, which allows to generate a more accurate energy-efficient track for the second motor vehicle (vehicle in operation).

In addition, but not limited to, the methods and means disclosed above may be used, particularly, to generate the most optimal estimated track for the first motor vehicle. In addition, but not limited to, energy efficiency of the actual track for the motor vehicle is analyzed using the method disclosed above, wherein, based on the results of the analysis, after the estimated track for the vehicle in operation (second motor vehicle) has been generated, the same additional data associated with the portion of the route may be used, which have already been used when generating the estimated track for the first motor vehicle, or, for example, but not limited to, some data may be omitted, because they were not corroborated by the actual results of how the first motor vehicle passed the portion of the route. In addition, but not limited to, aforementioned possible deceleration points that include mandatory deceleration points and/or non-mandatory deceleration points may be used to activate braking electrical recuperation systems in order to improve energy efficiency on a given portion of the route. In addition, but not limited to, the step 101 of generating a track for the first motor vehicle, described above, may include energy-efficiency evaluation of the first motor vehicle on the passed portion of the route, which may further include energy-efficiency evaluation of the first motor vehicle on the passed portion of the route along with energy-efficiency evaluation of the braking electrical recuperation system of the first motor vehicle, which is activated depending on, but not limited to, the corresponding possible deceleration point. In addition, but not limited to, it should be noted that energy-efficiency of the braking electrical recuperation system of the first motor vehicle is evaluated, and said evaluation may be at least either positive or negative, thus allowing to use the evaluation results when generating an estimated track for the second motor vehicle. In addition, but not limited to, certain threshold values can be set for the energy-efficiency evaluation of the electrical recuperation system to be considered positive. In addition, but not limited to, it should be generally noted that any electric energy replenishment with the help of a braking electrical recuperation system results in a higher energy efficiency of the motor vehicle on the portion of the route than the one obtained when the motor vehicle has passed the portion of the route without making use of its braking electrical recuperation system. Therefore, but not limited to, the vehicle in operation (second motor vehicle) may also act as the first motor vehicle for any following motor vehicle to be moving along the portion of the route, with which the additional data and mandatory deceleration points are associated. Therefore, safer and more energy efficient tracks may be continuously generated for the following motor vehicles, and the resulting data and estimated tracks can be stored in the database to be used subsequently, for example, but not limited to, to model and generate increasingly more optimized energy efficient and safe tracks.

In addition the method for generating an energy-efficient track for the vehicle in operation moving along a portion of the route containing a mandatory deceleration point or the method for generating a recuperation energy-efficient track for the vehicle in operation disclosed above can be implemented using the devices, methods, and systems as described above with reference to FIGS. 1-10, which, accordingly, are not described in further detail.

Figure 12:
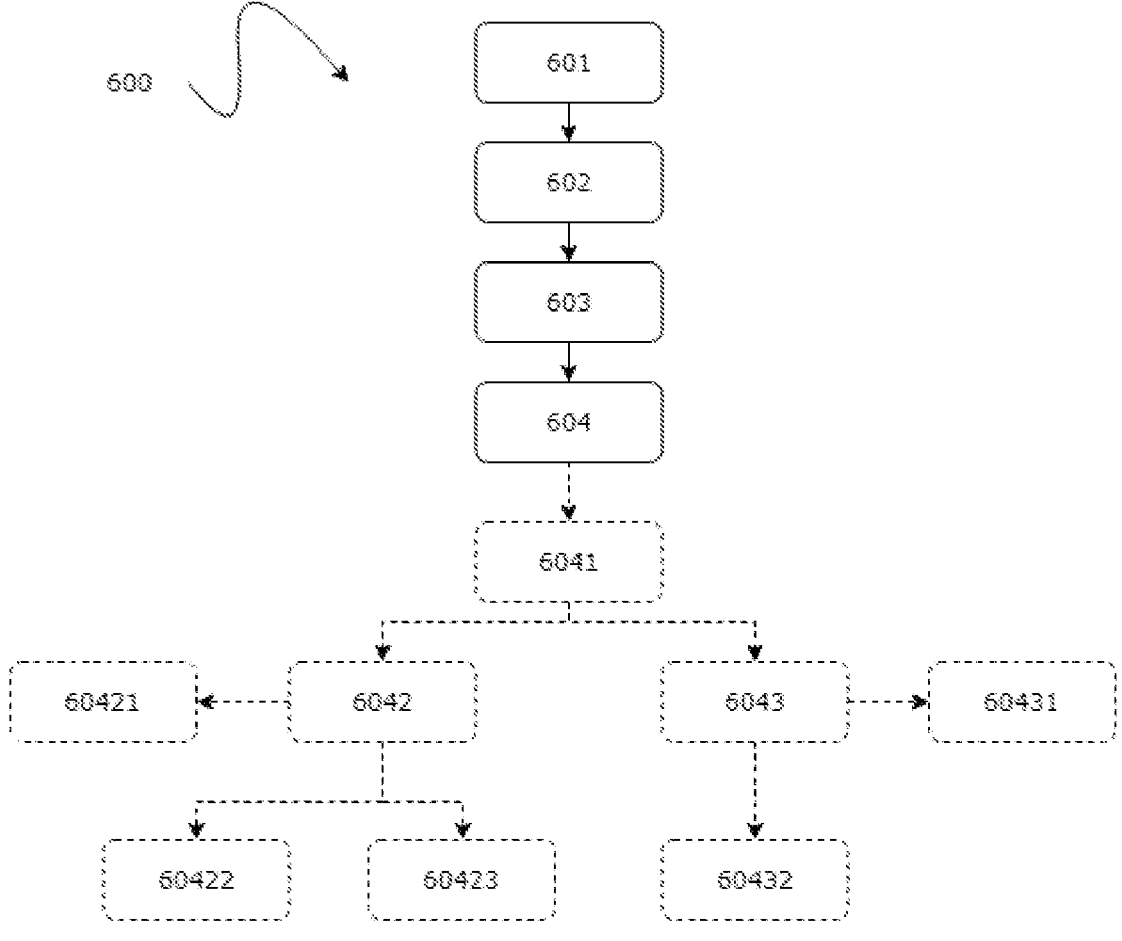
FIG. 12 illustrates an exemplary, non-limiting, diagram for the method 600 for generating an energy-efficient track for the vehicle in operation moving along a portion of the route in an urban area.

It should be noted that, when the vehicle in operation is moving along a portion of the route in an urban area, i.e. a portion of the route along which one or more motor vehicles, other than the vehicle in operation, may be moving and which may intersect or connect to other such portions of the route, and the traffic on which is governed by certain traffic regulations, there may be provided, as shown in FIG. 12, the method 600 for generating an energy-efficient track for the vehicle in operation moving along a portion of the route in an urban area. For example, but not limited to, this method 600 is performed by any of the aforementioned computer devices and generates a track for the vehicle in operation that is both energy efficient and safe, since it takes into account trajectories of other motor vehicles. For example, but not limited to, this method 600 comprises at least the following steps: generating 601 the first energy-efficient track for the vehicle in operation moving along a portion of the route in an urban area, the track comprising at least a speed profile of the vehicle in operation and its trajectory on the portion of the route, wherein the first energy-efficient track for the vehicle in operation is generated for a portion of the route, which is free from other vehicles; detecting 602 a second motor vehicle located on the same portion of the route and generating an energy-efficient track for the second motor vehicle, the track comprising at least a speed profile of the second motor vehicle and its trajectory on the portion of the route, wherein the energy-efficient track for the second motor vehicle is generated for the portion of the route, which is free from other vehicles; comparing 603 the first energy-efficient track for the vehicle in operation and the energy-efficient track for the second motor vehicle in order to obtain the comparison data comprising the data of joint trajectories of the vehicle in operation and the second motor vehicle moving along the portion of the route with their respective speed profiles; and generating 604 the second energy-efficient track for the vehicle in operation based on the comparison data obtained. Therefore, for example, but not limited to, energy efficient and safe motion of the vehicle in operation is provided in an urban area, taking into account dynamic obstacles on the portion of the route, such as other motor vehicles. Preferably, but not limited to, in step 601, first, the first energy-efficient track for the vehicle in operation is generated, which is, preferably, but not limited to, an energy-efficient track, as was shown with reference to FIGS. 1-11, but which also includes the trajectory of the vehicle in operation on the specified given portion of the route, and wherein, preferably, but not limited to, this first energy-efficient track for the vehicle in operation is generated for an ideal portion of the route, i.e. one that is, preferably, but not limited to, free from data about other motor vehicles. Thus, but not limited to, an ideal energy-efficient track for the vehicle in operation is generated, which may be then adjusted based on the data about other motor vehicles obtained from a server of the system for generating an energy-efficient track for the vehicle in operation on a portion for the route in an urban area, and/or from servers of other city traffic control systems employed on the specified portion of the route, and/or from other motor vehicles, for example, through data exchange protocols, such as vehicle-to-vehicle (V2V) and vehicle-to-everything (V2X). Also, but not limited to, in step 602, the second motor vehicle is detected on the specified portion of the route and its energy-efficient track is generated, which, like the first energy-efficient track for the vehicle in operation mentioned above, generally, but not limited to, is an energy-efficient track, as was shown with reference to FIGS. 1-11, but which also includes the trajectory of the second motor vehicle on the specified given portion of the route, and wherein, preferably, but not limited to, this energy-efficient track for the second motor vehicle is generated for an ideal portion of the route, i.e. one that is, preferably, but not limited to, free from data about other motor vehicles. Thus, but not limited to, an ideal energy-efficient track for the second motor vehicle is generated, which may be then adjusted based on the data about other motor vehicles obtained from a server of the system for generating an energy-efficient track for a motor vehicle on a portion for the route in an urban area, and/or from servers of other city traffic control systems employed on the specified portion of the route, and/or from other motor vehicles, for example, through data exchange protocols, such as vehicle-to-vehicle (V2V) and vehicle-to-everything (V2X). Preferably, but not limited to, after the first energy-efficient track for the vehicle in operation and the energy-efficient track for the second motor vehicle have been generated, i.e. when speed profile and trajectory data for both the vehicle in operation and the second motor vehicle moving along the same portion of the route have been obtained, it is possible to perform step 603, in which comparison data comprising the data of joint trajectories of the vehicle in operation and the second motor vehicle moving along the portion of the route with their respective speed profiles are obtained, and then, based on these comparison data, to perform step 604, in which the second energy-efficient track for the vehicle in operation is generated. In addition, but not limited to, the second energy-efficient track for the vehicle in operation is, optionally, different from the first energy-efficient track for the vehicle in operation, as it may turn out, based on the results of speed profile and trajectory comparison mentioned above, that the vehicle in operation and the second motor vehicle won't happen to be in the same point of the portion of the route at the same moment in time, and, therefore, there will be no need to adjust the first energy-efficient track for the vehicle in operation, and thus the first energy-efficient track for the vehicle in operation can be used in place of the second energy-efficient track for the vehicle in operation. However, but not limited to, if the comparison data indicate that the vehicle in operation and the second motor vehicle may happen to be in the same point of the portion of the route at the same time, then the first energy-efficient track for the vehicle in operation and/or the energy-efficient track for the second motor vehicle have to be adjusted, so as to prevent these vehicles from being present in the same point of the portion of the route at the same time. In order to achieve that, but not limited to, the step 604 of generating the second energy-efficient track for the vehicle in operation based on the comparison data may be performed by the CPU of an aforementioned computer device, the step comprising the following steps: comparing 6041 the trajectories of the vehicle in operation and the second motor vehicle on the same portion of the route, along which the vehicle in operation and the second motor vehicle are moving together; and a step A 6042 of generating the second energy-efficient track for the vehicle in operation, the track comprising at least the second trajectory of the vehicle in operation on the portion of the route, which does not intersect the trajectory of the second motor vehicle on the same portion of the route; or a step B 6043 of generating a second energy-efficient track for the vehicle in operation, the track comprising the trajectory of the vehicle in operation on the portion of the route, wherein this trajectory intersects the trajectory of the second motor vehicle on the same portion of the route, and an adjusted speed profile of the vehicle in operation, wherein the adjusted speed profile is generated so that only one of the vehicle in operation or the second motor vehicle would be present in the point of intersection between said trajectories of the vehicle in operation and the second motor vehicle at any given point in time. In addition, but not limited to, in step 2041, the data of the vehicle in operation and the second motor vehicle moving together along the same portion of the route are obtained, which may indicate that their trajectories intersect. In addition, but not limited to, in step 2042, the aforementioned step A is performed, in which the second energy-efficient track for the vehicle in operation is generated, which includes the second trajectory of the vehicle in operation, which does not intersect the trajectory of the second motor vehicle moving along the same portion of the route. For instance, but not limited to, the second energy-efficient track for the vehicle in operation generated in step 6042 may be useful in a situation, when the vehicle in operation is moving along a portion of the route, on which multiple trajectories are available for the vehicle in operation, wherein one of the trajectories does not intersect the trajectory of the second motor vehicle, for example, but not limited to, when the portion of the route comprises two lanes going in the same direction, and the second motor vehicle is moving along either of these lanes, and thus the trajectory for the vehicle in operation is selected, so that it moves in a lane, where there is no second motor vehicle. In addition, but not limited to, step 6042 may further include the step 60421 of generating the second energy-efficient track for the second motor vehicle that includes at least the second trajectory of the second motor vehicle on the specified portion of the route, wherein this second trajectory does not intersect the second trajectory of the vehicle in operation on the same portion of the route, wherein the second energy-efficient track for the second motor vehicle generated in step A further comprises an adjusted speed profile of the second motor vehicle, wherein said adjusted speed profile is generated so as to obtain the second trajectory of the second motor vehicle on the specified portion of the route, which does not intersect the second trajectory of the vehicle in operation on the same portion of the route. For instance, but not limited to, the second energy-efficient track for the vehicle in operation generated in step 60421 may be useful in a situation, when the original data indicated that, based on their respective profiles, the trajectories of the vehicle in operation and the second motor vehicle intersect, but a change in the speed profile of the vehicle in operation in relation to the trajectory of the second motor vehicle may remove the possibility of trajectories intersecting, for example, but not limited to, when the portion of the route comprises a single lane going in a given direction and a switch to another portion of the route, and the second motor vehicle is moving along a trajectory that connects the first portion of the route and another portion of the route, but its speed prevents free movement of the vehicle in operation with its current speed profile, which thus requires the speed profile to be adjusted, so as to provide that the movement of the vehicle in operation along the specified portion of the route is energy effective and trajectories of the vehicle in operation and the second motor vehicle do not intersect, that is, but not limited to, the vehicle in operation should slow down temporarily in order to allow the second motor vehicle to switch to another portion of the route allowing the vehicle in operation to continue its movement along the first portion of the route freely. In addition, but not limited to, step 6042 may further include the step 60422 of generating the second energy-efficient track for the second motor vehicle that includes at least the second trajectory of the second motor vehicle on the specified portion of the route, wherein this second trajectory does not intersect the second trajectory of the vehicle in operation on the same portion of the route, wherein, optionally, the second energy-efficient track for the second motor vehicle generated in step A further comprises an adjusted speed profile of the second motor vehicle, wherein said adjusted speed profile is generated so as to obtain the second trajectory of the second motor vehicle on the specified portion of the route, which does not intersect the second trajectory of the vehicle in operation on the same portion of the route. For instance, but not limited to, the second energy-efficient track for the second motor vehicle generated in step 60422 may be useful in the situation described above with reference to step 60421, when the speed profile of the second motor vehicle can be adjusted, so that the second motor vehicle safely switches to another portion of the route allowing the vehicle in operation to move freely and safely along the first portion of the route without adjusting its speed profile, for example, but not limited to, in a situation, when the second motor vehicle may accelerate, so as to switch to another portion of the route before its trajectory intersects that of the vehicle in operation. In addition, but not limited to, the trajectory of the second motor vehicle may comprise a point of deceleration of the second motor vehicle on the portion of the route, and, for example, but not limited to, the second energy-efficient track for the vehicle in operation generated in step A 6042 further comprises an adjusted speed profile of the vehicle in operation, wherein said adjusted speed profile is generated so as to obtain the second trajectory of the vehicle in operation on the specified portion of the route, which does not include the point of deceleration of the second motor vehicle on the same portion of the route. For instance, but not limited to, this may be useful in a situation, when the portion of the route comprises two lanes going in the same direction and a traffic control means that forces the second motor vehicle, taking into account its trajectory, to occupy the lane that includes a point of deceleration (such as, but not limited to, a point before the switch to another portion of the route, i.e., but not limited to, a turn or a U-turn), and therefore the vehicle in operation has to occupy the lane that does not include a point of deceleration of the second motor vehicle. In addition, but not limited to, when the trajectory of the second motor vehicle includes a point of deceleration of the second motor vehicle, step 6042 may further comprise step 60423, in which step A 6042 further comprises a step of generating a second energy-efficient track for the second motor vehicle, the track comprising at least the second trajectory of the second motor vehicle on the portion of the route, wherein this trajectory includes an adjusted point of deceleration of the second motor vehicle, and wherein this adjusted point of deceleration is selected so as to provide for the second trajectory of the second motor vehicle, which does not intersect the second trajectory of the vehicle in operation on the portion of the route. For instance, but not limited to, this may be useful in a situation, when the point of deceleration of the second motor vehicle, e.g., before the switch to another portion of the route, may be shifted closer to or further from the second motor vehicle in the direction of its movement, so that the motor vehicle could speed up or slow down, respectively, so that the trajectory of the vehicle in operation does not include the point of deceleration of the second motor vehicle, for example, but not limited to, in a situation, when the vehicle in operation also needs to switch to another portion of the route, but can do it with the required level of energy efficiency without adjusting its speed profile, and when the second motor vehicle is able to adjust its speed profile in an energy efficient way, which still allows it to speed up or slow down according to the situation. In addition, but not limited to, the second energy-efficient track for the second motor vehicle generated in step A 6042 further comprises an adjusted speed profile of the second motor vehicle, wherein said adjusted speed profile is generated so as to obtain the second trajectory of the second motor vehicle on the specified portion of the route, which includes the point of deceleration of the second motor vehicle, which is not a point situated on the second trajectory of the vehicle in operation on the portion of the route. For instance, but not limited to, this may be useful in a situation, when, taking into account the trajectory of the second motor vehicle, it is possible to select several points of deceleration on the portion of the route, but any of the several points of deceleration is on the trajectory of the vehicle in operation, for example, but not limited to in a situation, when both vehicles are moving along the portion of the route comprising several lanes, one of which allows to switch to another portion of the route, and the vehicle in operation is on the trajectory allowing to make a safe and energy efficient switch to another portion of the route, taking into account its speed profile, and therefore, the point of deceleration of the second motor vehicle may be placed on the second motor vehicle's current lane, so that the vehicle in operation can switch to another portion of the route, which allows the second motor vehicle subsequently occupy the required lane that will be free from the vehicle in operation unobstructed. In addition, but not limited to, step B 6043 further comprises a step of generating a second energy-efficient track for the vehicle in operation, the track comprising the trajectory of the vehicle in operation on the portion of the route, wherein this trajectory intersects the trajectory of the second motor vehicle on the same portion of the route, and an adjusted speed profile of the vehicle in operation, wherein the adjusted speed profile is generated so that only one of the vehicle in operation or the second motor vehicle would be present in the point of intersection between said trajectories of the vehicle in operation and the second motor vehicle at any given point in time. For instance, but not limited to, this may be useful in a situation, when the portion of the route allows only such trajectories of the vehicle in operation and the second motor vehicle that intersect, and therefore, it is necessary to adjust the speed profile of the vehicle in operation, so that it won't happen to be in the same point of the portion of the route at the same time with the second motor vehicle, for example, but not limited to, when both vehicles are switching to other portions of the route, and therefore, their trajectories intersect, and the required level of energy efficiency for the vehicle in operation allows it to speed up or slow down, so as to make a safe and energy efficient switch to another portion of the route without being in the point of intersection at the same time as the second motor vehicle. In addition, but not limited to, step 6043 may further comprise step 60431 of generating a second energy-efficient track for the second motor vehicle, the track comprising the trajectory of the second motor vehicle on the portion of the route, wherein this trajectory intersects the trajectory of the vehicle in operation on the same portion of the route, and an adjusted speed profile of the second motor vehicle, wherein the adjusted speed profile is generated so that only one of the vehicle in operation or the second motor vehicle would be present in the point of intersection between said trajectories of the vehicle in operation and the second motor vehicle at any given point in time. For instance, but not limited to, this may be useful in the situation described above with reference to step 6043, but when it is not enough to adjust the speed profile of the vehicle in operation, and in order to provide energy efficient and safe movement for the vehicle in operation and the second motor vehicle, the speed profile of the second motor vehicle has to be adjusted as well. In addition, but not limited to, when the trajectory of the second motor vehicle includes a point of deceleration, step 6043 may further comprise step 60432 of generating a second energy-efficient track for the second motor vehicle, the track comprising the trajectory of the second motor vehicle on the portion of the route, wherein this trajectory intersects the trajectory of the vehicle in operation on the same portion of the route and includes an adjusted point of deceleration of the second motor vehicle, and an adjusted speed profile of the second motor vehicle, wherein the adjusted speed profile is generated and the adjusted point of deceleration of the second motor vehicle is selected so that only one of the vehicle in operation or the second motor vehicle would be present in the point of intersection between said trajectories of the vehicle in operation and the second motor vehicle at any given point in time. For instance, but not limited to, this may be useful in a situation, when the vehicle in operation and the second motor vehicle both switch to the same portion of the route, but the second motor vehicle makes the switch through a mandatory deceleration point that is intersected by the trajectory of the vehicle in operation, and therefore, the point of deceleration of the second motor vehicle and its speed profile have to be adjusted so that the movement of the vehicle in operation is energy efficient and safe. It should be obvious to a person having ordinary skill in the art that there can be multiple second motor vehicles, and, therefore, the second energy-efficient track for the vehicle in operation can be generated taking into account the data of a plurality of second motor vehicles, their energy-efficient tracks, trajectories, speed profiles, and deceleration points. It should be obvious to a person having ordinary skill in the art that in any given situation, the second motor vehicle can be considered to be the vehicle in operation and, respectively, the vehicle in operation can be considered to be one of the second motor vehicles, therefore, the steps of the method 600 described above with reference to FIG. 12 can be applied to the second motor vehicle as well. These conditions, preferably, but not limited to, allow a plurality of motor vehicles to move energy-efficiently and safely along the same portion of the route at the same time.

In addition, the method for generating an energy-efficient track for the vehicle in operation moving along a portion of the route in an urban area disclosed above can be implemented using the devices, methods, and systems as described above with reference to FIGS. 1-11, which, accordingly, are not described in further detail.

In addition, but not limited to, any one of the estimated tracks for any motor vehicle, first energy-efficient tracks for the vehicle in operation, main energy-efficient tracks for the vehicle in operation, energy-efficient tracks for the vehicle in operation moving along a highway, adjustment energy-efficient tracks for the vehicle in operation, energy-efficient tracks for the vehicle in operation moving along a portion of the route containing a mandatory deceleration point, energy-efficient tracks for the vehicle in operation moving along a portion of the route in an urban area, recuperation energy-efficient tracks for the vehicle in operation, or energy-efficient tracks for the vehicle in operation moving along a portion of the route containing a mandatory stop point, described above, including those described with reference to FIGS. 1-12, which, as will be disclosed below, are considered to be non-modified energy-efficient tracks, may be further modified, if necessary, in situations, when some energy efficiency can be yielded in order to, e.g., but not limited to, pass a portion of the route faster, or increase the time, and/or frequency, and/or efficiency of useful operation of the vehicle. Preferably, but not limited to, this can be achieved by implementing a method 700 for generating a modified energy-efficient track for the vehicle in operation, that is performed by the computer's CPU, the method comprising at least the following steps: a step 701 of generating a non-modified energy-efficient track for the vehicle in operation; a step 702 of determining a portion of the route that is associated with the non-modified energy-efficient track for the vehicle in operation; an optional step 703 of determining the first estimated time of the vehicle in operation needs to pass the portion of the route associated with the non-modified energy-efficient track for the vehicle in operation; a step 704 of determining the first estimated energy efficiency of the vehicle in operation that is associated with the portion of the route associated with the non-modified energy-efficient track for the vehicle in operation; an optional step 705 of determining the threshold energy efficiency of the vehicle in operation that is associated with the portion of the route associated with the non-modified energy-efficient track for the vehicle in operation; and a step 706 of adjusting the non-modified energy-efficient track for the vehicle in operation in order to obtain a modified energy-efficient track for the vehicle in operation. In addition, preferably, but not limited to, the threshold energy efficiency of the vehicle in operation described in the optional step 705 is different from the first estimated energy efficiency of the vehicle in operation. For example, but not limited to, the threshold energy efficiency of the vehicle in operation may be lower than the first estimated energy efficiency of the vehicle in operation. For example, but not limited to, the threshold energy efficiency of the vehicle in operation may be higher than the first estimated energy efficiency of the vehicle in operation. In addition, preferably, but not limited to, the modified energy-efficient track for the vehicle in operation resulting from step 706 includes at least the second estimated energy efficiency of the vehicle in operation that is associated with the portion of the route associated with the non-modified energy-efficient track for the vehicle in operation. In addition, preferably, but not limited to, the non-modified energy-efficient track for the vehicle in operation is adjusted according to step 706, so that the second estimated energy efficiency of the vehicle in operation is different from the first estimated energy efficiency of the vehicle in operation or corresponds to the threshold energy efficiency of the vehicle in operation. For example, but not limited to, the modified energy-efficient track for the vehicle in operation resulting from step 706 further includes the second estimated time the vehicle in operation needs to completely pass the portion of the route that is associated with the non-modified energy-efficient track from the vehicle in operation, wherein, but not limited to, the second estimated time the vehicle in operation needs to completely pass the same portion of the route as the portion of the route that is associated with the non-modified energy-efficient track for the vehicle in operation, is different from the first estimated time. For example, but not limited to, the second estimated time may be less than the first estimated time. For example, but not limited to, the second estimated time may be greater than the first estimated time. For example, but not limited to, the second estimated energy efficiency may be lower than the first estimated energy efficiency of the vehicle in operation. For example, but not limited to, the second estimated energy efficiency of the vehicle in operation may be higher than the first estimated energy efficiency of the vehicle in operation. For example, but not limited to, the second estimated energy efficiency may be lower than the threshold energy efficiency of the vehicle in operation. For example, but not limited to, the second estimated energy efficiency of the vehicle in operation may be higher than the threshold energy efficiency of the vehicle in operation. For example, but not limited to, the second estimated energy efficiency of the vehicle in operation may correspond to its threshold energy efficiency or may somewhat differ from it.

Figure 13:
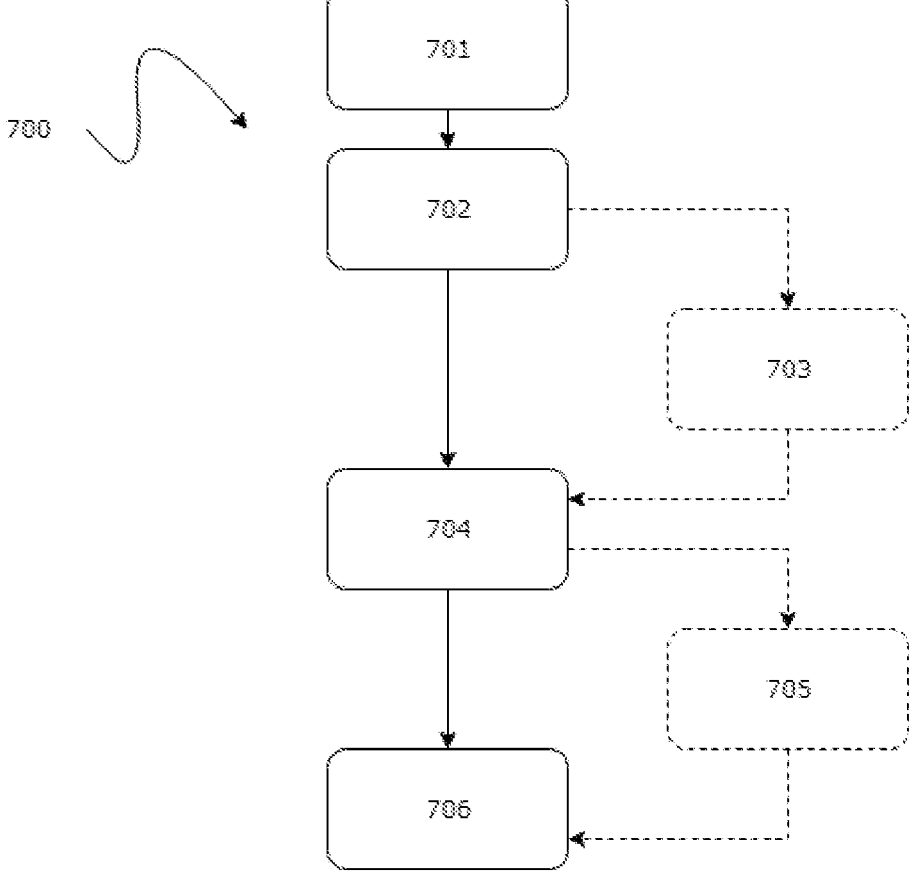
FIG. 13 illustrates an exemplary, non-limiting, diagram for the method 700 for generating a modified energy-efficient track for the vehicle in operation.

Therefore, as has been shown above with reference to FIG. 13, the non-modified energy-efficient tracks can be adjusted depending on the needs of the user and/or, but not limited to, the operator of the motor vehicle, or depending on the needs of the organization managing the vehicle fleet, or of an individual division of the organization that manages the organization's fleet. In general, but not limited to, it should be noted that by modifying non-modified energy-efficient tracks, it is possible not only to reduce the time a motor vehicle needs to pass a portion of the route, but also to increase it through new energy efficiency requirements. It should also be noted, but not limited to, that the non-modified energy-efficient tracks are generally generated to pass portions of the route, which these tracks are associated with, with maximum energy efficiency that can be achieved only when the motor vehicle passes the given portion of the route within the first estimated time. However, but not limited to, maximum energy efficiency on any given portion of the route may not be needed, as it may disagree with the current needs of the user or the vehicle, e.g., but not limited to, it may be needed to pass the given portion of the route within a time period that is different from the first estimated time. It should also be noted, but not limited to, that the relationship between the time a motor vehicle needs to completely pass a portion of the route and its energy efficiency on that portion of the route is not self-evident, i.e. depending on the portion of the route, the primary data associated with the portion of the route and/or the motor vehicle, and depending on modification purposes, it may be decided that, e.g., but not limited to, without modifying the non-modified energy-efficient track, the first estimated energy efficiency of other non-modified energy-efficient tracks that are associated with the subsequent portions of the route to be passed by the motor vehicle, may be reduced. Therefore, but not limited to, even in case a non-modified energy-efficient track has been modified, wherefore the second estimated energy efficiency, and thus the resulting energy efficiency that is determined based on how the vehicle in operation has passed the given portion of the route, are lower than the first estimated energy efficiency, said modification may be good for passing subsequent portions of the route as no further modifications of non-modified energy-efficient tracks associated with those portions of the route may be required. At the same time, wherever it is applicable and permissible, the second estimated energy efficiency may be higher than the first estimated energy efficiency, or even higher than the threshold energy efficiency, which may also be good for the resulting energy efficiency of a plurality of connected portions of the route, especially if there are indications that the traffic situation on the subsequent portions of the route has changed.

In addition, the aforementioned method for generating a modified energy-efficient track for the vehicle in operation can be implemented using the devices, methods, and systems disclosed above with reference to FIGS. 1-12, which, accordingly, are not described in further detail.

In addition, but not limited to, a variety of methods, devices, and navigation systems for vehicles can be proposed, which use the aforementioned energy-efficient tracks, including both non-modified and modified ones. Preferably, but not limited to, this can be achieved by implementing a method 800 for generating an energy-efficient driving route for a motor vehicle, that is performed by the computer's CPU, the method comprising at least the following steps: step 801 of determining the location of the vehicle in operation on the first portion of the route, wherein the first portion of the route includes the first waypoint for the vehicle in operation; step 802 of generating the first energy-efficient driving track for the vehicle in operation, that is associated with the first portion of the route; step 803 of determining at least one second portion of the route associated with the first portion of the route, wherein the second portion of the route includes the second waypoint for the vehicle in operation; and step 804 of generating the second energy-efficient driving track for the vehicle in operation, that is associated with the second portion of the route. In addition, but not limited to, the first waypoint for the vehicle in operation is its starting point, which may or may not correspond to the location of the vehicle in operation. For example, but not limited to, if the vehicle in operation is not moving, then its starting point may correspond to the determined location of the vehicle in operation. Also, for example, but not limited to, if the vehicle in operation is not moving, then its starting point may be located on the portion of the route along the direction of movement of the vehicle in operation. For example, but not limited to, while the vehicle in operation is moving along the first portion of the route, its starting point may be determined along the direction of its movement, which may be useful in a situation, when the positioning signal is insufficiently discretized, which causes lags in determining the real location of the vehicle in operation. In addition, but not limited to, the first energy-efficient driving track may be generated taking into account the location of the vehicle in operation on the first portion of the route, and, accordingly, the set of instructions, control and/or information signals that are contained in said first energy-efficient driving track, may be sent to the motion control system and/or on-board information system of the vehicle in operation taking into account the starting point, i.e. only those instructions, control and/or information signals that are pertinent to the first portion of the route after the starting point. At the same time, but not limited to, regardless of whether the first waypoint is the starting point, this waypoint can be used to identify the first portion of the route, for which the first energy-efficient driving track for the vehicle in operation has to be generated. In addition, but not limited to, in step 802, the first energy-efficient track for the vehicle in operation is generated, which has to be used by the vehicle in operation when passing the first portion of the route, wherein the passing can be seen as both complete passing and partial passing, starting, for example, but not limited to, from the starting point. In addition, but not limited to, the first energy-efficient driving track for the vehicle in operation may be any one of the estimated tracks for motor vehicles, first energy-efficient tracks for vehicles in operation, main energy-efficient tracks for vehicles in operation, energy-efficient tracks for vehicles in operation moving along a highway, adjustment energy-efficient tracks for vehicles in operation, energy-efficient tracks for vehicles in operation moving along a portion of the route containing a mandatory deceleration point, energy-efficient tracks for vehicles in operation moving along a portion of the route in an urban area, recuperation energy-efficient tracks for vehicles in operation moving along a portion of the route containing a mandatory stop point, and modified energy-efficient tracks for vehicles in operation, that have been disclosed above with reference to FIGS. 1-13 and therefore are not described in further detail. In addition, but not limited to, when the first energy-efficient driving track for the vehicle in operation is not an estimated track, such first energy-efficient driving track may be obtained from the database of energy-efficient tracks, in case one was generated before for the given vehicle in operation. At the same time, if such first energy-efficient driving track was not generated before for the given vehicle in operation and stored in the database of energy-efficient tracks, then it may be obtained by the corresponding method performed by the CPU of the computer device, as has been shown with reference to FIGS. 1-13, and then stored it the database for further use. In addition, but not limited to, if the vehicle in operation is the first motor vehicle, then the first energy-efficient driving track can be generated for it, which is an estimated track, as has been shown with reference to FIG. 1, and can be used later to generate first energy-efficient driving tracks for other motor vehicles. In addition, but not limited to, in step 803, the second portion of the route is determined, which is associated with the first portion of the route. For example, but not limited to, such second portion of the route may be chosen, so that as soon as the vehicle in operation completely passes the first portion of the route, as has been shown above, it immediately starts passing the second portion of the route. At the same time, for example, but not limited to, such second portion of the route may be chosen, so that as soon as the vehicle in operation completely passes the first portion of the route, it can start passing any other portion of the route that has to be passed for it to start passing the second portion of the route. At the same time, for example, but not limited to, such second portion of the route may be chosen, so that as soon as the vehicle in operation completely passes the first portion of the route, it can start passing a series of other portions of the route that have to be passed for it to start passing the second portion of the route. It should be generally noted, however, that any route for the vehicle in operation, that includes both the first portion of the route and the second portion of the route, will be an energy-efficient route, as the vehicle in operation will move in an energy-efficient way along at least the first portion of the route and the second portion of the route, even if said portions are not directly connected, i.e. when the final point of the first portion of the route does not coincide with the starting point of the second portion of the route or is not located anywhere within the second portion of the route. In addition, but not limited to, the second portion of the route does not have to contain a final point, i.e., a point in which the energy-efficient route, which has been generated for the vehicle in operation in accordance to the method 800, comes to an end. In other words, such second portion of the route may be an intermediate portion of the route within a regular route, and so an energy-efficient route for a vehicle in operation can be generated as part of a regular route, which itself is not energy efficient. In addition, but not limited to, in step 804, the second energy-efficient driving track associated with the second portion of the route is generated for the vehicle in operation. Such second energy-efficient driving track for the vehicle in operation, just as the aforementioned first energy-efficient driving track, but not limited to, may be any one of the estimated tracks for motor vehicles, first energy-efficient tracks for vehicles in operation, main energy-efficient tracks for vehicles in operation, energy-efficient tracks for vehicles in operation moving along a highway, adjustment energy-efficient tracks for vehicles in operation, energy-efficient tracks for vehicles in operation moving along a portion of the route containing a mandatory deceleration point, energy-efficient tracks for vehicles in operation moving along a portion of the route in an urban area, recuperation energy-efficient tracks for vehicles in operation moving along a portion of the route containing a mandatory stop point, and modified energy-efficient tracks for vehicles in operation, that have been disclosed above with reference to FIGS. 1-13 and therefore are not described in further detail. In addition, but not limited to, when the second energy-efficient driving track for the vehicle in operation is not an estimated track, such second energy-efficient driving track may be obtained from the database of energy-efficient tracks, in case one was generated before for the given vehicle in operation. At the same time, if such second energy-efficient driving track was not generated before for the given vehicle in operation and stored in the database of energy-efficient tracks, then it may be obtained by the corresponding method performed by the CPU of the computer device, as has been shown with reference to FIGS. 1-13, and then stored it the database for further use. In addition, but not limited to, if the vehicle in operation is the first motor vehicle, then the second energy-efficient driving track can be generated for it, which is an estimated track, as has been shown with reference to FIG. 1, and can be used later to generate second energy-efficient driving tracks for other motor vehicles. At the same time, it should be obvious to a person having ordinary skill in the art that any one of the second portions of the route can be used by method 800 as the first portion of the route, and, therefore, it will not be the second portion of the route, but it will be the first portion of the route, which allows to form a series of portions of the route associated with each other, that can be used to create longer energy-efficient driving routes.

Figure 14:
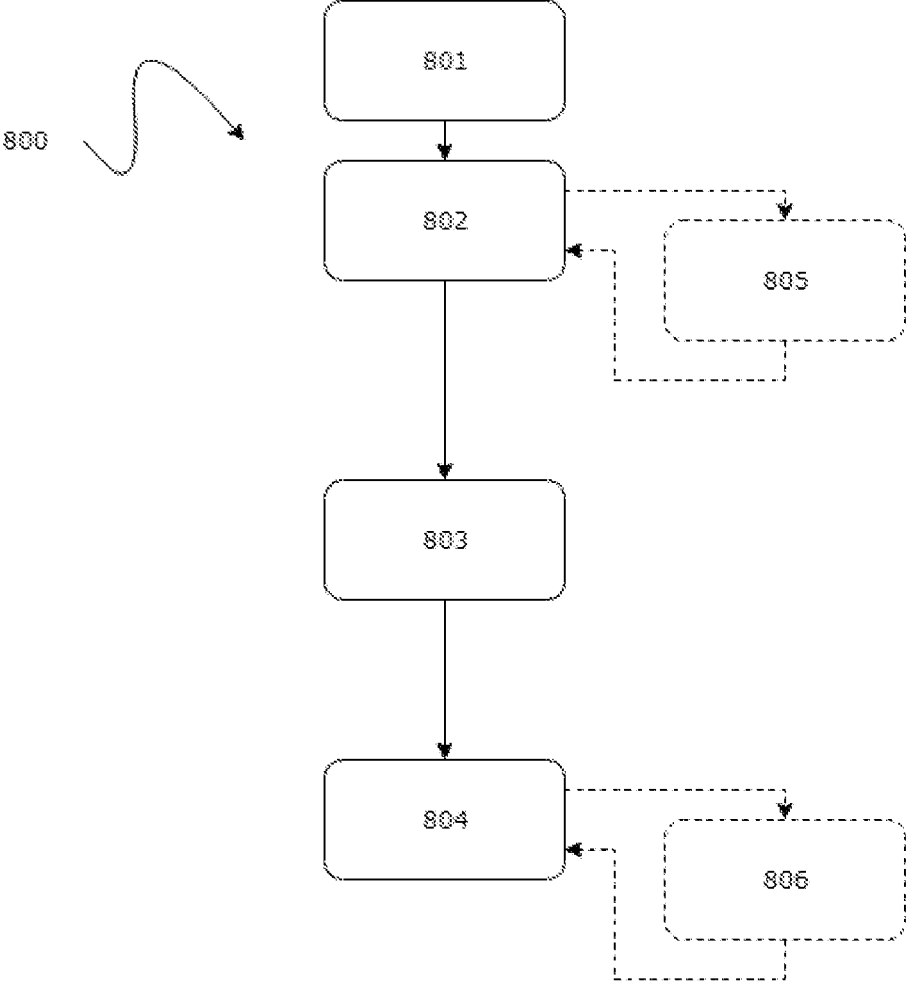
FIG. 14 illustrates an exemplary, non-limiting, diagram for the method 800 for generating an energy-efficient driving route.
Figure 15:
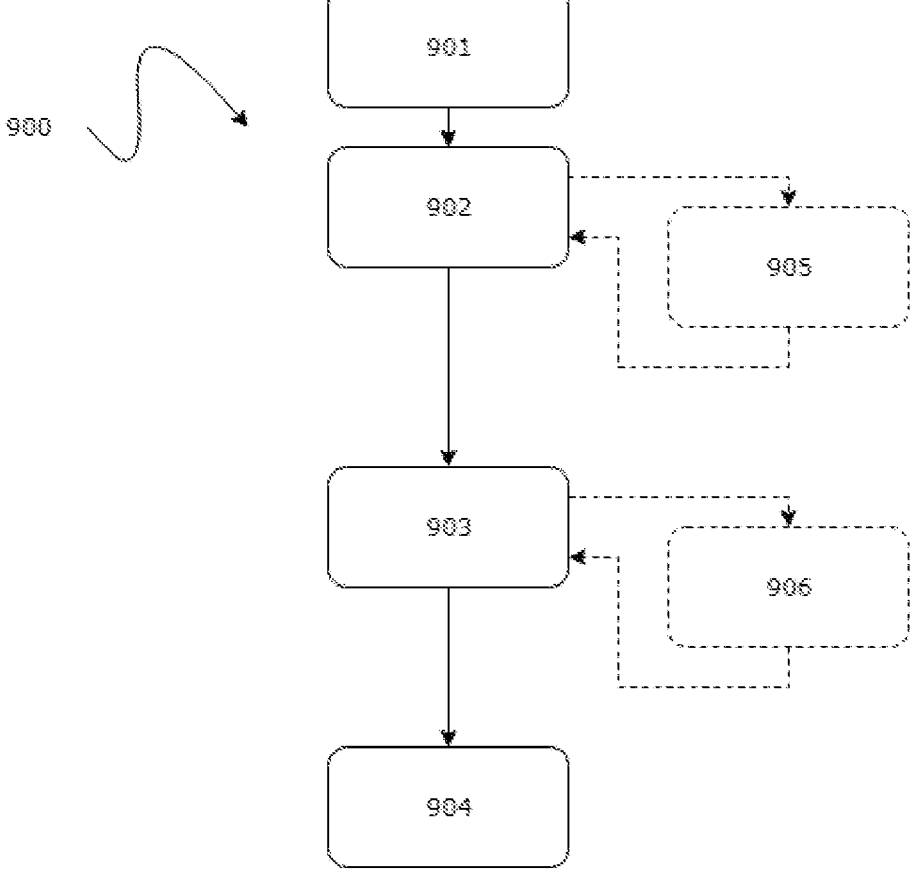
FIG. 15 illustrates an exemplary, non-limiting, diagram for the alternative method 900 for generating an energy-efficient driving route.

In addition, but not limited to, alternative methods, devices, and navigation systems for vehicles can also be proposed, which use the aforementioned energy-efficient tracks, including both non-modified and modified ones, as shown in FIG. 15. Preferably, but not limited to, this can be achieved by implementing a method 900 for generating an energy-efficient driving route for a motor vehicle, that is performed by the computer's CPU, the method comprising at least the following steps: step 901 of determining the location of the vehicle in operation on the first portion of the route, wherein the first portion of the route includes the first waypoint for the vehicle in operation; step 902 of generating the first energy-efficient driving track for the vehicle in operation, that is associated with the first portion of the route; step 903 of generating the second energy-efficient driving track for the vehicle in operation; and step 904 of determining at least one second portion of the route associated with the second energy-efficient driving route for the vehicle in operation and the first portion of the route. In addition, but not limited to, the steps 901 and 902 are identical to the steps 801 and 802, disclosed above with reference to FIG. 14, respectively, and thus will not be described in any further detail. In addition, but not limited to, in contrast to the sequence of steps 803 and 804, which is useful when a driving route for the vehicle in operation can only include the first and the second portions of the route, but not alternative ones, the sequence of steps 903 and 904 can be used to generate a driving route for the vehicle in operation, that is as energy efficient as possible, since it allows for selecting the second portion of the route from a plurality of second portions of the route, which are associated with a plurality of second energy-efficient driving tracks for the vehicle in operation, respectively. In addition, but not limited to, the second portions of the route and the second energy-efficient driving tracks are the second portions of the route and the second energy-efficient driving tracks, disclosed above with reference to FIG. 14, which, therefore, will not be described in any further detail. At the same time, as was disclosed above, an energy-efficient driving route for the vehicle in operation is generated according to method 900 so as to be as energy efficient as possible. To achieve this, preferably, but not limited to, the step 903 further includes at least the following steps: selecting at least two second energy-efficient driving tracks for the vehicle in operation, wherein said tracks are associated with one of the respective second portions of the route, each of which is, in turn, associated with the first portion of the route, and wherein the second portions of the route are not identical; comparing estimated energy efficiencies upon completion of each of the second portions of the route by the vehicle in operation; and determining the second energy-efficient driving track for the vehicle in operation, which is the second energy-efficient driving track for the vehicle in operation, associated with one of the second portions of the route, which has the highest estimated energy efficiency compared to other estimated energy efficiencies for other second portions of the route. Therefore, by performing method 900, it is possible to generate a driving route for the vehicle in operation, which is as energy efficient as possible, since the second portion of the route is selected so as to enable the vehicle in operation to move with the highest possible energy efficiency within the limits of the entire energy-efficient driving route. At the same time, it should be obvious to a person having ordinary skill in the art that any one of the second portions of the route can be used by method 900 as the first portion of the route, and, therefore, it will not be the second portion of the route, but it will be the first portion of the route, which allows to form a series of portions of the route associated with each other, that can be used to create longer energy-efficient driving routes.

Thus, preferably, but not limited to, other methods, devices, and systems for modifying energy-efficient driving routes for motor vehicles can also be proposed, which are based on the aforementioned methods for generating energy-efficient route, as disclosed with reference to FIGS. 14 and 15. Preferably, but not limited to, such methods, devices, and systems for modifying energy-efficient driving routes for motor vehicles are mostly identical to methods 800 and 900, which have been disclosed above with reference to FIGS. 14 and 15. However, but not limited to, those alternative methods for methods, devices, and systems for modifying energy-efficient driving routes for motor vehicles further include steps 805, 806 and 905, 906. In addition, preferably, but not limited to, in step 805, a modified first energy-efficient driving track for the vehicle in operation is generated, and/or, but not limited to, in step 806, a modified second energy-efficient driving track for the vehicle in operation is generated. In addition, preferably, but not limited to, the modified first energy-efficient driving track for the vehicle in operation, generated in step 805, remains associated with the first portion of the route, and, but not limited to, the modified second energy-efficient driving track for the vehicle in operation, generated in step 806, remains associated with the second portion of the route. In addition, preferably, but not limited to, in step 905, a modified first energy-efficient driving track for the vehicle in operation is generated, and/or, but not limited to, in step 906, a modified second energy-efficient driving track for the vehicle in operation is generated. In addition, preferably, but not limited to, the modified first energy-efficient driving track for the vehicle in operation, generated in step 905, remains associated with the first portion of the route. In addition, preferably, but not limited to, the modified second energy-efficient driving track for the vehicle in operation, generated in step 906, will be associated with the same second portion of the route as the non-modified second energy-efficient driving track, generated in step 903. In addition, preferably, but not limited to, the first energy-efficient driving tracks for the vehicle in operation and the second energy-efficient driving tracks for the vehicle in operation, generated in steps 802, 804, 902, 903, respectively, are non-modified energy-efficient driving tracks, which, in turn, in accordance with the present disclosure, are the non-modified energy-efficient tracks and, therefore, can be modified, as has been described above with reference to FIG. 13 and thus will not be described in any further detail. Therefore, when implementing any of the methods for modifying energy-efficient driving routes as described above, energy-efficient driving tracks can be modified so as to conform to user requirements, as has been shown above with reference to FIG. 13.

In addition, preferably, but not limited to, the methods disclosed with reference to FIGS. 14 and 15 can be performed using any one of the systems for generating energy-efficient tracks, disclosed above with reference to FIGS. 1-13, which will not be, therefore, described in further detail. In general, it should be noted that such computer systems are suitable for implementing both the methods for generating energy-efficient tracks and the methods for generating energy-efficient driving routes, and the methods for generating modified energy-efficient driving routes, since each of these systems comprises at least one computer device with a memory that stores software code(s) for generating energy-efficient tracks, and/or modified energy-efficient driving routes, and/or energy-efficient driving routes, the code(s) that can be performed by the CPU of the computer device. At the same time, systems for generating energy-efficient driving routes and modified energy-efficient driving routes may further comprise their own means for locating motor vehicles, which, nonetheless, is not mandatory, since the coordinates of motor vehicles can be obtained from external systems—in the same way as the primary data and secondary data, which are associated with the motor vehicles and portions of the route. Accordingly, such systems and methods for locating motor vehicles are known in the art and, therefore, are not described in further detail.

Preferably, but not limited to, while generating energy-efficient tracks and energy-efficient driving routes, disclosed above with reference to FIGS. 1-15, economy-efficient tracks and economy-efficient driving routes for the vehicle in operation are also generated, which, in addition to making the motor vehicle's movement more economy-efficient, also make it safer and increase the motor vehicle's durability through prevention of sudden breakdowns caused by inappropriate movement or unplanned downtime. As was mentioned above with reference to FIGS. 13-15, energy-efficient movement along a given portion of the route is not always profitable, particularly, in terms of useful operation of the motor vehicle. For example, but not limited to, it is not always necessary to pass a portion of the route in an energy-efficient way, since it may require the motor vehicle to move with a higher speed than is allowed on the given portion of the route. For example, but not limited to, it is inadvisable to move in accordance with an energy-efficient track, that requires high speed, along a portion of the route, the surface of which is of extremely low quality, and thus may incur premature wear and tear of motor vehicle's components, which may require an emergency repair in the future, thus reducing the total time of useful operation of the vehicle. At the same time, but not limited to, in a situation, when energy-efficient movement requires a speed that is too low for the given portion of the route or the route as a whole, the resulting time spent to pass a given portion of the route may be too long, and therefore, the required waypoint will not be reached in time, causing unexpected downtime for the motor vehicle, wherein a sequence of such downtimes may severely impact energy efficiency of transportation, since the motor vehicle would spend its energy not on useful operation, but on maintaining healthy environment in the cabin of the motor vehicle. Therefore, both energy-efficient tracks and energy-efficient driving routes, preferably, have to be modified, so that the motor vehicle could be continuously operated, which also allows to predict the manner of its operation and the wear of its components, thus performing the maintenance works as necessary and on time. At the same time, by generating an economy-efficient track for the vehicle in operation, it is possible to ensure that the user of the vehicle in operation, who uses it to earn money from transportation, such as, but not limited to, transportation of goods or passengers along the aforementioned portions of the route, makes use of the vehicle for the longest time possible, which brings maximum earnings, as it is also possible to predict the parameters of the vehicle's operation, such as time, nature, purpose, etc., providing data about the wear of its components and thus allowing to prevent unexpected breakdowns or plan maintenance, as well as ensuring that the movement is as risk-free as possible and avoiding unexpected downtimes. The user of the motor vehicle may be, for example, but not limited to, either a person using the vehicle in operation or an enterprise employing a fleet of motor vehicles which may have different parameters and data associated with them. The components of a motor vehicle that are worn over time may include both components that have to be replaced from time to time, such as tires, brake shoes, disk brake pads, car batteries, etc., and non-replaceable components, including, but not limited to, parts of the motion control system disclosed above, as well as other components that may require repair or replacement in case they break down. An economy-efficient track for the vehicle in operation may require, but not limited to, the data about earnings based on how the vehicle in operation has passed the set of portions of the route making up the driving route. At the same time, it should be obvious to a person having ordinary skill in the art that the more often the vehicle in operation completes driving routes rewarded by the employer, the higher the earnings. Therefore, it should be also obvious to a person having ordinary skill in the art that economic parameters of the transportation themselves are not important, but the earnings, based on the correlation between the costs and benefits of the movement in accordance with a given track of the motor vehicle, are. Therefore, but not limited to, it should be noted that, in accordance with the present disclosure, one should not take into account financial specifics of a given transportation in order to generate an economy-efficient track for the vehicle in operation, but rather one has to gain access to the data associated with the motor vehicle, the data associated with the portions of the route making up the driving route, the energy-efficient tracks for said portions of the route, the data about the correlation between costs and benefits resulting from how the motor vehicle has passed any one of said portions of the route, and the data about risks caused by moving in accordance with a given track. In addition, but not limited to, the correlation between costs and benefits, as well as data about the risks for the specific track, are mainly determined based on the available data associated with the motor vehicle, the portion of the route, and the speed profile of the given track. In general, it should be noted that the correlation between costs and benefits, as well as the risks, are calculated analytically based on such factors as energy efficiency of the track, infrastructure parameters of the portion of the route, weather conditions on the portion of the route, road surface quality, incident statistics, including traffic accidents, on the portion of the route, maximum time a vehicle can be operated on the portion of the route, the time required to pass the portion of the route, etc. In addition, but not limited to, based on energy efficiency of the track, it is possible to determine energy consumption on the portion of the route, taking into account, but not limited to, factors associated with the portion of the route and factors associated with the motor vehicle, including, e.g., its weight, aerodynamic resistance, component health, etc. The factors associated with the portion of the route allow to detect speed limits imposed on the motor vehicle moving along the portion of the route due to infrastructure, weather conditions, or road surface quality. The maximum time a vehicle can be operated may be affected by the operator's need for rest, which is crucial for traffic safety. The time required to pass the portion of the route may be affected by the movement schedule requiring the vehicle to arrive at a given waypoint at a certain time, which will impact the entire route, since, for instance, but not limited to, late arrival may cause downtime or make the operator look for a detour, which would lead for extra unplanned wear of the vehicle's components and extra energy consumption, i.e. energy waste, to maintain healthy environment in the cabin. In addition, but not limited to, based on the risk statistics for the portion of the route, it is possible to determine the degree of dangers for a given speed profile, thus allowing to rule out speed profiles posing dangers that exceed a certain threshold. In addition, but not limited to, the risk data may be represented by statistical data analyzed using machine learning methods that may detect unexpected correlations between dangers and speed profiles for any of the given portions of the route. In addition, but not limited to, it should be noted that in case risks exceed a certain threshold, then the corresponding speed profile is ruled out completely, since, among other things, there is a danger that transportation will not be completed at all or it will be completed with a significant delay, thus negating any benefits due increased energy efficiency and shorter time spent to pass a portion of the route. Accordingly, for each track and each portion of the route, there may be generated a financial model which has to include a corresponding correlation between costs and benefits and the results of how the portion of the route associated with the given track has been passed using the corresponding speed profile. In addition, but not limited to, said correlation can be brought up to date based on the comprehensive financial model of transportations using the given driving route, which, accordingly, includes correlations between costs and benefits and the results of how a set of connected portions of the route has been passed using corresponding speed profiles. Such comprehensive financial model of transportations, in turn, can be brought up to date based on other factors that are not directly related to the track of the portion of the route, but still affect said correlations. Such external factors may include factors related to the company's spending on the transportation, motor vehicle ownership, premises and their maintenance, salaries, etc. In general, the aforementioned factors affecting the financial model can serve as the basis for generating a financial model of the enterprise that utilizes the vehicle in operation in order to earn money from transportations made along the portions of the route mentioned above with reference to FIGS. 1-15. In addition, but not limited to, the comprehensive financial model of the enterprise will include fixed costs that depend on time and do not depend on the usage of the vehicle in operation, such as, e.g., but not limited to, premises rent, taxes or other payments, leasing costs, salaries for employees who do not operate motor vehicles, etc. Preferably, but not limited to, because such costs are fixed and do not depend on useful utilization of the vehicle in operation for transportations, they have to be, preferably, uniformly distributed among all units of the route to be passed by the vehicle in operation. Therefore, preferably, the vehicle in operation has to be utilized continuously without downtime. In addition to the aforementioned fixed costs, the financial model of the enterprise includes, but not limited to, variable costs, preferably, associated with using the vehicle in operation. Such variable costs are directly related to how often, how much and in what manner the vehicle in operation moves. In addition, preferably, but not limited to, any movement of the vehicle in operation has to be accounted for, such as movement during transportation, movement to the loading area, movement to the service station, movement to a parking lot for the operator to have a rest, etc. Such variable costs, accordingly, include, but not limited to, spendings on the energy of the vehicle in operation, salary for its operator, its maintenance, fines for traffic violations, penalties for failing to comply with transportation schedules, downtime due vehicle health deterioration or early/late arrival to a waypoint, etc. Accordingly, in order to reduce such variable costs, it is necessary that the vehicle in operation is continuously operated, and each portion of the route is passed as economy-efficiently as possible, i.e., with maximum permissible energy efficiency and safety. At the same time, the aforementioned financial model of the enterprise also includes, but not limited to, the earnings of the enterprise from utilizing the vehicle in operation for transportations made along the portions of the route associated with energy-efficient tracks. Such earnings may be determined by general financial conditions of the transportations carried out by the enterprise, and have to be maximized over time. Thus, but not limited to, energy-efficient tracks for the vehicle in operation do not always help to reduce variable costs and increase the enterprise's earnings over time, since too fast movement along a portion of the route, even if it is energy-efficient, may result in a dangerous situation, just like too slow movement, even if it is safe, may result in late transportation and thus penalties from the customer. Therefore, there is a need to generate such track for the motor vehicle, which is as economy efficient as possible, i.e., its speed profile for each portion of the route has minimum risks and transportation costs for the enterprise are minimized, while each portion of the route is passed within a reasonable time frame, ensuring that the transportation is finished on time. At the same time, the purpose of the present invention is not to just search for correlations between costs and benefits, but to generate such a track that would enable the vehicle in operation to be utilized predictably without unexpected downtime, i.e. a track that makes it possible to usefully operate the motor vehicle for as long as possible, which is good for the resulting revenues and vehicle health as well, improving its reliability and safety. In this regard, according to the present disclosure, any correlation between costs and benefits and speed profiles of any track for any portion of the route can be used, since the method 1000 for generating an economy-efficient track for the vehicle in operation results in an economy-efficient track that makes it possible to usefully operate the motor vehicle for as long as possible, increasing the revenues upon completing the transportation route and thus making it possible to immediately start a new one without any unplanned delays.

Figure 16:
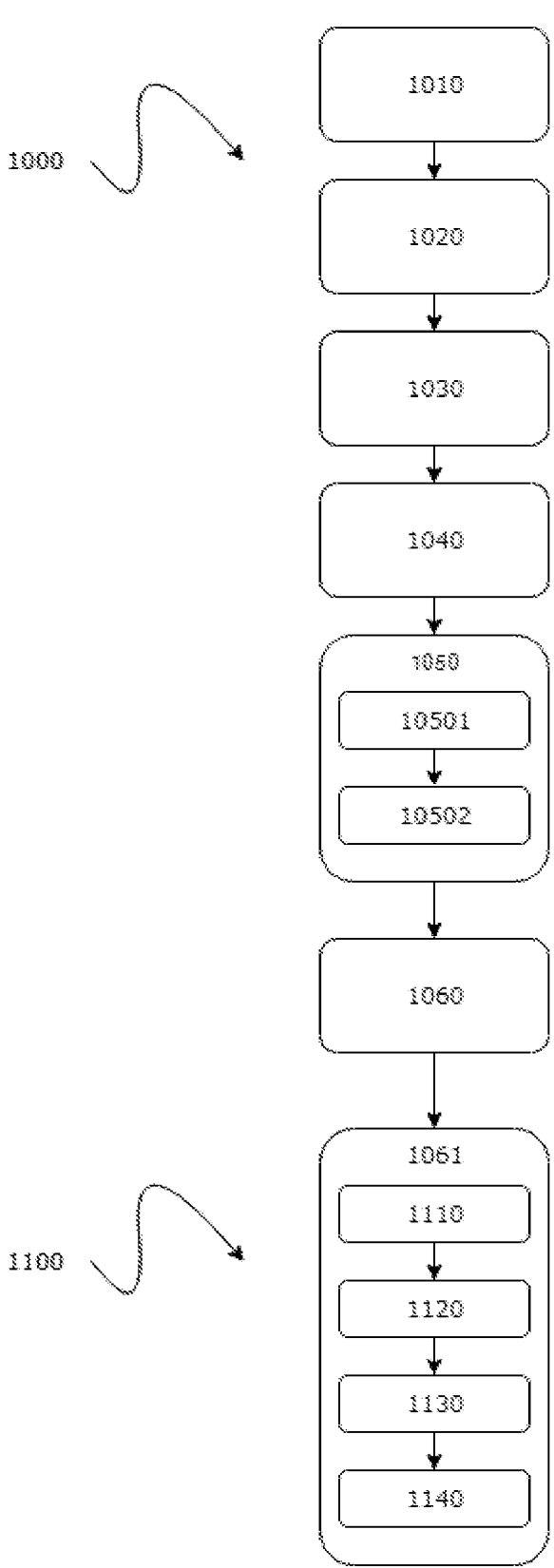
FIG. 16 illustrates an exemplary, non-limiting, diagram for the method 1000 for generating an economy-efficient track for the vehicle in operation.

Based on the above, FIG. 16 illustrates an exemplary, non-limiting, diagram for the method 1000 for generating an economy-efficient track for the vehicle in operation. Such method 1000 for generating an economy-efficient track for the vehicle in operation, performed by the CPU of the computer device, comprises, but is not limited to, the following steps: obtaining 1010 a financial model of the enterprise using the vehicle in operation for commercial transportation purposes, in order to obtain data about fixed costs of the enterprise, which do not depend on the usage of the vehicle in operation, data about variable costs of the enterprise, which do depend on the usage of the vehicle in operation, and data about the earnings of the enterprise from using the vehicle in operation to carry goods along portions of the route associated with energy-efficient tracks; based on the financial model of the enterprise, determining 1020 the correlation between the enterprise's spending and speed profiles associated with the aforementioned energy-efficient tracks; generating 1030 an energy-efficient track for the vehicle in operation in order to determine the correlation between the enterprise's spending on the energy for the vehicle in operation and speed profiles associated with the aforementioned energy-efficient tracks; generating 1040 a financial model for the portion of the route in order to determine the correlation between the enterprise's spending and each speed profile for each energy-efficient track; generating 1050 a risk model for the portion of the route in order to determine the correlation between the dangers for the vehicle in operation and each speed profile for each energy-efficient track; generating 1060 an economy-efficient track for the vehicle in operation by modifying speed profiles of the aforementioned energy-efficient track for each portion of the route, so that the dangers for the vehicle in operation on each portion of the route, as well as the enterprise's spending on transportation of goods along each portion of the route are minimized; and wherein it is ensured that the vehicle in operation passes each portion of the route within the scheduled time frame. In addition, preferably, but not limited to, said energy-efficient track is any energy-efficient track described with reference to FIGS. 1-15, including a modified energy-efficient track, a non-modified energy-efficient track, or any other energy-efficient driving track described above, which, therefore, will not be described in any further detail. In addition, but not limited to, each correlation between the spending and the speed profiles may be determined based on a plurality of energy-efficient tracks for various motor vehicles and for various portions of the route, with which said energy-efficient tracks are associated. Initially, such correlations are determined based on the aforementioned energy-efficient track, which, as has been shown above with reference to FIGS. 1-15, is continuously enhanced with the help of data obtained from a plurality of motor vehicles passing any given portion of the route. In addition, but not limited to, before the step 1050 of generating a risk model, there may be performed a step 10501 of determining the Vehicle Health Index (VHI) of the vehicle in operation, used to determine the set of parameters of the vehicle in operation that can be utilized in order to forecast defects in the vehicle's components and/or nodes that increase the danger for the vehicle in operation. In addition, but not limited to, said VHI can be obtained using various Vehicle Health Monitoring Systems or Vehicle Health Management Systems. Most typically, but not limited to, such Vehicle Health Monitoring Systems and/or Vehicle Health Management Systems are systems comprising a plurality of sensors adapted to extract data about the status of the vehicle's components and/or nodes and then transfer said data to a computer device to be processed and used to find and/or locate anomalies, defects, as well as to forecast changes in vehicle health. Such Vehicle Health Monitoring Systems and/or Vehicle Health Management Systems are known from the prior art (see, e.g., U.S. Pat. Nos. 5,671,141A, 6,192,302B1, 6,609,051B2, 6,836,708B2, 6,928,345B2, 8,346,429B2, 9,430,882B2, 8,849,497B2, 9,836,894B2 included herein by reference), and, therefore, are not described in any further detail. In addition, but not limited to, by using such Vehicle Health Monitoring Systems and/or Vehicle Health Management Systems, it is possible to determine the VHI that affects the possibility and the nature of further operation of the vehicle in any moment in time. In addition, but not limited to, before the step 1050 of generating a risk model, there may be performed a step 10502 of forecasting the VHI of the vehicle in operation after it passes a portion of the route in accordance with its energy-efficient track, in order to determine the correlation between the VHI of the vehicle in operation and the speed profile associated the energy-efficient track. Such correlation between the VHI and the speed profile associated with the energy-efficient track can be useful, but not limited to, to determine the permissible degree of deviation of the speed profile generated for the economy-efficient track using the method 1000, so that it conforms to the time required to pass a given portion of the route. Also, such correlation can be used to generate a risk model for the entire transportation, i.e., to generate a comprehensive risk model for a plurality of connected portions of the route. In addition, but not limited to, when generating a risk model in step 1050, the data associated with the vehicle in operation are used, as well as the data associated with the portion of the route, which have been described with reference to FIGS. 1-15, and, therefore, will not be described in any further detail. Such data allow to predictively calculate the chances of dangers for the vehicle in operation moving along a portion of the route in accordance with the speed profile of the energy-efficient track associated with said portion of the route. In addition, but not limited to, in the same step, it may be determined that there are no risks for the vehicle in operation, and thus, the energy-efficient track already contains a suitable speed profile. In this case, in the following step 1060, the speed profile of the vehicle in operation is changed only in the amount necessary to ensure that the portion of the route is passed within the required time frame. In addition, but not limited to, if no changes in the speed profile are necessary, then the corresponding energy-efficient track is considered to be economy-efficient as well. In other cases, but not limited to, a risk model enables to detect a correlation between the dangers for the vehicle in operation, such as its breakdown or any other critical deterioration of its VHI, and the speed profile, which allows to generate a new speed profile in step 1060, ensuring that the risks are minimized. In addition, but not limited to, the risk of dangers mainly depends on the data associated with the vehicle in operation, used to determine its current VHI, and the data associated with the portion of the route, including, but not limited to, data from external sources, such as infrastructure data of the portion of the route, meteorological data as of the moment the vehicle in operation passes the portion of the route, data about the quality of road surface on the portion of the route, environmental data of the portion of the route, such as, e.g., but not limited to, data about wildfires, avalanches, landslides, and/or mudslides, as well as traffic accident statistics for the portion of the route, including the data processed using machine learning techniques in order to detect factors and circumstances that may contribute to traffic accidents on the portion of the route. At the same time, it should be obvious to a person having ordinary skill in the art that the aforementioned dangers may prevent the transportation from being completed or cause unexpected downtime for the vehicle in operation, which, in turn, will affect the earnings from the transportation. Therefore, but not limited to, determining the risks and dangers is pivotal to generate a suitable speed profile for a given portion of the route. At the same time, it should be obvious to a person having ordinary skill in the art that the initial energy-efficient track generated for the given portion of the route may be represented by any economy-efficient track generated using the method 1000, that, therefore, can be continuously enhanced for each motor vehicle treated as the vehicle in operation, which allows to obtain ever more precise speed profiles for the economy-efficient track. In addition, but not limited to, each portion of the route, which has been assigned an economy-efficient track in the step 1050 and optional steps 10501, 10502, can be assigned a Transportation Risk Index (TRI), which is an interrelated set of parameters affecting the selection of a speed profile for the portion of the route. In addition, but not limited to, such TRI may be associated with a specific motor vehicle, taking into account the aforementioned data associated with that motor vehicle, ensuring that a correct and precise speed profile is generated in advance.

In addition, but not limited to, each economy-efficient track can be modified using a method that is similar to the one used for modifying energy-efficient tracks, as has been shown above with reference to FIG. 13. For instance, but not limited to, this may be useful in a situation, when the situation on the portion of the route, along which the vehicle in operation is moving, or situations on connected portions of the route change, and the need for adjusting any one individual economy-efficient track arises. Similarly, but not limited to such need may arise, when modifications of energy-efficient tracks did not result in the required economy-efficient tracks, and thus not only speed profiles have to be modified, but other parameters of the track, too, such as, for example, energy efficiency, which, particularly, can be modified by changing the parameters of the vehicle in operation itself, such as, for example, but not limited to, its health or weight. Therefore, each economy-efficient track generated in step 1060 is considered to be a non-modified economy-efficient track that can be modified in order to obtain a modified economy-efficient track. In order to achieve this, the additional step 1061 may further include method 1100 for generating a modified economy-efficient track for the vehicle in operation, performed by the CPU of the computer device, the method 1110 comprising at least the following steps: generating 1110 a non-modified economy-efficient track for the vehicle in operation; determining 1120 a portion of the route that is associated with the non-modified economy-efficient track for the vehicle in operation; determining 1130 the first estimated economy efficiency of the vehicle in operation that is associated with the portion of the route associated with the non-modified economy-efficient track for the vehicle in operation; adjusting 1140 the non-modified economy-efficient track for the vehicle in operation in order to obtain a modified economy-efficient track for the vehicle in operation, the track including at least the second estimated economy efficiency of the vehicle in operation that is associated with the portion of the route associated with the non-modified economy-efficient track for the vehicle in operation, wherein the non-modified economy-efficient track for the vehicle in operation is adjusted, so that the second estimated economy efficiency of the vehicle in operation is different from the first one. In addition, but not limited to, it should be noted that an estimated economy efficiency of the vehicle in operation is understood as an estimated profit resulting from the motor vehicle passing the given portion of the route, which is associated with an economy-efficient track, or an estimated profit resulting from the vehicle in operation passing all portions of the route making up the driving route.

Figure 17:
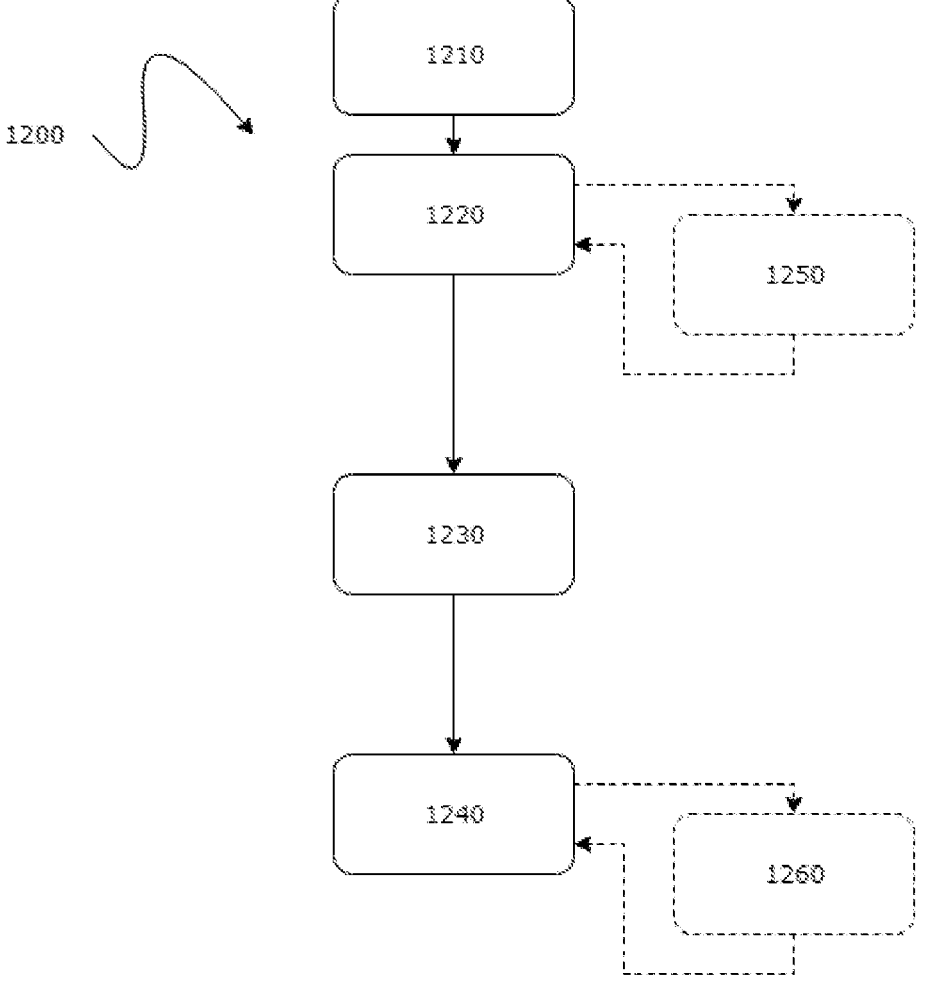
FIG. 17 illustrates an exemplary, non-limiting, diagram for the method 1200 for generating an economy-efficient driving route for the vehicle in operation.
Figure 18:
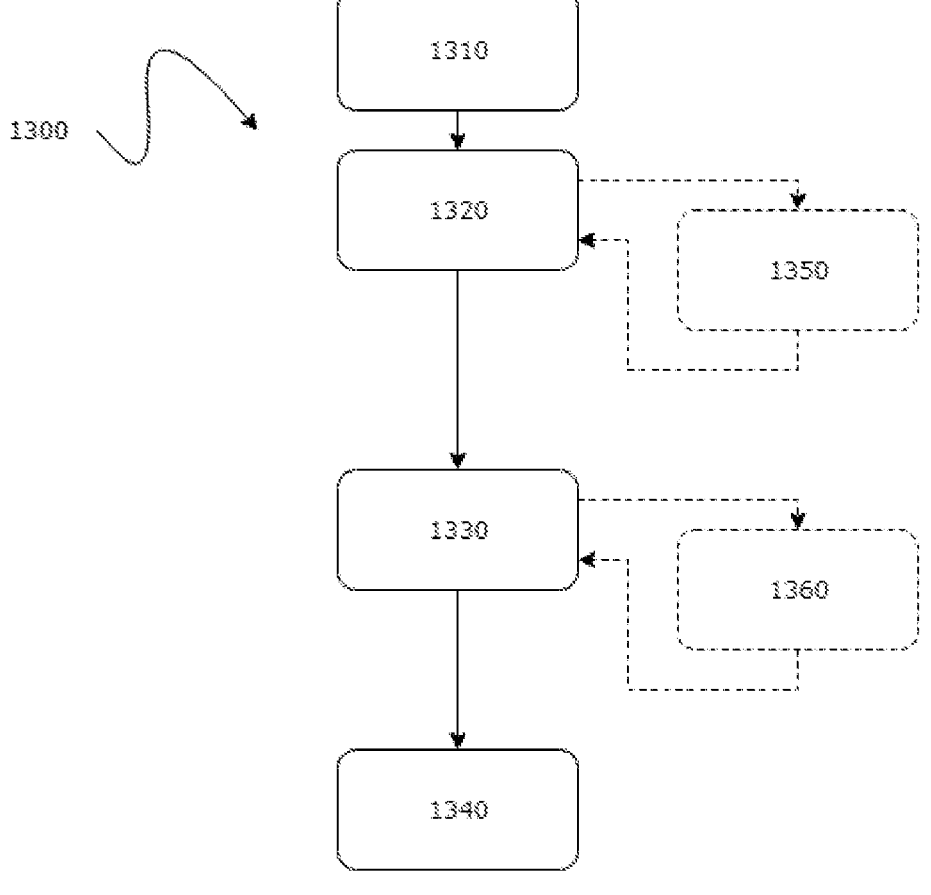
FIG. 18 illustrates an exemplary, non-limiting, diagram for the alternative method 1300 for generating an economy-efficient driving route.

In addition, but not limited to, as shown in FIGS. 17 and 18, there may be provided an economy-efficient driving route, which is mostly identical to the energy-efficient driving route that has been disclosed above with reference to FIGS. 14 and 15, but which employs economy-efficient tracks instead of energy-efficient tracks. Therefore, but not limited to, in the present disclosure, an economy-efficient track is considered to be an economy-efficient driving track. Therefore, but not limited to, there is provided a method 1200 for generating an economy-efficient driving route for the vehicle in operation, that is performed by the computer's CPU, the method comprising at least the following steps: a step 1210 (1310) of determining the location of the vehicle in operation on the first portion of the route, wherein the first portion of the route includes the first waypoint for the vehicle in operation; a step 1220 (1330) of generating the first economy-efficient driving track for the vehicle in operation, that is associated with the first portion of the route; and then, either a step 1230 of determining at least one second portion of the route associated with the first portion of the route, wherein the second portion of the route includes the second waypoint for the vehicle in operation, followed by a step 1240 of generating the second economy-efficient driving track for the vehicle in operation, that is associated with the second portion of the route; or a step 1330 of generating the second economy-efficient driving track for the vehicle in operation, followed by a step 1340 of determining at least one second portion of the route associated with the second economy-efficient track for the vehicle in operation and the first portion of the route. In addition, but not limited to, like the energy-efficient driving route disclosed above with reference to FIGS. 14 and 15, the steps 1210 and 1220 are identical to the steps 1310 and 1320. In addition, but not limited to, in contrast to the sequence of steps 1230 and 1240, which is useful when a driving route for the vehicle in operation can only include the first and the second portions of the route, but not alternative ones, the sequence of steps 1330 and 1340 can be used to generate a driving route for the vehicle in operation, that is as economy efficient as possible, since it allows for selecting the second portion of the route from a plurality of second portions of the route, which are associated with a plurality of second economy-efficient driving tracks for the vehicle in operation, respectively. At the same time, an economy-efficient driving route for the vehicle in operation is generated according to method 1300 so as to be as economy efficient as possible. To achieve this, preferably, but not limited to, the step 1330 further includes at least the following steps: selecting at least two second economy-efficient driving tracks for the vehicle in operation, wherein said tracks are associated with one of the respective second portions of the route, each of which is, in turn, associated with the first portion of the route, and wherein the second portions of the route are not identical; comparing respective estimated economy efficiencies upon completion of each of the second portions of the route by the vehicle in operation; and determining the second economy-efficient driving track for the vehicle in operation, which is the second economy-efficient driving track for the vehicle in operation, associated with one of the second portions of the route, which has the highest estimated economy efficiency compared to other estimated economy efficiencies for other second portions of the route. Therefore, by performing method 1300, it is possible to generate a driving route for the vehicle in operation, which is as economy efficient as possible, since the second portion of the route is selected so as to enable the vehicle in operation to move with the highest possible economy efficiency within the limits of the entire economy-efficient driving route. At the same time, it should be obvious to a person having ordinary skill in the art that any one of the second portions of the route can be used by method 1300 as the first portion of the route, and, therefore, it will not be the second portion of the route, but it will be the first portion of the route, which allows to form a series of portions of the route associated with each other, that can be used to create longer economy-efficient driving routes.

Thus, preferably, but not limited to, other methods, devices, and systems for modifying economy-efficient driving routes for motor vehicles can also be proposed, which are based on the aforementioned methods for generating economy-efficient route, as disclosed with reference to FIGS. 17 and 18. Preferably, but not limited to, such methods, devices, and systems for modifying economy-efficient driving routes for motor vehicles are mostly identical to methods 800 and 900, which have been disclosed above with reference to FIGS. 14 and 15, but, instead of energy-efficient tracks, they use economy-efficient tracks, which are, correspondingly, either non-modified economy-efficient tracks or modified economy-efficient tracks, and, therefore, the methods, devices, and systems for modifying economy-efficient driving routes for motor vehicles are mostly identical to methods 1200 and 1300, which have been disclosed above with reference to FIGS. 17 and 18. However, but not limited to, those alternative methods for methods, devices, and systems for modifying economy-efficient driving routes for motor vehicles further include steps 1250, 1260 and 1350, 1360. In addition, preferably, but not limited to, in step 1250, a modified first economy-efficient driving track for the vehicle in operation is generated, and/or, but not limited to, in step 1260, a modified second economy-efficient driving track for the vehicle in operation is generated. In addition, preferably, but not limited to, the modified first economy-efficient driving track for the vehicle in operation, generated in step 1250, remains associated with the first portion of the route, and, but not limited to, the modified second economy-efficient driving track for the vehicle in operation, generated in step 1260, remains associated with the second portion of the route. In addition, preferably, but not limited to, in step 1350, a modified first economy-efficient driving track for the vehicle in operation is generated, and/or, but not limited to, in step 1360, a modified second economy-efficient driving track for the vehicle in operation is generated. In addition, preferably, but not limited to, the modified first economy-efficient driving track for the vehicle in operation, generated in step 1350, remains associated with the first portion of the route. In addition, preferably, but not limited to, the modified second economy-efficient driving track for the vehicle in operation, generated in step 1360, will be associated with the same second portion of the route as the non-modified second economy-efficient driving track, generated in step 1330. In addition, preferably, but not limited to, the first economy-efficient driving tracks for the vehicle in operation and the second economy-efficient driving tracks for the vehicle in operation, generated in steps 1220, 1240, 1320, 1330, respectively, are non-modified economy-efficient driving tracks, which, in turn, in accordance with the present disclosure, are the non-modified economy-efficient tracks and, therefore, can be modified, as has been described above with reference to FIG. 16 (method 1100) and thus will not be described in any further detail. Therefore, when implementing any of the methods for modifying economy-efficient driving routes as described above, economy-efficient driving tracks can be modified so as to conform to user requirements, as has been shown above with reference to FIG. 16.

Figure 19:
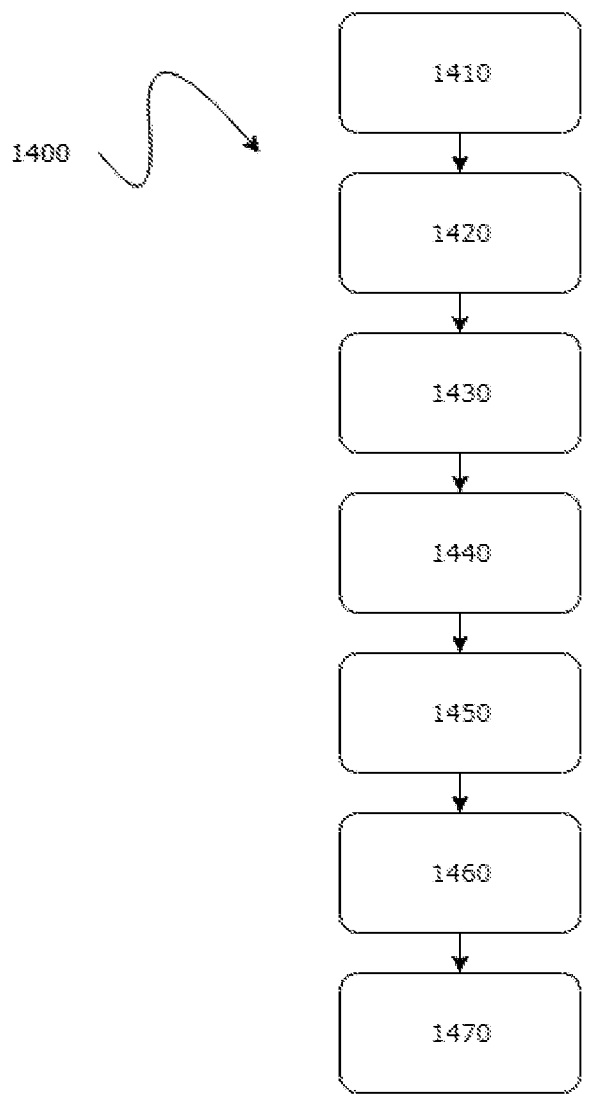
FIG. 19 illustrates an exemplary, non-limiting, diagram for the method 1400 for generating a resource-efficient track for the motor vehicle.

In addition, but not limited to, in order to generate an economy-efficient track, it is technically preferable also to generate a resource-efficient track, which, unlike energy-efficient tracks disclosed above with reference to FIGS. 1-15, also takes into account the VHI of the vehicle in operation and is based on the evaluation of its resource efficiency. In order to achieve this, but not limited to, FIG. 19 illustrates an exemplary, non-limiting, diagram for the method 1400 for generating a resource-efficient track for the motor vehicle, which is, according to the present non-limiting disclosure, the first resource-efficient track for a motor vehicle, which may be, but not limited to, as disclosed below, either the first motor vehicle, or the second motor vehicle, or the vehicle in operation. Preferably, but not limited to, the method 1400 comprises the following steps: an optional step 1410 of forming an estimated track for the first motor vehicle; an optional step 1420 of adjusting the estimated track for the first motor vehicle; a step 1430 of evaluating the passing of a portion of the route by the first motor vehicle; a step 1440 of forming an estimated track for the vehicle in operation; an optional step 1450 of adjusting the estimated track for the vehicle in operation; an optional step 1460 of evaluating the passing of a portion of the route by the vehicle in operation; an optional step 1470 of generating a track database. Preferably, but not limited to, a motor vehicle is any motor vehicle known from the art, including the first motor vehicle, the second motor vehicle, the vehicle in operation, or other motor vehicles, as it has been disclosed above with reference to FIGS. 1-18 and, therefore, will not be described in any further detail. Preferably, but not limited to, a portion of the route is any portion of the route as described above with reference to FIGS. 1-18, i.e., a portion of the route with special properties.

Figure 20:
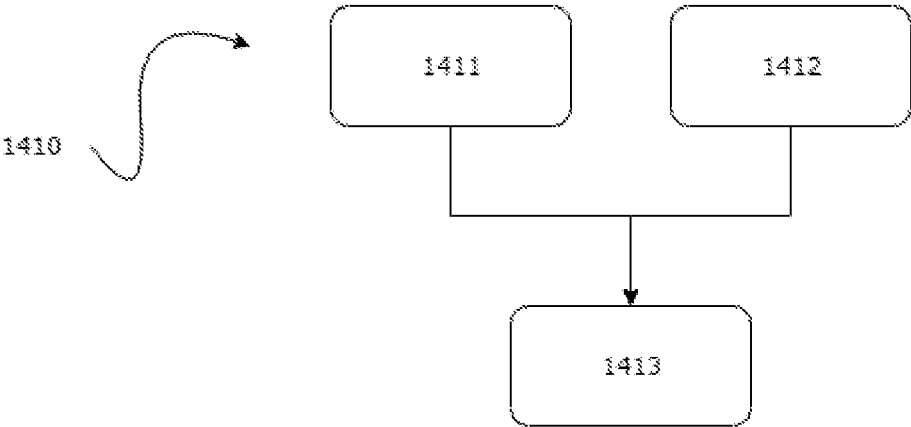
FIG. 20 illustrates an exemplary, non-limiting, diagram for the step 1410 of generating an estimated track for the first motor vehicle.

As shown in FIG. 20, the optional step 1410 of generating and estimated track for the first motor vehicle is mostly identical to the step 101 as described above with reference to FIG. 2, and, therefore, it includes, but not limited to, the following steps: identifying 1411 the first motor vehicle; identifying 1412 the portion of the route; and generating 1413 an estimated track for the first motor vehicle. Such steps have been disclosed above with reference to FIG. 2 (see steps 1011, 1012, 1013) and, therefore, will not be described again. Therefore, the generated estimated track for the first motor vehicle contains both the data associated with the first motor vehicle and the data associated with the portion of the route to be passed by the first motor vehicle. Preferably, but not limited to, the generated estimated track for the first motor vehicle further contains the estimated speed profile of the first motor vehicle, which, in turn, contains at least estimated locations of the first motor vehicle on the portion of the route and estimated speeds of the first motor vehicle on the portion of the route associated with said estimated locations, as it has been described above in detail with reference to FIG. 2. Subsequently, the first motor vehicle moves along the given portion of the route in accordance with the estimated track for the first motor vehicle, wherein it is assumed that the estimated track is resource efficient. A motor vehicle track can be considered resource efficient in case both the energy spent by the motor vehicle to pass the portion of the route and the resources consumed by the motor vehicle to pass the portion of the route are minimal. In addition, preferably, but not limited to, resources include resources in the broadest sense, i.e., any direct or indirect resources required for the motor vehicle to pass a portion of the route. Such resources include, but are not limited to, resources of perishable components of the motor vehicle, resources of various systems of the motor vehicle, resources spent on the motor vehicle's maintenance before and after passing the portion of the route, resources spent on processing data, resources spent when the motor vehicle is idle (heating of the cabin, nodes and units, parking space, etc.), and other resources. Technically speaking, resource consumption by the motor vehicle is indicated by the motor vehicle's VHI after the vehicle has passed a portion of the route, as mentioned above with reference to FIG. 16. In addition, but not limited to, it should be obvious to a person having ordinary skill in the art that the estimated track for the first motor vehicle, generated in step 1410, may be also generated using alternative ways.

Figure 21:
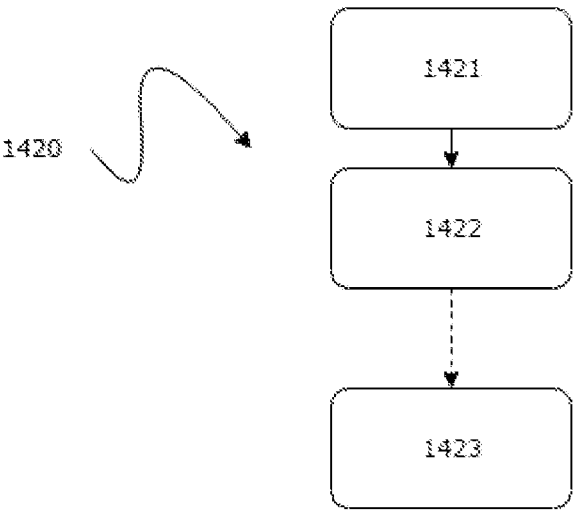
FIG. 21 illustrates an exemplary, non-limiting, diagram for the step 1420 of adjusting the estimated track for the first motor vehicle.

As shown in FIG. 21, the optional step 1420 of adjusting the estimated track for the first motor vehicle is largely identical to step 102 described above with reference to FIG. 3, and therefore, for example, but not limited to, comprises the following steps: a step 1421 of determining the actual speed profile of the first motor vehicle in at least one of the moments when it passes the portion of the route; a step 1422 of comparing the actual speed profile with the corresponding estimated speed profile from the estimated track for the first motor vehicle; and, if necessary, a step 1423 of adjusting the actual speed profile in response to the results of said comparison. These steps are identical to the steps 1021, 1022, and 1023, which have been disclosed above with reference to FIG. 3 and, therefore, will not be described in any further detail. However, it should be obvious to a person having ordinary skill in the art that although the adjustment of the estimated track for the first motor vehicle enhances the accuracy of the subsequent generation of the resource-efficient track for the vehicle in operation thus allowing to reduce energy and resource consumption by the vehicle in operation on a specific portion of the route, said adjustment is optional, since the actual track of the first motor vehicle, which is generated according to the method described above in detail with reference to FIG. 4, may be sufficient for generating an accurate resource-efficient track for the vehicle in operation.

Figure 22:
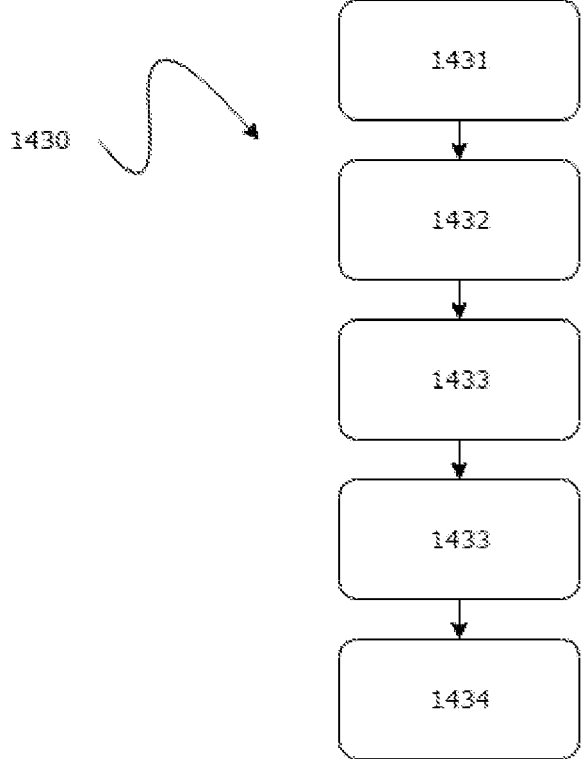
FIG. 22 illustrates an exemplary, non-limiting, diagram for the step 1430 of evaluating the passing of a portion of the route by the first motor vehicle.

As shown in FIG. 22, the step 1430 of evaluating the passing of a portion of the route by the first motor vehicle, which is also a step of collecting secondary data, comprises, but not limited to, the following steps: a step 1431 of collecting secondary data associated with the first motor vehicle and/or secondary data associated with the portion of the route passed by the first motor vehicle; a step 1432 of generating a track for the first motor vehicle; a step 1433 of evaluating energy efficiency of the track of the first motor vehicle; and a step 1434 of evaluating resource efficiency of the track of the first motor vehicle. The steps 1431, 1432, 1433 are mostly identical to the steps 1031, 1032, 1033, which have been disclosed above with reference to FIG. 4 and, therefore, will not be described in any further detail. In general, regarding resource-efficient tracks, just as with energy-efficient tracks, it should be noted that the track generated for the first motor vehicle will be considered energy efficient in case both the time spent by the first motor vehicle to pass the portion of the route and the energy consumed by the first motor vehicle to pass the portion of the route are minimal. At the same time, the track for the first motor vehicle generated this way will be considered to be resource-effective, if the VHI of the first motor vehicle after passing the portion of the route remains unchanged or deteriorates by an expected value, depending on the route in question. Therefore, it should be noted that, in step 1433, energy efficiency of the estimated track for the first motor vehicle and that of its generated track are compared, and in step 1434, resource efficiency of the estimated track for the first motor vehicle, i.e. the estimated VHI of the first motor vehicle, is compared to the VHI of the first motor vehicle resulting from the actual track for the first motor vehicle. It should also be noted that in case the track generated for the first motor vehicle is more resource-efficient than the estimated track for the first motor vehicle, then the estimated track for the second motor vehicle (vehicle in operation) is generated using the generated (actual) track, even if it is different from the estimated track for the first motor vehicle. Otherwise, it should be noted that the estimated track for the second motor vehicle (vehicle in operation) is also generated based on the actual track for the first motor vehicle, taking into account the secondary data associated with the first motor vehicle and/or the portion of the route passed by it. In addition, the estimated track for the first motor vehicle can also be adjusted based on how the first motor vehicle passed the given portion of the route, using the refined data associated with the first motor vehicle and/or the portion of the route. In this case, resource efficiency of the generated estimated track for the first motor vehicle is evaluated relative to the adjusted estimated track for the first motor vehicle. In general, it should be noted that the estimated track to be generated for the second motor vehicle (vehicle in operation) has to be resource efficient, and it has to be generated taking into account the properties of the actual track of the first motor vehicle. However, it should be obvious to a person having ordinary skill in the art that the estimated track for the first motor vehicle, as was mentioned above, can be any estimated track for the first motor vehicle that contains the data associated with the first motor vehicle and the data associated with the portion of the route to be passed by the first motor vehicle, including, but not limited to, the estimated track for the first motor vehicle that was adjusted in step 1420.

Figure 23:
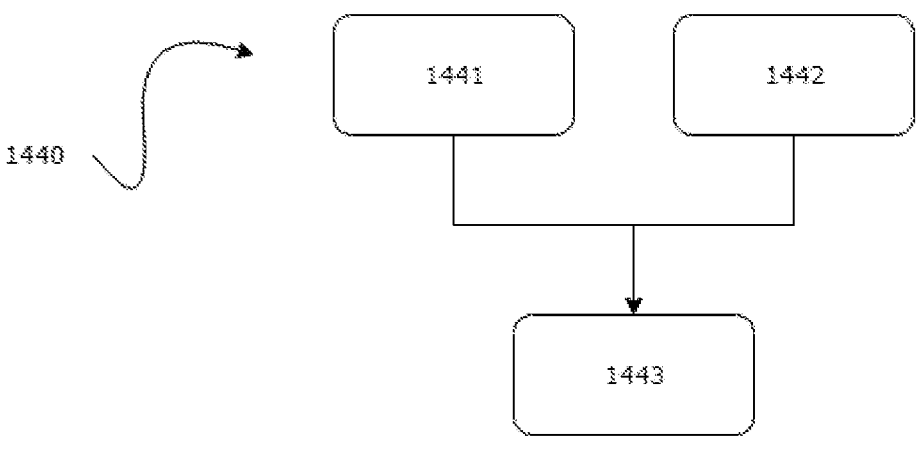
FIG. 23 illustrates an exemplary, non-limiting, diagram for the step 1440 of generating an estimated track for the second motor vehicle.

As will be demonstrated below, the steps of generating estimated and/or resource-efficient tracks for the second motor vehicle, as well as for any of the following motor vehicles to pass the portion of the route after the first motor vehicle, are essentially the same and may be interchangeable. For example, without limitation, generation of estimated and/or resource-efficient tracks for the vehicle in operation will be demonstrated, however, as was mentioned above, it should be obvious to a person having ordinary skill in the art that the aforementioned methods can be used to generate corresponding tracks for any motor vehicle that is to pass the given portion of the route after the first motor vehicle. As shown in FIG. 23, the step 1440 of generating an estimated track for the vehicle in operation comprises the following steps: a step 1441 of identification the first motor vehicle; a step 1442 of identifying the portion of the route; and a step 1443 of generating an estimated track for the first motor vehicle. The steps 1441, 1442, 1443 are mostly identical to the steps 1041, 1042, 1043, which have been disclosed above with reference to FIG. 5 and, therefore, will not be described again. In addition, but not limited to, it should be noted that, as with energy-efficient tracks, the first motor vehicle and the vehicle in operation are different, and therefore resource efficiency of their tracks on a given portion of the route should also be evaluated differently, preferably, but not limited to, in the way of adapting their values to the normalized values. Preferably, but not limited to, the estimated track for the vehicle in operation generated this way is mostly identical to the estimated track for the vehicle in operation, which has been disclosed with reference to FIG. 5 and, therefore, will not be described in any further detail. Furthermore, as with energy-efficient tracks, in step 1413, the properties of the portion of the route could not be considered with sufficient accuracy, since there were no actual data associated with the portion of the route, such as, but not limited to, the quality of pavement, weather conditions, or temporary obstacles, and due to that fact the estimated track for the first motor vehicle could not possibly be resource efficient. In general, it should be noted that the estimated track for the first motor vehicle was generated using the data provided by the motor vehicle itself and external data sources only. However, but not limited to, based on how the first motor vehicle passed the given portion of the route, the track generated for the first motor vehicle can be significantly different from the estimated track for the first motor vehicle, for example, because the operator or the motion control system of the first motor vehicle were constantly assessing the situation on the portion of the route, which allowed the vehicle to pass it with higher resource efficiency than that of the estimated track, including by means of adjusting the estimated track. Thus, the estimated track generated for the vehicle in operation has by any means, not necessarily due to normalization, higher resource efficiency than the estimated track for the first motor vehicle. As will be shown below in the present disclosure, it is the estimated track generated for the vehicle in operation that becomes the pre-generated resource-efficient track for the vehicle in operation.

Figure 24:
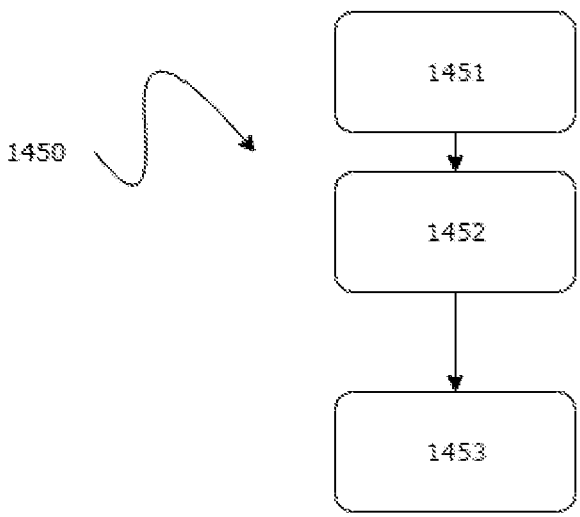
FIG. 24 illustrates an exemplary, non-limiting, diagram for the step 1450 of adjusting the estimated track for the second motor vehicle.

As shown in FIG. 24, the optional step 1450 of adjusting the estimated track for the vehicle in operation, for example, but not limited to, comprises the following steps: a step 1451 of determining the actual speed profile of the vehicle in operation in at least one of the moments when it passes the portion of the route; a step 1452 of comparing the actual speed profile with the corresponding estimated speed profile from the estimated track for the vehicle in operation; and, if necessary, a step 1453 of adjusting the actual speed profile in response of the vehicle in operation to the results of said comparison. The steps 1451, 1452, 1453 are mostly identical to the steps 1051, 1052, 1053, which have been disclosed above with reference to FIG. 6 and, therefore, will not be described in any further detail.

Figure 25:
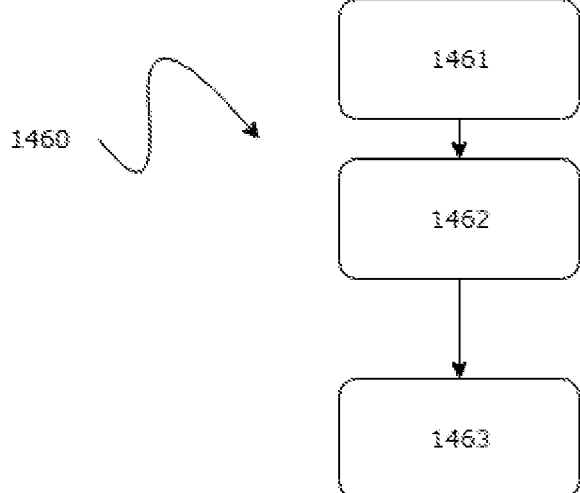
FIG. 25 illustrates an exemplary, non-limiting, diagram for the step 1460 of evaluating the passing of a portion of the route by the second motor vehicle.

As shown in FIG. 25, the optional step 1460 of evaluating the passing of a portion of the route by the vehicle in operation involves, for example, but not limited to, the following steps: a step 1461 of collecting secondary data associated with the vehicle in operation and/or secondary data associated with the portion of the route passed by the vehicle in operation; a step 1462 of generating an actual track for the vehicle in operation; and a step 1463 of evaluating energy efficiency of the track of the vehicle in operation. The steps 1461 and 1462 are mostly identical to the steps 1061 and 1062, which have been disclosed above with reference to FIG. 7 and, therefore, will not be described in any further detail. For instance, but not limited to, the step 1063 involves evaluating not only energy efficiency of the generated track for the vehicle in operation, but also its resource efficiency. In general, it should be noted that the track generated for the vehicle in operation will be considered energy efficient in case both the time spent by the vehicle in operation to pass the portion of the route and the energy consumed by the vehicle in operation to pass the portion of the route are minimal, and the track will also be considered resource efficient, if the deterioration of the VHI of the vehicle in operation after passing the portion of the route is minimal. Thus, it should be noted that, in step 1463, energy efficiency of the estimated track for the vehicle in operation is compared to that of the actual track generated for the vehicle in operation, and the estimated VHI of the estimated track for the vehicle in operation is compared to the VHI of the vehicle in operation in the context of the actual track for the vehicle in operation. It should also be noted that in case the actual track for the vehicle in operation is more resource-efficient than the estimated track for the vehicle in operation, then the estimated track for any of the following motor vehicles is generated using the generated (actual) track for the vehicle in operation, even if it is different from the estimated track for the vehicle in operation, wherein the following motor vehicle is any motor vehicle that is to pass the given portion of the route after the vehicle in operation. Otherwise, it should be noted that the estimated track for the following motor vehicle is also generated based on the actual track for the vehicle in operation, taking into account the secondary data associated with the vehicle in operation and/or the portion of the route passed by it. In addition, the estimated track for the vehicle in operation can also be adjusted based on how the vehicle in operation passed the given portion of the route, using the refined data associated with the vehicle in operation and/or the portion of the route. In this case, energy efficiency and resource efficiency of the generated estimated track for the vehicle in operation are evaluated relative to the adjusted estimated track for the vehicle in operation. In general, it should be noted that the estimated track to be generated for the following motor vehicle has to be resource efficient, and it has to be generated taking into account the properties of the actual track of the vehicle in operation. However, it should be obvious to a person having ordinary skill in the art that although the evaluation of how the vehicle in operation passes a given portion of the route enhances the accuracy of the subsequent generation of the resource-efficient tracks for the following motor vehicles thus allowing to reduce energy and resource consumption by these motor vehicles on a specific portion of the route, said evaluation is optional, since the aforementioned estimated track for the vehicle in operation, or even the aforementioned estimated track for the vehicle in operation, may be sufficient for subsequent generation of a model resource-efficient track for any of the following motor vehicles.

The optional step 1470 of generating a database of tracks comprises, for example, but not limited to, collecting a plurality of tracks for motor vehicles, the tracks that have been generated based on how said motor vehicles have passed the given portion of the route, the motor vehicles including at least the first motor vehicle and the vehicle in operation, as has been disclosed above with reference to method 100 and thus will not be described in any further detail. Generally, it should be noted that such database will contain both energy-efficient tracks and resource-efficient tracks, including model resource-efficient tracks.

In addition, but not limited to, any one of the methods for generating various energy-efficient tracks, disclosed above with reference to FIGS. 9-14, can be adapted to generate similar resource-efficient tracks, as each will involve resource-efficient tracks described above with reference to FIGS. 19-25. In addition, it should be noted that since a resource-efficient track still takes into account energy efficiency of the motor vehicle, any such track is also an energy-efficient track, and, therefore, in any one of the methods for generating energy-efficient tracks, disclosed above with reference to FIGS. 9-14, the first energy-efficient tracks, main energy-efficient tracks, non-modified energy-efficient tracks, etc. can be easily replaced with respective resource-efficient tracks without changing the basic principles of said methods. In addition, it should be noted that a resource-efficient track should be viewed as a complement to an energy-efficient track, as it takes into account resources that have to be spent to restore the VHI of the motor vehicle, but also requires energy efficiency. In addition, it should also be noted that, while the energy efficiency obtained for a corresponding energy-efficient track may change, taking into account the requirements for the VHI of the motor vehicle based on how it has passed a portion of the route, such changes still ensures that the motor vehicle is energy efficient, although to a certain limit determined by the fact that the motor vehicle's movement along a portion of the route has to be resource-efficient.

Therefore, for example, but not limited to, there may be provided a method for generating a resource-efficient track for the vehicle in operation moving along a highway, the method performed by the CPU of the computer device. Preferably, but not limited to, this method comprises the following steps: generating the first resource-efficient track for the vehicle in operation; determining a second motor vehicle that is located in front of the vehicle in operation in its direction of movement along the highway and generating the resource-efficient track for the second motor vehicle;

generating a second resource-efficient track for the vehicle in operation, based on its speed profile and evaluation of its resource efficiency when the vehicle in operation is moving in accordance with the resource-efficient track for the second motor vehicle; comparing the second resource-efficient track for the vehicle in operation with the first resource-efficient track for the vehicle in operation in order to generate a control signal to assign a resource-efficient track to the vehicle in operation; assigning a resource-efficient track to the vehicle in operation, wherein the resource-efficient track to be assigned is one of the first resource-efficient track for the vehicle in operation and the second resource-efficient track for the vehicle in operation; optionally, generating an adjusted resource-efficient track for the second motor vehicle; and, optionally, generating a third resource-efficient track for the vehicle in operation in response to the adjusted resource-efficient track generated for the second motor vehicle.

The methods, devices, and systems disclosed herein with reference to FIGS. 19-25 also provide, but are not limited to, generation of the main resource-efficient track for the vehicle in operation. Preferably, but not limited to, such main resource-efficient track for the vehicle in operation is generated to ensure that the vehicle in operation's movement is resource efficient over a longer portion of the route, for example, but not limited to, over a longer portion of the route on a highway. However, it should be obvious to a person having ordinary skill in the art that, if necessary, such main resource-efficient track for the vehicle in operation can be generated for any other suitable portion of the route. In addition, there may be provided a method for generating an adjustment resource-efficient track for the vehicle in operation, the method performed by the CPU of the computer device. Preferably, but not limited to, such method for generating an adjustment resource-efficient track for the vehicle in operation comprises at least the following steps: generating an adjustment resource-efficient track for the vehicle in operation, wherein the adjustment resource-efficient track is generated based on the main energy-efficient track for the vehicle in operation, wherein the main resource-efficient track for the vehicle in operation contains at least an estimated speed profile of the vehicle in operation on the portion of the route, for which the main resource-efficient track for the vehicle in operation was generated, and wherein the estimated speed profile of the vehicle in operation on the portion of the route, for which the main resource-efficient track for the vehicle in operation was generated, contains at least the first preferred speed range for the vehicle in operation on the portion of the route, for which the main resource-efficient track for the vehicle in operation was generated; and wherein the step of generating an adjustment resource-efficient track comprises at least the following steps: determining the current location of the vehicle in operation, wherein the current location of the vehicle in operation does not correspond to its estimated location on the portion of the route; determining an adjustment portion of the route, wherein its start coordinates match the current location of the vehicle in operation and its end coordinates match the start coordinates of the portion of the route, for which the main resource-efficient track for the vehicle in operation was generated, and wherein the start coordinates of the portion of the route, for which the main resource-efficient track for the vehicle in operation was generated, are located in the vehicle in operation's direction of movement; collecting primary adjustment data, which involves obtaining data associated with the vehicle in operation and data associated with the adjustment portion of the route; and generating an adjustment resource-efficient track for the vehicle in operation, wherein the adjustment resource-efficient track for the vehicle in operation contains at least an estimated speed profile of the vehicle in operation on the adjustment portion of the route, and wherein the estimated speed profile of the vehicle in operation contains the second preferred speed range for the vehicle in operation generated in such a way that when the vehicle in operation moves at any of the speeds from the second preferred speed range, its speed at the start coordinates of the portion of the route, for which the main resource-efficient track for the vehicle in operation was generated, matches any of the speeds from the first preferred speed range for the vehicle in operation;

Preferably, but not limited to, the main resource-efficient track for the vehicle in operation contains at least an estimated speed profile of the vehicle in operation on the portion of the route, for which the main resource-efficient track for the vehicle in operation was generated. Preferably, but not limited to, the estimated speed profile of the vehicle in operation on the portion of the route, for which the main resource-efficient track for the vehicle in operation was generated, contains at least the first preferred speed range for the vehicle in operation on the portion of the route, for which the main resource-efficient track for the vehicle in operation was generated. Preferably, but not limited to, a such first speed range for the vehicle in operation is selected, so as to ensure that its movement is resource efficient, as was demonstrated above with reference to FIGS. 19-25. At the same time, it should be obvious to a person having ordinary skill in the art that the first speed range is generated, preferably, but not limited to, in the step of generating the main resource-efficient track for any first motor vehicle, including, respectively, the speed profile of the corresponding first motor vehicle and the evaluation of resource efficiency of the first motor vehicle on the corresponding portion of the route; wherein the speed profile of the first motor vehicle may also contain any speed range for the first motor vehicle which may be evaluated as resource efficient and used to generate the main resource-efficient track for the vehicle in operation, as was demonstrated above with reference to FIGS. 19-25. Preferably, but not limited to, when determining the current location of the vehicle in operation, it may be found that the current location of the vehicle in operation does not match its estimated location on the portion of the route, which may indicate at least that the actual track of the vehicle in operation does not conform to the main resource-efficient track for the vehicle in operation, which was generated as was disclosed above with reference to FIGS. 19-25. For example, but not limited to, this may happen because the vehicle in operation needed an emergency stop on the portion of the route or, but not limited to, because of any change in the speed of the vehicle in operation that does not conform to its speed profile contained in the main energy-efficient track for the vehicle in operation. In this case, the actual speed profile of the vehicle in operation in the stop point (as well as in any respective point of any other unacceptable, i.e., not conforming to the estimated speed profile, change in the speed of the vehicle in operation) will not conform to the speed profile contained in the main resource-efficient track for the vehicle in operation. At the same time, if the point of unexpected change in the speed of the vehicle in operation does not appear frequently on portions of the route in actual tracks for aforementioned first motor vehicles, it is almost impossible to pre-generate a resource-efficient track for the vehicle in operation that would include a change in speed in said point. More specifically, but not limited to, the most frequent points of change in speed on portions of the route in actual tracks for aforementioned first motor vehicles may include: a checkpoint, a parking lot entrance or exit, a gas station entrance or exit, a ramp, an intersection, a long obstacle, or a similar point on a portion of the route. For such frequent points, it is possible to obtain enough data to generate a resource-efficient track for the vehicle in operation that would include shifting from the resource-efficient track of the vehicle in operation to a corresponding resource-efficient track that includes a portion between the portion of the route from the main resource-efficient track for the vehicle in operation and an aforementioned frequent point, and then shifting to a corresponding resource-efficient track that includes a portion between the aforementioned frequent point and the portion of the route from the main resource-efficient track. More specifically, but not limited to, the aforementioned point of unexpected change of the speed profile on a portion of the route from the main resource-efficient track of the vehicle in operation may be represented, but not limited to, a temporary (short-term) obstacle, a point on the road shoulder, a point of overtake, or any other point on the portion of the route, where the speed of the vehicle in operation lies outside the first preferred speed range for the vehicle in operation. When such points of unexpected change of the speed profile appear, preferably, but not limited to, an adjustment resource-efficient track for the vehicle in operation is generated, which is a resource-efficient track for the vehicle in operation, specially calculated so that the vehicle in operation could shift back to its main resource-efficient track with required resource efficiency. In fact, but not limited to, a special resource-efficient track will be calculated for the given vehicle in operation, as if said vehicle in operation were the first motor vehicle, i.e., simply speaking, the adjustment resource-efficient track is generated according to the step 1410. At the same time, but not limited to, the vehicle in operation has already got the pre-generated resource-efficient track, which is, therefore, the main resource-efficient track for the given vehicle in operation, i.e. the adjustment resource-efficient track has to be generated in such a way that it fully conforms to the main pre-generated resource-efficient track for the vehicle in operation in the specified point of the portion of the route from the main resource-efficient track for the vehicle in operation. Preferably, but not limited to, generating an adjustment resource-efficient track for the vehicle in operation is performed, which, preferably, but not limited to, comprises determining the current location of the vehicle in operation; determining an adjustment portion of the route; collecting primary adjustment data; and generating an adjustment resource-efficient track. Preferably, but not limited to, the adjustment resource-efficient track is generated based on the main resource-efficient track for the vehicle in operation. Preferably, but not limited to, the current location of the vehicle in operation is determined, wherein the current location of the vehicle in operation does not match its estimated location on the portion of the route, which signals that this location is a point of unexpected change of the speed profile of the vehicle in operation. Preferably, but not limited to, an adjustment portion of the route is determined, wherein its start coordinates match the current location of the vehicle in operation and its end coordinates match the start coordinates of the portion of the route, for which the main resource-efficient track for the vehicle in operation was generated; and wherein the start coordinates of the portion of the route, for which the main resource-efficient track for the vehicle in operation was generated are located in the vehicle in operation's direction of movement. Preferably, but not limited to, primary adjustment data are collected, which involves obtaining data associated with the vehicle in operation and data associated with the adjustment portion of the route. Preferably, but not limited to, such primary adjustment data generally match the primary data collected in step 1410, apart from the fact that these data are collected for the vehicle in operation (which is, in this case, considered to be the first motor vehicle) and the adjustment portion of the route, respectively. Preferably, but not limited to, an adjustment resource-efficient track for the vehicle in operation is generated, wherein the adjustment resource-efficient track for the vehicle in operation contains at least an estimated speed profile of the vehicle in operation on the adjustment portion of the route; and wherein the estimated speed profile of the vehicle in operation contains the second preferred speed range for the vehicle in operation generated in such a way that when the vehicle in operation is moving at any of the speeds from the second preferred speed range, its speed at the start coordinates of the portion of the route, for which the main resource-efficient track for the vehicle in operation was generated, matches any of the speeds from the first preferred speed range for the vehicle in operation.

Therefore, but not limited to, when the vehicle in operation moves from any point of unexpected change in the speed profile, there may be generated an adjustment resource-efficient track for the vehicle in operation, which may then be sent to the computer device 2022, 4072 of the motion control system 202, 407 of the vehicle in operation or to the computer device (on-board information system, if present) 2023, 4073 of the vehicle in operation, and after that the adjustment resource-efficient track will be stored in a corresponding memory to be used alongside the resource-efficient track of the vehicle in operation, until the vehicle in operation starts moving again in accordance with its main resource-efficient track. For example, but not limited to, the adjustment resource-efficient track generated may be used to generate control signals for the motion control system of the vehicle in operation in order to change its movement. For example, but not limited to, the adjustment resource-efficient track may be used to generate control signals for an on-board information system of the vehicle in operation, to generate an information signal for the operator of the vehicle in operation, and, but not limited to, to send this information signal to any user device of the operator. At the same time, it should be obvious to a person having ordinary skill in the art that the method for generating an adjustment resource-efficient track for the vehicle in operation may be implemented using the means and methods of the systems 200, 400 for generating a resource-efficient track, described above with reference to FIGS. 19-25, which will function as a system for generating an adjustment resource-efficient track as well, and therefore its components and their functionality won't be described in further detail.

As was shown above the aforementioned portions of the route may contain the aforementioned acceleration points and/or deceleration points, including estimated acceleration points and/or deceleration points, and the generated tracks for motor vehicles may contain data associated with respective actual acceleration points and/or deceleration points, as well as data associated with mismatches between actual points and estimated points. The aforementioned deceleration points can be considered to be possible deceleration points at the same time and may include both mandatory deceleration points and non-mandatory deceleration points, which have been described above and, therefore, will not be described in further detail below. Besides, portions of the route may be also determined that include mandatory stop points, as well as portions of the route in an urban area, as has been disclosed above and, therefore, will not be described in any further detail.

It should be noted that, when the vehicle in operation is moving along a portion of the route in an urban area, i.e. a portion of the route along which one or more motor vehicles, other than the vehicle in operation, may be moving and which may intersect or connect to other such portions of the route, and the traffic on which is governed by certain traffic regulations, there may be provided the method for generating a resource-efficient track for the vehicle in operation moving along a portion of the route in an urban area, the method performed by the CPU of a computer device. For example, but not limited to, this method is performed by any of the aforementioned computer devices and generates a track for the vehicle in operation that is both resource efficient and safe, since it takes into account trajectories of other motor vehicles. For example, but not limited to, this method comprises at least the following steps: generating the first resource-efficient track for the vehicle in operation moving along a portion of the route in an urban area, the track comprising at least a speed profile of the vehicle in operation and its trajectory on the portion of the route, wherein the first resource-efficient track for the vehicle in operation is generated for a portion of the route, which is free from other vehicles; detecting a second motor vehicle located on the same portion of the route and generating a resource-efficient track for the second motor vehicle, the track comprising at least a speed profile of the second motor vehicle and its trajectory on the portion of the route, wherein the resource-efficient track for the second motor vehicle is generated for the portion of the route, which is free from other vehicles; comparing the first resource-efficient track for the vehicle in operation and the resource-efficient track for the second motor vehicle in order to obtain the comparison data comprising the data of joint trajectories of the vehicle in operation and the second motor vehicle moving along the portion of the route with their respective speed profiles; and generating the second resource-efficient track for the vehicle in operation based on the comparison data obtained. Therefore, for example, but not limited to, resource-efficient and safe motion of the vehicle in operation is provided in an urban area, taking into account dynamic obstacles on the portion of the route, such as other motor vehicles. Preferably, but not limited to, first, the first resource-efficient track for the vehicle in operation is generated, which is, preferably, but not limited to, a resource-efficient track, as was shown with reference to FIGS. 19-25, but which also includes the trajectory of the vehicle in operation on the specified given portion of the route, and wherein, preferably, but not limited to, this first resource-efficient track for the vehicle in operation is generated for an ideal portion of the route, i.e. one that is, preferably, but not limited to, free from data about other motor vehicles. Thus, but not limited to, an ideal resource-efficient track for the vehicle in operation is generated, which may be then adjusted based on the data about other motor vehicles obtained from a server of the system for generating a resource-efficient track for the vehicle in operation on a portion for the route in an urban area, and/or from servers of other city traffic control systems employed on the specified portion of the route, and/or from other motor vehicles, for example, through data exchange protocols, such as vehicle-to-vehicle (V2V) and vehicle-to-everything (V2X). Also, but not limited to, the second motor vehicle is detected on the specified portion of the route and its resource-efficient track is generated, which, like the first resource-efficient track for the vehicle in operation mentioned above, generally, but not limited to, is a resource-efficient track, as was shown with reference to FIGS. 19-25, but which also includes the trajectory of the second motor vehicle on the specified given portion of the route, and wherein, preferably, but not limited to, this resource-efficient track for the second motor vehicle is generated for an ideal portion of the route, i.e. one that is, preferably, but not limited to, free from data about other motor vehicles. Thus, but not limited to, an ideal resource-efficient track for the second motor vehicle is generated, which may be then adjusted based on the data about other motor vehicles obtained from a server of the system for generating a resource-efficient track for a motor vehicle moving along a portion for the route in an urban area, and/or from servers of other city traffic control systems employed on the specified portion of the route, and/or from other motor vehicles, for example, through data exchange protocols, such as vehicle-to-vehicle (V2V) and vehicle-to-everything (V2X). Preferably, but not limited to, after the first resource-efficient track for the vehicle in operation and the resource-efficient track for the second motor vehicle have been generated, i.e. when speed profile and trajectory data for both the vehicle in operation and the second motor vehicle moving along the same portion of the route have been obtained, it is possible to perform the step, in which comparison data comprising the data of joint trajectories of the vehicle in operation and the second motor vehicle moving along the portion of the route with their respective speed profiles are obtained, and then, based on these comparison data, to perform the step, in which the second resource-efficient track for the vehicle in operation is generated. In addition, but not limited to, the second resource-efficient track for the vehicle in operation is, optionally, different from the first resource-efficient track for the vehicle in operation, as it may turn out, based on the results of speed profile and trajectory comparison mentioned above, that the vehicle in operation and the second motor vehicle won't happen to be in the same point of the portion of the route at the same moment in time, and, therefore, there will be no need to adjust the first resource-efficient track for the vehicle in operation, and thus the first resource-efficient track for the vehicle in operation can be used in place of the second resource-efficient track for the vehicle in operation. However, but not limited to, if the comparison data indicate that the vehicle in operation and the second motor vehicle may happen to be in the same point of the portion of the route at the same time, then the first resource-efficient track for the vehicle in operation and/or the resource-efficient track for the second motor vehicle have to be adjusted, so as to prevent these vehicles from being present in the same point of the portion of the route at the same time. In order to achieve that, but not limited to, the step of generating the second resource-efficient track for the vehicle in operation based on the comparison data may be performed by the CPU of an aforementioned computer device, the step comprising the following steps: comparing the trajectories of the vehicle in operation and the second motor vehicle on the same portion of the route, along which the vehicle in operation and the second motor vehicle are moving together; and a step A of generating the second resource-efficient track for the vehicle in operation, the track comprising at least the second trajectory of the vehicle in operation on the portion of the route, which does not intersect the trajectory of the second motor vehicle on the same portion of the route; or a step B of generating a second resource-efficient track for the vehicle in operation, the track comprising the trajectory of the vehicle in operation on the portion of the route, wherein this trajectory intersects the trajectory of the second motor vehicle on the same portion of the route, and an adjusted speed profile of the vehicle in operation, wherein the adjusted speed profile is generated so that only one of the vehicle in operation or the second motor vehicle would be present in the point of intersection between said trajectories of the vehicle in operation and the second motor vehicle at any given point in time. In addition, but not limited to, the data of the vehicle in operation and the second motor vehicle moving together along the same portion of the route are obtained, which may indicate that their trajectories intersect. In addition, but not limited to, the aforementioned step A is performed, in which the second resource-efficient track for the vehicle in operation is generated, which includes the second trajectory of the vehicle in operation, which does not intersect the trajectory of the second motor vehicle moving along the same portion of the route. For instance, but not limited to, the second resource-efficient track for the vehicle in operation may be useful in a situation, when the vehicle in operation is moving along a portion of the route, on which multiple trajectories are available for the vehicle in operation, wherein one of the trajectories does not intersect the trajectory of the second motor vehicle, for example, but not limited to, when the portion of the route comprises two lanes going in the same direction, and the second motor vehicle is moving along either of these lanes, and thus the trajectory for the vehicle in operation is selected, so that it moves in a lane, where there is no second motor vehicle. In addition, but not limited to, the method may further comprise generating the second resource-efficient track for the second motor vehicle that includes at least the second trajectory of the second motor vehicle on the specified portion of the route, wherein this second trajectory does not intersect the second trajectory of the vehicle in operation on the same portion of the route, wherein the second resource-efficient track for the second motor vehicle generated in step A further comprises an adjusted speed profile of the second motor vehicle, wherein said adjusted speed profile is generated so as to obtain the second trajectory of the second motor vehicle on the specified portion of the route, which does not intersect the second trajectory of the vehicle in operation on the same portion of the route. For instance, but not limited to, the second resource-efficient track for the vehicle in operation may be useful in a situation, when the original data indicated that, based on their respective profiles, the trajectories of the vehicle in operation and the second motor vehicle intersect, but a change in the speed profile of the vehicle in operation in relation to the trajectory of the second motor vehicle may remove the possibility of trajectories intersecting, for example, but not limited to, when the portion of the route comprises a single lane going in a given direction and a switch to another portion of the route, and the second motor vehicle is moving along a trajectory that connects the first portion of the route and another portion of the route, but its speed prevents free movement of the vehicle in operation with its current speed profile, which thus requires the speed profile to be adjusted, so as to provide that the movement of the vehicle in operation along the specified portion of the route is resource effective and trajectories of the vehicle in operation and the second motor vehicle do not intersect, that is, but not limited to, the vehicle in operation should slow down temporarily in order to allow the second motor vehicle to switch to another portion of the route allowing the vehicle in operation to continue its movement along the first portion of the route freely. In addition, but not limited to, the method may further comprise generating the second resource-efficient track for the second motor vehicle that includes at least the second trajectory of the second motor vehicle on the specified portion of the route, wherein this second trajectory does not intersect the second trajectory of the vehicle in operation on the same portion of the route, wherein, optionally, the second resource-efficient track for the second motor vehicle generated in step A further comprises an adjusted speed profile of the second motor vehicle, wherein said adjusted speed profile is generated so as to obtain the second trajectory of the second motor vehicle on the specified portion of the route, which does not intersect the second trajectory of the vehicle in operation on the same portion of the route. For instance, but not limited to, the second resource-efficient track for the second motor vehicle may be useful in the situation described above with reference to step 60421, when the speed profile of the second motor vehicle can be adjusted, so that the second motor vehicle safely switches to another portion of the route allowing the vehicle in operation to move freely and safely along the first portion of the route without adjusting its speed profile, for example, but not limited to, in a situation, when the second motor vehicle may accelerate, so as to switch to another portion of the route before its trajectory intersects that of the vehicle in operation. In addition, but not limited to, the trajectory of the second motor vehicle may comprise a point of deceleration of the second motor vehicle on the portion of the route, and, for example, but not limited to, the second resource-efficient track for the vehicle in operation generated in step A further comprises an adjusted speed profile of the vehicle in operation, wherein said adjusted speed profile is generated so as to obtain the second trajectory of the vehicle in operation on the specified portion of the route, which does not include the point of deceleration of the second motor vehicle on the same portion of the route. For instance, but not limited to, this may be useful in a situation, when the portion of the route comprises two lanes going in the same direction and a traffic control means that forces the second motor vehicle, taking into account its trajectory, to occupy the lane that includes a point of deceleration (such as, but not limited to, a point before the switch to another portion of the route, i.e., but not limited to, a turn or a U-turn), and therefore the vehicle in operation has to occupy the lane that does not include a point of deceleration of the second motor vehicle. In addition, but not limited to, when the trajectory of the second motor vehicle includes a point of deceleration of the second motor vehicle, this step may further comprise a step, in which step A further comprises a step of generating a second resource-efficient track for the second motor vehicle, the track comprising at least the second trajectory of the second motor vehicle on the portion of the route, wherein this trajectory includes an adjusted point of deceleration of the second motor vehicle, and wherein this adjusted point of deceleration is selected so as to provide for the second trajectory of the second motor vehicle, which does not intersect the second trajectory of the vehicle in operation on the portion of the route. For instance, but not limited to, this may be useful in a situation, when the point of deceleration of the second motor vehicle, e.g., before the switch to another portion of the route, may be shifted closer to or further from the second motor vehicle in the direction of its movement, so that the motor vehicle could speed up or slow down, respectively, so that the trajectory of the vehicle in operation does not include the point of deceleration of the second motor vehicle, for example, but not limited to, in a situation, when the vehicle in operation also needs to switch to another portion of the route, but can do it with the required level of resource efficiency without adjusting its speed profile, and when the second motor vehicle is able to adjust its speed profile in a resource-efficient way, which still allows it to speed up or slow down according to the situation. In addition, but not limited to, the second resource-efficient track for the second motor vehicle generated in step A further comprises an adjusted speed profile of the second motor vehicle, wherein said adjusted speed profile is generated so as to obtain the second trajectory of the second motor vehicle on the specified portion of the route, which includes the point of deceleration of the second motor vehicle, which is not a point situated on the second trajectory of the vehicle in operation on the portion of the route. For instance, but not limited to, this may be useful in a situation, when, taking into account the trajectory of the second motor vehicle, it is possible to select several points of deceleration on the portion of the route, but any of the several points of deceleration is on the trajectory of the vehicle in operation, for example, but not limited to in a situation, when both vehicles are moving along the portion of the route comprising several lanes, one of which allows to switch to another portion of the route, and the vehicle in operation is on the trajectory allowing to make a safe and resource-efficient switch to another portion of the route, taking into account its speed profile, and therefore, the point of deceleration of the second motor vehicle may be placed on the second motor vehicle's current lane, so that the vehicle in operation can switch to another portion of the route, which allows the second motor vehicle subsequently occupy the required lane that will be free from the vehicle in operation unobstructed. In addition, but not limited to, step B further comprises a step of generating a second resource-efficient track for the vehicle in operation, the track comprising the trajectory of the vehicle in operation on the portion of the route, wherein this trajectory intersects the trajectory of the second motor vehicle on the same portion of the route, and an adjusted speed profile of the vehicle in operation, wherein the adjusted speed profile is generated so that only one of the vehicle in operation or the second motor vehicle would be present in the point of intersection between said trajectories of the vehicle in operation and the second motor vehicle at any given point in time. For instance, but not limited to, this may be useful in a situation, when the portion of the route allows only such trajectories of the vehicle in operation and the second motor vehicle that intersect, and therefore, it is necessary to adjust the speed profile of the vehicle in operation, so that it won't happen to be in the same point of the portion of the route at the same time with the second motor vehicle, for example, but not limited to, when both vehicles are switching to other portions of the route, and therefore, their trajectories intersect, and the required level of resource efficiency for the vehicle in operation allows it to speed up or slow down, so as to make a safe and resource-efficient switch to another portion of the route without being in the point of intersection at the same time as the second motor vehicle. In addition, but not limited to, this method may further comprise generating a second resource-efficient track for the second motor vehicle, the track comprising the trajectory of the second motor vehicle on the portion of the route, wherein this trajectory intersects the trajectory of the vehicle in operation on the same portion of the route, and an adjusted speed profile of the second motor vehicle, wherein the adjusted speed profile is generated so that only one of the vehicle in operation or the second motor vehicle would be present in the point of intersection between said trajectories of the vehicle in operation and the second motor vehicle at any given point in time. For instance, but not limited to, this may be useful in the situation described above with reference to step 6043, but when it is not enough to adjust the speed profile of the vehicle in operation, and in order to provide resource-efficient and safe movement for the vehicle in operation and the second motor vehicle, the speed profile of the second motor vehicle has to be adjusted as well. In addition, but not limited to, when the trajectory of the second motor vehicle includes a point of deceleration, this method may further comprise generating a second resource-efficient track for the second motor vehicle, the track comprising the trajectory of the second motor vehicle on the portion of the route, wherein this trajectory intersects the trajectory of the vehicle in operation on the same portion of the route and includes an adjusted point of deceleration of the second motor vehicle, and an adjusted speed profile of the second motor vehicle, wherein the adjusted speed profile is generated and the adjusted point of deceleration of the second motor vehicle is selected so that only one of the vehicle in operation or the second motor vehicle would be present in the point of intersection between said trajectories of the vehicle in operation and the second motor vehicle at any given point in time. For instance, but not limited to, this may be useful in a situation, when the vehicle in operation and the second motor vehicle both switch to the same portion of the route, but the second motor vehicle makes the switch through a mandatory deceleration point that is intersected by the trajectory of the vehicle in operation, and therefore, the point of deceleration of the second motor vehicle and its speed profile have to be adjusted so that the movement of the vehicle in operation is resource-efficient and safe. It should be obvious to a person having ordinary skill in the art that there can be multiple second motor vehicles, and, therefore, the second resource-efficient track for the vehicle in operation can be generated taking into account the data of a plurality of second motor vehicles, their energy-efficient tracks, trajectories, speed profiles, and deceleration points. It should be obvious to a person having ordinary skill in the art that in any given situation, the second motor vehicle can be considered to be the vehicle in operation and, respectively, the vehicle in operation can be considered to be one of the second motor vehicles, therefore, the steps of the method described above can be applied to the second motor vehicle as well. These conditions, preferably, but not limited to, allow a plurality of motor vehicles to move resource-efficiently and safely along the same portion of the route at the same time.

In addition, when the vehicle in operation is moving along the portion of the route together with other motor vehicles, its movement should be not only resource-efficient, but also safe. In order to achieve that, there is provided, for example, but not limited to, a method for generating an adjustment resource-efficient track for the vehicle in operation, that is performed by the computer's CPU, the method comprising at least the following steps: generating the first resource-efficient track for the vehicle in operation, the track comprising a speed profile of the vehicle in operation and its trajectory on the portion of the route; detecting a second motor vehicle located on the same portion of the route, wherein the second motor vehicle is detected using environmental sensors of the vehicle in operation, and generating a track for the second motor vehicle, based at least on its estimated speed profile and estimated trajectory on the portion of the route; and generating an adjustment resource-efficient track for the vehicle in operation, based on an adjusted speed profile, adjusted resource efficiency evaluation, and adjusted trajectory of the vehicle in operation, as well as the estimated speed profile and estimated trajectory of the second motor vehicle on the portion of the route. Preferably, but not limited to, first, the first resource-efficient track for the vehicle in operation is generated, for example, using methods as shown above with reference to FIGS. 19-25; however, such methods would have to further include the following steps: generating a speed profile of the vehicle in operation on the portion of the route passed by the first motor vehicle, wherein the speed profile is based on the speed profile of the first motor vehicle and evaluation of its resource efficiency; and generating a trajectory of the vehicle in operation on the portion of the route passed by the first motor vehicle, wherein the trajectory is based on the speed profile of the first motor vehicle and evaluation of its resource efficiency. In addition, preferably, but not limited to, the speed profile of the vehicle in operation is generated taking into account the speed profile of the first motor vehicle on the portion of the route and its resource efficiency evaluation, wherein, preferably, but not limited to, the generated speed profile of the vehicle in operation and its trajectory on the portion of the route are such that the resulting resource efficiency of the vehicle in operation moving along the portion of the route is not worse than that of the first motor vehicle. In addition, for instance, but not limited to, the trajectory of the vehicle in operation on the portion of the route may be based on that of the first motor vehicle, for example, but not limited to, the trajectory of the vehicle in operation on a certain lane of the portion of the route may be selected. In addition, but not limited to, there may be other (second) motor vehicles on the same portion of the route, and their presence can be detected by the environmental sensors of the vehicle in operation using conventional methods, which won't be described herein. In order to detect the second motor vehicle on the portion of the route, there may be provided a step, in which, preferably, but not limited to, a track for the second motor vehicle is also generated by any computer device mentioned above performing at least the following steps: generating an estimated speed profile of the second motor vehicle, wherein the second motor vehicle and direction of its movement are detected by the environmental sensors of the vehicle in operation; determining a point on the portion of the route, where the vehicle in operation and the second motor vehicle may happen to be at the same time in case their respective speed profiles are not adjusted; and generating an estimated trajectory for the second motor vehicle on the portion of the route, based on the respective speed profiles of the vehicle in operation and the second motor vehicle, and the point on the portion of the route, where both vehicles may happen to be at the same time in case their respective speed profiles are not adjusted. In addition, but not limited to, based on the data provided by the environmental sensors of the vehicle in operation, the location of the second motor vehicle on the portion of the route, its direction, and speed can be calculated. In addition, but not limited to, these parameters of the second motor vehicle are determined in relation to both the portion of the route and the vehicle in operation. Preferably, but not limited to, in case initial trajectories of the vehicle in operation and the second motor vehicle on the same portion of the route coincide, a point on the portion of the route is determined, where both the vehicle in operation and the second motor vehicle may happen to be at the same time if their respective speed profiles remain unadjusted, based on the data from the first resource-efficient track for the vehicle in operation and the data obtained. Preferably, but not limited to, an estimated trajectory of the second motor vehicle may be determined, for example, but not limited to, by means of the environmental sensors of the vehicle in operation, including, but not limited to, the situation, when the respective speed profiles of the vehicle in operation and the second motor vehicle remain unadjusted. In case it has been determined that if the respective speed profiles and/or trajectories of the vehicle in operation and the second motor vehicle remain unadjusted and both vehicles will be in the same point on the portion of the route at the same time, such movement is considered to be unsafe and impermissible, and therefore, it is necessary to perform the step of generating an adjustment resource-efficient track for the vehicle in operation. Preferably, but not limited to, the step of generating an adjustment resource-efficient track, implemented by any computer device described above, comprises the following steps: generating an estimated speed profile of the second motor vehicle and its estimated trajectory on the portion of the route; determining a point on the portion of the route, where the vehicle in operation and the second motor vehicle may happen to be at the same time in case their respective speed profiles are not adjusted; and generating an adjusted speed profile of the vehicle in operation and its adjusted trajectory on the portion of the route, wherein the adjusted trajectory does not include the aforementioned point on the portion of the route, and wherein the adjusted speed profile of the vehicle in operation is generated based on the adjusted evaluation of resource efficiency of the vehicle in operation. Preferably, but not limited to, the estimated speed profile and the estimated trajectory of the second motor vehicle, that have been generated before, are obtained, and after that, the point on the portion of the route is determined, where both the vehicle in operation and the second motor vehicle will be together at the same time in case their respective speed profiles and/or trajectories on the portion of the route remain unadjusted. In addition, preferably, but not limited to, an adjusted speed profile and an adjusted trajectory for the vehicle in operation are generated. In addition, preferably, but not limited to, in case it is possible to maintain resource-efficient movement of the vehicle in operation on the portion of the route when it changes its speed, i.e. if the adjusted resource efficiency evaluation for the vehicle in operation corresponds to the pre-set resource efficiency that corresponds to the first resource-efficient track for the vehicle in operation, an adjusted speed profile is generated for the vehicle in operation, wherein, but not limited to, the adjusted speed profile of the vehicle in operation is generated alongside a different trajectory for the vehicle in operation, which does not include the aforementioned point on the portion of the route, where both the vehicle in operation and the second motor vehicle might happen to be at the same time in case their respective speed profiles remained unadjusted. For example, but not limited to, if there are several motor vehicles moving along the same portion of the route, it may be determined that, if the vehicle in operation that follows its first resource-efficient track switches to a different lane, e.g. in order to overtake another motor vehicle, such switch may cause an accident, in case there is a second motor vehicle moving along said lane, and its speed profile includes the speed of the second motor vehicle that is higher than the speed of the vehicle in operation at any moment in time. Preferably, but not limited to, the method disclosed herein may be used to generate an adjustment resource-efficient track for the vehicle in operation that would ensure that its movement is both energy efficient and safe, as in the exemplary situation described above, for example, but not limited to, the speed profile of the vehicle in operation may be adjusted, so that the vehicle in operation slows down and overtakes another motor vehicle only after it has been itself overtaken by the second motor vehicle, or, if possible, but not limited to, the speed profile of the vehicle in operation may be adjusted, so that the vehicle in operation overtakes another motor vehicle at a speed that is higher than that of the second motor vehicle, wherein in both these exemplary cases no trajectory of the vehicle in operation includes the aforementioned point on the portion of the route.

In addition, but not limited to, there may be provided a method for generating a recuperation resource-efficient track for the vehicle in operation equipped with a braking electric recuperation system moving along a portion of the route that includes a possible deceleration point, that is performed by the computer's CPU, the method comprising at least the following steps: collecting primary data, which involves obtaining data associated with the first motor vehicle equipped with the braking electric recuperation system; data associated with the portion of the route to be passed by the first motor vehicle, and data associated with the second motor vehicle, wherein the second motor vehicle is also the vehicle in operation and passes the portion of the route after the first motor vehicle, and wherein the data associated with the portion of the route include at least data associated with a possible deceleration point; collecting secondary data, which involves generating a track for the first motor vehicle, wherein said track is generated based on how the first motor vehicle passed the portion of the route, and wherein the electric recuperation system is activated when the first motor vehicle is braking while moving along a portion of the route and passing the possible deceleration point; generating an estimated track for the second motor vehicle, wherein said estimated track is generated based on the track generated for the first motor vehicle; wherein the track for the first motor vehicle is generated by performing the following steps: generating a speed profile of the first motor vehicle on the passed portion of the route, and evaluating resource efficiency of the first motor vehicle on the passed portion of the route; wherein resource efficiency of the first motor vehicle on the passed portion of the route is evaluated on the basis of efficiency of the braking electric recuperation system of the first motor vehicle; wherein the data associated with a possible deceleration point include one of the following: data associated with a mandatory deceleration point, data associated with a non-mandatory deceleration point, and/or a combination thereof; wherein the data associated with a mandatory deceleration point include one of the following: data associated with a mandatory deceleration point on the portion of the route that is adjoined or intersected by another portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, data associated with a mandatory deceleration point on a portion of the route containing a turn, and/or a combination thereof; and wherein the data associated with a non-mandatory deceleration point include one of the following: data associated with a non-mandatory deceleration point on a portion of the route containing an incline, data associated with a non-mandatory deceleration point on a portion of the route containing a visual obstruction, and/or a combination thereof.

In addition, but not limited to, there may be provided a method for generating a resource-efficient track for the vehicle in operation moving along a portion of the route that includes a mandatory stop point, that is performed by the computer's CPU, the method comprising at least the following steps: collecting primary data, which involves obtaining data associated with the first motor vehicle; data associated with the portion of the route to be passed by the first motor vehicle, and data associated with the second motor vehicle, wherein the second motor vehicle is also the vehicle in operation and passes the portion of the route after the first motor vehicle, wherein the data associated with the portion of the route include at least data associated with a mandatory stop point; wherein the data associated with the first motor vehicle include at least data associated with the movement time of the first motor vehicle that include data associated with the actual movement time of the first motor vehicle and data associated with the maximum movement time of the first motor vehicle before a mandatory stop; and wherein the data associated with the second motor vehicle include at least data associated with the movement time of the second motor vehicle that include data associated with the actual movement time of the second motor vehicle and data associated with the maximum movement time of the second motor vehicle before a mandatory stop; collecting secondary data, which involves generating a track for the first motor vehicle, wherein said track is generated based on how the first motor vehicle passed the portion of the route, and wherein the first motor vehicle stops for a given period of time while moving along a portion of the route and passing the mandatory stop point; generating an estimated track for the second motor vehicle, wherein said estimated track is generated based on the track generated for the first motor vehicle; wherein the track for the first motor vehicle is generated by performing the following steps: generating a speed profile of the first motor vehicle on the passed portion of the route, and evaluating energy efficiency of the first motor vehicle on the passed portion of the route, wherein energy efficiency of the first motor vehicle on the passed portion of the route is evaluated on the basis of the first motor vehicle stopping at said mandatory stop point for a given period of time; and evaluating resource efficiency of the first motor vehicle on the passed portion of the route, wherein resource efficiency of the first motor vehicle on the passed portion of the route is evaluated on the basis of the first motor vehicle stopping at said mandatory stop point for a given period of time.

In addition, but not limited to, any one of the estimated tracks for any motor vehicle, first resource-efficient tracks for the vehicle in operation, main resource-efficient tracks for the vehicle in operation, resource-efficient tracks for the vehicle in operation moving along a highway, adjustment resource-efficient tracks for the vehicle in operation, resource-efficient tracks for the vehicle in operation moving along a portion of the route containing a mandatory deceleration point, resource-efficient tracks for the vehicle in operation moving along a portion of the route in an urban area, recuperation resource-efficient tracks for the vehicle in operation, or resource-efficient tracks for the vehicle in operation moving along a portion of the route containing a mandatory stop point, described above, including those described with reference to FIGS. 19-25, which, as will be disclosed below, are considered to be non-modified resource-efficient tracks, may be further modified, if necessary, in situations, when some resource efficiency can be yielded in order to, e.g., but not limited to, pass a portion of the route faster, or increase the time, and/or frequency, and/or efficiency of useful operation of the vehicle. Preferably, but not limited to, this can be achieved by implementing a method for generating a modified resource-efficient track for the vehicle in operation, that is performed by the computer's CPU, the method comprising at least the following steps: generating a non-modified resource-efficient track for the vehicle in operation; determining a portion of the route that is associated with the non-modified resource-efficient track for the vehicle in operation; optionally, determining the first estimated time of the vehicle in operation needs to pass the portion of the route associated with the non-modified resource-efficient track for the vehicle in operation; determining the first estimated resource efficiency of the vehicle in operation that is associated with the portion of the route associated with the non-modified resource-efficient track for the vehicle in operation; optionally, determining the threshold resource efficiency of the vehicle in operation that is associated with the portion of the route associated with the non-modified resource-efficient track for the vehicle in operation; and adjusting the non-modified resource-efficient track for the vehicle in operation in order to obtain a modified resource-efficient track for the vehicle in operation. In addition, preferably, but not limited to, the threshold resource efficiency of the vehicle in operation described in an optional step is different from the first estimated resource efficiency of the vehicle in operation. For example, but not limited to, the threshold resource efficiency of the vehicle in operation may be lower than the first estimated resource efficiency of the vehicle in operation. For example, but not limited to, the threshold resource efficiency of the vehicle in operation may be higher than the first estimated resource efficiency of the vehicle in operation. In addition, preferably, but not limited to, the modified resource-efficient track for the vehicle in operation includes at least the second estimated resource efficiency of the vehicle in operation that is associated with the portion of the route associated with the non-modified resource-efficient track for the vehicle in operation. In addition, preferably, but not limited to, the non-modified resource-efficient track for the vehicle in operation is adjusted, so that the second estimated resource efficiency of the vehicle in operation is different from the first estimated resource efficiency of the vehicle in operation or corresponds to the threshold resource efficiency of the vehicle in operation. For example, but not limited to, the modified resource-efficient track for the vehicle in operation further includes the second estimated time the vehicle in operation needs to completely pass the portion of the route that is associated with the non-modified resource-efficient track from the vehicle in operation, wherein, but not limited to, the second estimated time the vehicle in operation needs to completely pass the same portion of the route as the portion of the route that is associated with the non-modified resource-efficient track for the vehicle in operation, is different from the first estimated time. For example, but not limited to, the second estimated time may be less than the first estimated time. For example, but not limited to, the second estimated time may be greater than the first estimated time. For example, but not limited to, the second estimated resource efficiency may be lower than the first estimated resource efficiency of the vehicle in operation. For example, but not limited to, the second estimated resource efficiency of the vehicle in operation may be higher than the first estimated resource efficiency of the vehicle in operation. For example, but not limited to, the second estimated resource efficiency may be lower than the threshold resource efficiency of the vehicle in operation. For example, but not limited to, the second resource efficiency of the vehicle in operation may be higher than the threshold resource efficiency of the vehicle in operation. For example, but not limited to, the second estimated resource efficiency of the vehicle in operation may correspond to its threshold resource efficiency or may somewhat differ from it.

Likewise, as has been shown above with reference to FIG. 13, the non-modified resource-efficient tracks can be adjusted depending on the needs of the user and/or, but not limited to, the operator of the motor vehicle, or depending on the needs of the organization managing the vehicle fleet, or of an individual division of the organization that manages the organization's fleet. In general, but not limited to, it should be noted that by modifying non-modified resource-efficient tracks, it is possible not only to reduce the time a motor vehicle needs to pass a portion of the route, but also to increase it through new resource efficiency requirements. It should also be noted, but not limited to, that the non-modified resource-efficient tracks are generally generated to pass portions of the route, which these tracks are associated with, with maximum resource efficiency that can be achieved only when the motor vehicle passes the given portion of the route within the first estimated time. However, but not limited to, maximum resource efficiency on any given portion of the route may not be needed, as it may disagree with the current needs of the user or the vehicle, e.g., but not limited to, it may be needed to pass the given portion of the route within a time period that is different from the first estimated time. It should also be noted, but not limited to, that the relationship between the time a motor vehicle needs to completely pass a portion of the route and its resource efficiency on that portion of the route is not self-evident, i.e. depending on the portion of the route, the primary data associated with the portion of the route and/or the motor vehicle, and depending on modification purposes, it may be decided that, e.g., but not limited to, without modifying the non-modified resource-efficient track, the first estimated resource efficiency of other non-modified energy-efficient tracks that are associated with the subsequent portions of the route to be passed by the motor vehicle, may be reduced. Therefore, but not limited to, even in case a non-modified resource-efficient track has been modified, wherefore the second estimated resource efficiency, and thus the resulting resource efficiency that is determined based on how the vehicle in operation has passed the given portion of the route, are lower than the first estimated resource efficiency, said modification may be good for passing subsequent portions of the route as no further modifications of non-modified energy-efficient tracks associated with those portions of the route may be required. At the same time, wherever it is applicable and permissible, the second estimated resource efficiency may be higher than the first estimated resource efficiency, or even higher than the threshold resource efficiency, which may also be good for the resulting resource efficiency of a plurality of connected portions of the route, especially if there are indications that the traffic situation on the subsequent portions of the route has changed.

In addition, but not limited to, a variety of methods, devices, and navigation systems for vehicles can be proposed, which use the aforementioned resource-efficient tracks, including both non-modified and modified ones. Preferably, but not limited to, this can be achieved by implementing a method for generating a resource-efficient driving route for a motor vehicle, that is performed by the computer's CPU, the method comprising at least the following steps: determining the location of the vehicle in operation on the first portion of the route, wherein the first portion of the route includes the first waypoint for the vehicle in operation; generating the first resource-efficient driving track for the vehicle in operation, that is associated with the first portion of the route; determining at least one second portion of the route associated with the first portion of the route, wherein the second portion of the route includes the second waypoint for the vehicle in operation; and generating the second resource-efficient driving track for the vehicle in operation, that is associated with the second portion of the route. In addition, but not limited to, the first waypoint for the vehicle in operation is its starting point, which may or may not correspond to the location of the vehicle in operation. For example, but not limited to, if the vehicle in operation is not moving, then its starting point may correspond to the determined location of the vehicle in operation. Also, for example, but not limited to, if the vehicle in operation is not moving, then its starting point may be located on the portion of the route along the direction of movement of the vehicle in operation. For example, but not limited to, while the vehicle in operation is moving along the first portion of the route, its starting point may be determined along the direction of its movement, which may be useful in a situation, when the positioning signal is insufficiently discretized, which causes lags in determining the real location of the vehicle in operation. In addition, but not limited to, the first resource-efficient driving track may be generated taking into account the location of the vehicle in operation on the first portion of the route, and, accordingly, the set of instructions, control and/or information signals that are contained in said first resource-efficient driving track, may be sent to the motion control system and/or on-board information system of the vehicle in operation taking into account the starting point, i.e. only those instructions, control and/or information signals that are pertinent to the first portion of the route after the starting point. At the same time, but not limited to, regardless of whether the first waypoint is the starting point, this waypoint can be used to identify the first portion of the route, for which the first resource-efficient driving track for the vehicle in operation has to be generated. In addition, but not limited to, the first resource-efficient track for the vehicle in operation is generated, which has to be used by the vehicle in operation when passing the first portion of the route, wherein the passing can be seen as both complete passing and partial passing, starting, for example, but not limited to, from the starting point. In addition, but not limited to, the first resource-efficient driving track for the vehicle in operation may be any one of the estimated tracks for motor vehicles, first resource-efficient tracks for vehicles in operation, main resource-efficient tracks for vehicles in operation, resource-efficient tracks for vehicles in operation moving along a highway, adjustment resource-efficient tracks for vehicles in operation, resource-efficient tracks for vehicles in operation moving along a portion of the route containing a mandatory deceleration point, resource-efficient tracks for vehicles in operation moving along a portion of the route in an urban area, recuperation resource-efficient tracks for vehicles in operation moving along a portion of the route containing a mandatory stop point, and modified resource-efficient tracks for vehicles in operation, that have been disclosed above with reference to FIGS. 19-25 and therefore are not described in further detail. In addition, but not limited to, when the first resource-efficient driving track for the vehicle in operation is not an estimated track, such first resource-efficient driving track may be obtained from the database of resource-efficient tracks, in case one was generated before for the given vehicle in operation. At the same time, if such first resource-efficient driving track was not generated before for the given vehicle in operation and stored in the database of resource-efficient tracks, then it may be obtained by the corresponding method performed by the CPU of the computer device, as has been shown with reference to FIGS.

19-25, and then stored it the database for further use. In addition, but not limited to, if the vehicle in operation is the first motor vehicle, then the first resource-efficient driving track can be generated for it, which is an estimated track, as has been shown with reference to FIG. 19, and can be used later to generate first resource-efficient driving tracks for other motor vehicles. In addition, but not limited to, the second portion of the route is determined, which is associated with the first portion of the route. For example, but not limited to, such second portion of the route may be chosen, so that as soon as the vehicle in operation completely passes the first portion of the route, as has been shown above, it immediately starts passing the second portion of the route. At the same time, for example, but not limited to, such second portion of the route may be chosen, so that as soon as the vehicle in operation completely passes the first portion of the route, it can start passing any other portion of the route that has to be passed for it to start passing the second portion of the route. At the same time, for example, but not limited to, such second portion of the route may be chosen, so that as soon as the vehicle in operation completely passes the first portion of the route, it can start passing a series of other portions of the route that have to be passed for it to start passing the second portion of the route. It should be generally noted, however, that any route for the vehicle in operation, that includes both the first portion of the route and the second portion of the route, will be a resource-efficient route, as the vehicle in operation will move in a resource-efficient way along at least the first portion of the route and the second portion of the route, even if said portions are not directly connected, i.e. when the final point of the first portion of the route does not coincide with the starting point of the second portion of the route or is not located anywhere within the second portion of the route. In addition, but not limited to, the second portion of the route does not have to contain a final point, i.e., a point in which the resource-efficient route, which has been generated for the vehicle in operation in accordance to the method 800, comes to an end. In other words, such second portion of the route may be an intermediate portion of the route within a regular route, and so a resource-efficient route for a vehicle in operation can be generated as part of a regular route, which itself is not resource-efficient. In addition, but not limited to, in step 804, the second resource-efficient driving track associated with the second portion of the route is generated for the vehicle in operation. In addition, but not limited to, the second resource-efficient driving track, like the first resource-efficient driving track for the vehicle in operation, may be any one of the estimated tracks for motor vehicles, first resource-efficient tracks for vehicles in operation, main resource-efficient tracks for vehicles in operation, resource-efficient tracks for vehicles in operation moving along a highway, adjustment resource-efficient tracks for vehicles in operation, resource-efficient tracks for vehicles in operation moving along a portion of the route containing a mandatory deceleration point, resource-efficient tracks for vehicles in operation moving along a portion of the route in an urban area, recuperation resource-efficient tracks for vehicles in operation moving along a portion of the route containing a mandatory stop point, and modified resource-efficient tracks for vehicles in operation, that have been disclosed above with reference to FIGS. 19-25 and therefore are not described in further detail. In addition, but not limited to, when the second resource-efficient driving track for the vehicle in operation is not an estimated track, such second resource-efficient driving track may be obtained from the database of resource-efficient tracks, in case one was generated before for the given vehicle in operation. At the same time, if such second resource-efficient driving track was not generated before for the given vehicle in operation and stored in the database of resource-efficient tracks, then it may be obtained by the corresponding method performed by the CPU of the computer device, as has been shown with reference to FIGS. 9-25, and then stored it the database for further use. In addition, but not limited to, if the vehicle in operation is the second motor vehicle, then the first resource-efficient driving track can be generated for it, which is an estimated track, as has been shown with reference to FIG. 19, and can be used later to generate second resource-efficient driving tracks for other motor vehicles. At the same time, it should be obvious to a person having ordinary skill in the art that any one of the second portions of the route can be used by the method as the first portion of the route, and, therefore, it will not be the second portion of the route, but it will be the first portion of the route, which allows to form a series of portions of the route associated with each other, that can be used to create longer resource-efficient driving routes.

In addition, but not limited to, alternative methods, devices, and navigation systems for vehicles can be proposed, which use the aforementioned resource-efficient tracks, including both non-modified and modified ones. Preferably, but not limited to, this can be achieved by implementing a method for generating a resource-efficient driving route for a motor vehicle, that is performed by the computer's CPU, the method comprising at least the following steps: determining the location of the vehicle in operation on the first portion of the route, wherein the first portion of the route includes the first waypoint for the vehicle in operation; generating the first resource-efficient driving track for the vehicle in operation, that is associated with the first portion of the route; generating the second resource-efficient driving track for the vehicle in operation; and determining at least one second portion of the route associated with the second resource-efficient driving route for the vehicle in operation and the first portion of the route. In addition, but not limited to, the first two steps of the methods for generating resource-efficient driving routes, disclosed above, are fully identical, just like methods 801, 802 and 901, 902. In addition, but not limited to, in contrast to the sequence of the final steps of the previous method for generating a resource-efficient route, which is useful when a driving route for the vehicle in operation can only include the first and the second portions of the route, but not alternative ones, the sequence of the final steps of the alternative method can be used to generate a driving route for the vehicle in operation, that is as resource efficient as possible, since it allows for selecting the second portion of the route from a plurality of second portions of the route, which are associated with a plurality of second resource-efficient driving tracks for the vehicle in operation, respectively. In addition, but not limited to, the second portions of the route and the second resource-efficient driving tracks are the second portions of the route and the second resource-efficient driving tracks described above, and thus they are not described in any further detail. At the same time, as was disclosed above, a resource-efficient driving route for the vehicle in operation is generated according to the alternative method for generating a driving route so as to be as resource-efficient as possible. To achieve this, preferably, but not limited to, there are provided at least the following steps: selecting at least two second resource-efficient driving tracks for the vehicle in operation, wherein said tracks are associated with one of the respective second portions of the route, each of which is, in turn, associated with the first portion of the route, and wherein the second portions of the route are not identical; comparing estimated resource efficiencies upon completion of each of the second portions of the route by the vehicle in operation; and determining the second resource-efficient driving track for the vehicle in operation, which is the second resource-efficient driving track for the vehicle in operation, associated with one of the second portions of the route, which has the highest estimated resource efficiency compared to other estimated resource efficiencies for other second portions of the route. Therefore, by performing the alternative method for generating a resource-efficient route, it is possible to generate a driving route for the vehicle in operation, which is as resource efficient as possible, since the second portion of the route is selected so as to enable the vehicle in operation to move with the highest possible resource efficiency within the limits of the entire resource-efficient driving route. At the same time, it should be obvious to a person having ordinary skill in the art that any one of the second portions of the route can be used by the alternative method for generating a resource-efficient route as the first portion of the route, and, therefore, it will not be the second portion of the route, but it will be the first portion of the route, which allows to form a series of portions of the route associated with each other, that can be used to create longer resource-efficient driving routes.

Thus, preferably, but not limited to, other methods, devices, and systems for modifying resource-efficient driving routes for motor vehicles can also be proposed, which are based on the aforementioned methods for generating resource-efficient routes, as disclosed with reference to FIGS. 14 and 15. Preferably, but not limited to, such methods, devices, and systems for modifying resource-efficient driving routes for the vehicle in operation are mostly identical to the methods for generating resource-efficient driving routes disclosed above. However, but not limited to, unlike the aforementioned methods, devices, and systems for generating resource-efficient driving routes for the vehicle in operation, said methods further comprise additional steps. In addition, preferably, but not limited to, the first additional step for the first method for generating a resource-efficient route involves generating a modified first resource-efficient driving track for the vehicle in operation, and/or, but not limited to, the second additional step for the first method for generating a resource-efficient route involves generating a modified second resource-efficient driving track for the vehicle in operation. In addition, preferably, but not limited to, the modified first resource-efficient driving track for the vehicle in operation, generated in the first additional step, remains associated with the first portion of the route, and, but not limited to, the modified second resource-efficient driving track for the vehicle in operation, generated in the second additional step, remains associated with the second portion of the route. In addition, preferably, but not limited to, the first additional step for the alternative method for generating a resource-efficient route involves generating a modified first resource-efficient driving track for the vehicle in operation, and/or, but not limited to, the second additional step for the alternative method for generating a resource-efficient route involves generating a modified second resource-efficient driving track for the vehicle in operation. In addition, preferably, but not limited to, the modified first resource-efficient driving track for the vehicle in operation, which has been generated in the first additional step for the alternative method for generating a resource-efficient route, remains associated with the first portion of the route. In addition, preferably, but not limited to, the modified second resource-efficient driving track for the vehicle in operation, that has been generated in the second additional step for the alternative method for generating a resource-efficient route, will be associated with the same second portion of the route, which would have been associated with the generated non-modified second resource-efficient driving track. In addition, preferably, but not limited to, the first resource-efficient driving tracks for the vehicle in operation and the second resource-efficient driving tracks for the vehicle in operation are non-modified resource-efficient driving tracks, which, in turn, in accordance with the present disclosure, are the non-modified resource-efficient tracks and, therefore, can be modified, as has been described above and thus will not be described in any further detail. Thus, when implementing any one of the aforementioned methods for modifying resource-efficient driving routes, there may be provided such a modification for resource-efficient driving tracks that corresponds to user requirements.

In addition, preferably, but not limited to, the methods for generating various resource-efficient tracks, disclosed above, can be performed using any one of the systems for generating energy-efficient tracks, disclosed above with reference to FIGS. 1-15, which will not be, therefore, described in further detail. It should be generally noted that such computer systems are capable of performing both the methods for generating various resource-efficient tracks, that have been described above with reference to FIGS. 1-15, including modified and non-modified resource-efficient tracks, and methods for generating resource-efficient driving routes, methods for generating modified resource-efficient driving routes, methods for generating modified and non-modified economy-efficient tracks, methods for generating modified and non-modified economy-efficient routes, methods for generating modified and non-modified resource-efficient tracks, methods for generating resource-efficient routes, methods for generating modified resource-efficient routes, as each one of said computer systems comprises at least one computer device with a memory that stores software code(s) for generating modified and non-modified resource-efficient tracks, and/or modified resource-efficient driving routes, and/or resource-efficient driving routes, and/or modified and non-modified economy-efficient tracks, and/or modified and non-modified economy-efficient routes, and/or modified and non-modified resource-efficient tracks, and/or modified and non-modified resource-efficient routes, the code(s) that can be implemented by the CPU of the computer device. At the same time, systems for generating resource-efficient driving routes and modified resource-efficient driving routes, systems for generating modified and non-modified economy-efficient routes, and systems for generating modified and non-modified resource-efficient routes may further comprise their own means for locating motor vehicles, which, nonetheless, is not mandatory, since the coordinates of motor vehicles can be obtained from external systems in the same way as the primary data and secondary data, which are associated with the motor vehicles and portions of the route. Accordingly, such systems and methods for locating motor vehicles are known in the art and, therefore, are not described in further detail.

The present disclosure of the claimed invention demonstrates only certain exemplary embodiments of the invention, which by no means limit the scope of the claimed invention, meaning that it may be embodied in alternative forms that do not go beyond the scope of the present disclosure and which may be obvious to persons having ordinary skill in the art.

The invention claimed is:

1. A method for generating a resource-efficient track for a vehicle in operation moving along a portion of a route that contains a mandatory deceleration point, that is performed by a CPU of a computer device, the method comprising at least the following steps:
   collecting primary data, which involves obtaining data associated with a first motor vehicle, data associated with a portion of a route to be passed by the first motor vehicle, and data associated with a second motor vehicle, wherein the second motor vehicle is also a vehicle in operation and passes the portion of the route after the first motor vehicle, and wherein the data associated with the portion of the route include at least data associated with a mandatory deceleration point;
   collecting secondary data, which involves generating a track for the first motor vehicle, wherein said track is generated based on how the first motor vehicle passed the portion of the route using the data associated with the mandatory deceleration point;
   generating an estimated track for the vehicle in operation, wherein the estimated track is generated based on the track generated for the first motor vehicle;
   wherein the track for the first motor vehicle is generated by performing the following steps:
   generating a speed profile of the first motor vehicle on a passed portion of the route, and evaluating resource efficiency of the first motor vehicle on the passed portion of the route;
   and wherein the data associated with a mandatory deceleration point include one of the following: data associated with a mandatory deceleration point on a portion of the route that is adjoined or intersected by another portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, and/or a combination thereof.

2. The method of claim 1, characterized in that the data associated with the first and/or second motor vehicle may include at least one of the following: the type and model of the first motor vehicle, its mass, its aerodynamic characteristics, its wheel formula, its estimated and/or actual resource consumption and its estimated and/or actual VHI, data from its positioning sensors, weight sensors, and wheel speed sensors, and/or a combination thereof.

3. The method of claim 1, characterized in that the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

4. The method of claim 3, characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to cross said another portion of the road without stopping, when the first motor vehicle reaches the mandatory deceleration point, an estimated track for the first motor vehicle is generated, wherein the time that the first motor vehicle requires to pass said another portion of the road moving from the mandatory deceleration point to the end point of passing said another portion of the road is also calculated, and wherein the end point of passing said another portion of the road is not located on said another portion of the road and is located along the direction of movement of the first motor vehicle and along the trajectory that intersects said another portion of the road; and, based on the time calculation, an estimated speed profile of the first motor vehicle for the estimated track for the first motor vehicle is generated, wherein the estimated speed profile contains at least one of the following: the first motor vehicle moving through the mandatory deceleration point without changing its speed; the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the road; or the first motor vehicle moving through the mandatory deceleration point while increasing its speed so as to pass through said another portion of the route within the time limit that corresponds to the previously calculated time that the first motor vehicle requires to pass said another portion of the road.

5. The method of claim 4, characterized in that the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof.

6. The method of claim 3, characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is not allowed to cross said another portion of the road without stopping, when the first motor vehicle reaches the mandatory deceleration point, an estimated track for the first motor vehicle is generated, wherein the time when the traffic control means would again signal that it is allowed to intersect said another portion of the road without stopping is also calculated; and, based on the time calculation, the mandatory deceleration point is relocated so as to allow the first motor vehicle to move along the trajectory that intersects said another portion of the route without stopping, when the traffic control means signals that it is allowed to cross said another portion of the road without stopping.

7. The method of claim 6, characterized in that the data associated with the portion of the route include at least data associated with several mandatory deceleration points, wherein the data associated with mandatory deceleration points are data associated with mandatory deceleration points on the portion of the route that are located, respectively, before other portions of the route intersecting said portion of the route, wherein the data obtained from traffic control means are associated with each respective other portion of the route, and wherein the steps of the method of claim 6 are performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

8. The method of claim 3, characterized in that in case the data associated with the portion of the route to be passed by the first motor vehicle further include at least data associated with a motor vehicle located on said another portion of the route, a track for the motor vehicle located on said another portion of the route is generated, wherein said track contains at least data associated with said another portion of the route that motor vehicle is moving along, wherein the data associated with said another portion of the route include data associated with the trajectory of the motor vehicle moving along said another portion of the route, wherein the data associated with the portion of the route to be passed by the first motor vehicle further include data associated with the trajectory of the first motor vehicle, and wherein said trajectory data include data associated with an intersection between the first motor vehicle's trajectory and that of the motor vehicle moving along said another portion of the route, the mandatory deceleration point is relocated so as to prevent the first motor vehicle and the motor vehicle moving along said another portion of the route from reaching said intersection at the same time, while also enabling the first motor vehicle to move along its trajectory without stopping.

9. The method of claim 3, characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

10. The method of claim 3, characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

11. A non-transitory computer-readable medium that stores a program code that, when implemented by a CPU of a computer device, induces the CPU to perform steps according to a method for generating an resource-efficient track for a vehicle in operation moving along a portion of a route that contains a mandatory deceleration point, the method comprising at least the following steps:

collecting primary data, which involves obtaining data associated with a first motor vehicle, data associated with a portion of a route to be passed by the first motor vehicle, and data associated with a second motor vehicle, wherein the second motor vehicle is also a vehicle in operation and passes the portion of the route after the first motor vehicle, and wherein the data associated with the portion of the route include at least data associated with a mandatory deceleration point;

collecting secondary data, which involves generating a track for the first motor vehicle, wherein said track is generated based on how the first motor vehicle passed the portion of the route using the data associated with the mandatory deceleration point;

generating an estimated track for the vehicle in operation, wherein the estimated track is generated based on the track generated for the first motor vehicle;

wherein the track for the first motor vehicle is generated by performing the following steps:

generating a speed profile of the first motor vehicle on a passed portion of the route, and evaluating resource efficiency of the first motor vehicle on the passed portion of the route;

and wherein the data associated with a mandatory deceleration point include one of the following: data associated with a mandatory deceleration point on a portion of the route that is adjoined or intersected by another portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, and/or a combination thereof.

12. The medium of claim 11, characterized in that the data associated with the first and/or second motor vehicle may include at least one of the following: the type and model of the first motor vehicle, its mass, its aerodynamic characteristics, its wheel formula, its estimated and/or actual resource consumption and its estimated and/or actual VHI, data from its positioning sensors, weight sensors, and wheel speed sensors, and/or a combination thereof.

13. The medium of claim 11, characterized in that the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

14. The medium of claim 13, characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to cross said another portion of the road without stopping, when the first motor vehicle reaches the mandatory deceleration point, an estimated track for the first motor vehicle is generated, wherein the time that the first motor vehicle requires to pass said another portion of the road moving from the mandatory deceleration point to the end point of passing said another portion of the road is also calculated, and wherein the end point of passing said another portion of the road is not located on said another portion of the road and is located along the direction of movement of the first motor vehicle and along the trajectory that intersects said another portion of the road; and, based on the time calculation, an estimated speed profile of the first motor vehicle for the estimated track for the first motor vehicle is generated, wherein the estimated speed profile contains at least one of the following: the first motor vehicle moving through the mandatory deceleration point without changing its speed; the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the road; or the first motor vehicle moving through the mandatory deceleration point while increasing its speed so as to pass through said another portion of the route within the time limit that corresponds to the previously calculated time that the first motor vehicle requires to pass said another portion of the road.

15. The medium of claim 14, characterized in that the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof.

16. The medium of claim 13, characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is not allowed to cross said another portion of the road without stopping, when the first motor vehicle reaches the mandatory deceleration point, an estimated track for the first motor vehicle is generated, wherein the time when the traffic control means would again signal that it is allowed to intersect said another portion of the road without stopping is also calculated; and, based on the time calculation, the mandatory deceleration point is relocated so as to allow the first motor vehicle to move along the trajectory that intersects said another portion of the route without stopping, when the traffic control means signals that it is allowed to cross said another portion of the road without stopping.

17. The medium of claim 16, characterized in that the data associated with the portion of the route include at least data associated with several mandatory deceleration points, wherein the data associated with mandatory deceleration points are data associated with mandatory deceleration points on the portion of the route that are located, respectively, before other portions of the route intersecting said portion of the route, wherein the data obtained from traffic control means are associated with each respective other portion of the route, and wherein the steps of the method are performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

18. The medium of claim 13, characterized in that in case the data associated with the portion of the route to be passed by the first motor vehicle further include at least data associated with a motor vehicle located on said another portion of the route, a track for the motor vehicle located on said another portion of the route is generated, wherein said track contains at least data associated with said another portion of the route that motor vehicle is moving along, wherein the data associated with said another portion of the route include data associated with the trajectory of the motor vehicle moving along said another portion of the route, wherein the data associated with the portion of the route to be passed by the first motor vehicle further include data associated with the trajectory of the first motor vehicle, and wherein said trajectory data include data associated with an intersection between the first motor vehicle's trajectory and that of the motor vehicle moving along said another portion of the route, the mandatory deceleration point is relocated so as to prevent the first motor vehicle and the motor vehicle moving along said another portion of the route from reaching said intersection at the same time, while also enabling the first motor vehicle to move along its trajectory without stopping.

19. The medium of claim 13, characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

20. The medium of claim 13, characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

* * * * *